United States Patent [19]

Iwanaga et al.

[11] 4,334,442
[45] Jun. 15, 1982

[54] SHIFT VALVE ARRANGEMENT OF HYDRAULIC TRANSMISSION CONTROL SYSTEM

[75] Inventors: Kazuyoshi Iwanaga, Yokohama; Kazuhiko Sugano, Tokyo; Kunio Ohtsuka, Yokohama, all of Japan

[73] Assignee: Nissan Motor Company, Limited, Yokohama, Japan

[21] Appl. No.: 9,626

[22] Filed: Feb. 6, 1979

[30] Foreign Application Priority Data

Sep. 29, 1978 [JP] Japan .................. 53-120982

[51] Int. Cl.³ .............. B60K 41/06; B60 K 41/10
[52] U.S. Cl. ........................... 74/869; 74/868
[58] Field of Search .............. 74/867, 74/868, 869

[56] References Cited

U.S. PATENT DOCUMENTS

| | | | |
|---|---|---|---|
| 3,336,815 | 8/1967 | Leonard | 74/869 |
| 3,446,098 | 5/1960 | Searles | 74/869 |
| 3,505,906 | 4/1970 | Lemieux | 74/869 X |
| 3,507,170 | 4/1970 | Hanzi et al. | 74/869 |
| 3,546,973 | 12/1970 | Ohie et al. | 74/868 |
| 3,611,838 | 10/1971 | Utter | 74/868 |
| 3,631,744 | 1/1972 | Blomquist | 74/868 |
| 3,667,323 | 6/1972 | Irie | 74/864 X |
| 3,675,512 | 7/1972 | Hirozawa | 74/869 |
| 3,685,372 | 8/1972 | Miyazaki | 74/863 |
| 3,710,652 | 1/1973 | Miyazaki | 74/864 |
| 3,886,820 | 6/1975 | Lentz | 74/868 X |
| 4,006,652 | 2/1977 | Murakami | 74/869 |
| 4,111,072 | 9/1978 | Harmon et al. | 74/867 X |
| 4,186,627 | 2/1980 | Kuramochi | 74/869 |

FOREIGN PATENT DOCUMENTS 56262 9/1977 Japan ........................... 74/867

*Primary Examiner*—Leslie Braun
*Attorney, Agent, or Firm*—Schwartz, Jeffery, Schwaab, Mack, Blumenthal & Koch

[57] ABSTRACT

A shift valve arrangement for incorporation into a hydraulic control system of an automatic power transmission, comprising a shift valve including separate switching and control valve elements arranged and movable in series with each other, the control valve element having different pressure acting areas to be acted upon by a fluid pressure when the control valve element is in upshift and downshift positions, respectively, under kickdown condition and a pressure acting area to provide an upshift pattern of the transmission for part-throttle conditions of the engine, and a downshift valve having pressure acting areas to provide a downshift pattern for the part-throttle conditions of the engine.

6 Claims, 5 Drawing Figures

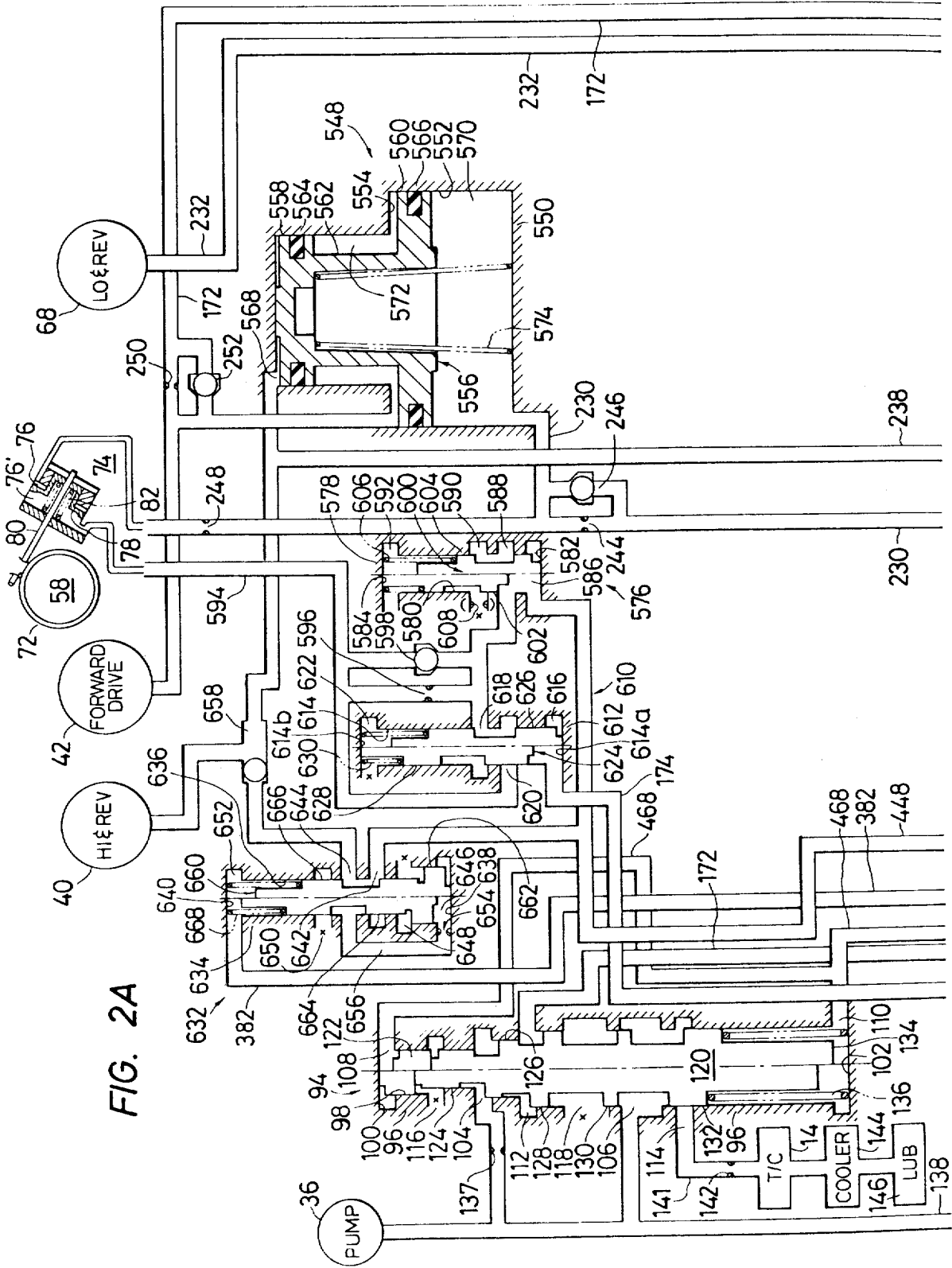

SHIFT VALVE ARRANGEMENT OF HYDRAULIC TRANSMISSION CONTROL SYSTEM

FIELD OF THE INVENTION

The present invention relates to a hydraulic control system of an automatic power transmission for an automotive vehicle and, more particularly, to a device for controlling shift points at which upshifts and downshifts between different forward drive gear ratios are to automatically occur in the automatic power transmission.

BACKGROUND OF THE INVENTION

A hydraulic control system of an automatic power transmission generally includes shift valves by means of which upshifts and downshifts are to be automatically effected between different forward drive gear ratios. Each of the shift valves includes a valve spool to be acted upon by a throttle pressure variable with the load on the engine or by a line pressure variable with the throttle pressure and further by a governor pressure which is variable with vehicle speed. The shift points at which upshifts and downshifts between the gear ratios allocated to a shift valve are thus determined in relation to the vehicle speed and the load on the engine.

A shift valve incorporated into the hydraulic control system of an automatic power transmission is further designed so that the valve spool forming part of the shift valve is further responsive to a kickdown fluid pressure under conditions in which the accelerator pedal of the vehicle is depressed all the way down. The kickdown pressure thus acting on the valve spool of the shift valve urges the valve to make a downshift between the gear ratios for which the shift valve is responsible. The shift valve thus urged to make a downshift is allowed to be conditioned to make an upshift when the vehicle speed in icreased and as a consequence the governor pressure acting on the shift valve is increased to certain values which vary with the throttle pressure.

In a conventional shift valve, the kickdown pressure is caused to act on that pressure acting area of the shift valve which is normally acted upon by a throttle pressure or line pressure so that the shift points to be achieved during kickdown condition can not be determined independently of the shift points to be achieved during part-throttle conditions of the engine. For this reason, either the shift points for the kickdown condition or the shift points for the part-throttle conditions of the engine can not be made optimum without sacrificing the others.

Furthermore, a conventional shift valve is constructed and arranged in such a manner that the throttle pressure or line pressure to act upon the above mentioned pressure acting area of the valve spool is cut off from the pressure acting area once the valve spool is moved into the position producing the higher one of the gear ratios allocated to the shift valve for enabling the valve spool to act differently under upshifting and downshifting conditions and thereby providing different shift patterns for the upshifting and downshifting. In this instance, however, the shift pattern to govern the downshifting schedules is dictated solely by the throttle pressure or line pressure and, for this reason, either the shift pattern for the upshifting or the shift pattern for the downshifting must be sacrificed if one of the two is to be selected as desired.

The present invention contemplates provision of a novel shift valve including two valve spools having respective pressure acting areas to be acted upon by the throttle pressure or line pressure and the kickdown pressure and arranged so that the kickdown pressure is applied to different pressure acting areas under kickdown and part-throttle conditions. One of the valve spools is used as a switching valve element and the other valve spool is used as a control valve element. Between these two valve spools is developed a throttle pressure or line pressure passed through a downshift valve provided in combination with the shift valve so that the shift valve is forcibly caused to make a downshift without respect to the downshift characteristics of the shift valve per se. Thus, the upshift pattern for the part throttle condition of the engine is dictated by the shift valve while the downshift pattern for the part-throttle condition of the engine is provided by the downshift valve so that the upshift and downshift patterns for the part-throttle conditions and the upshift and downshift patterns for the kickdown conditions can be predetermined independently of one another.

In accordance with the present invention, furthermore, a shift composed of two spools valve as above described are further arranged so that the fluid pressure contributive to the selection of a manual forward drive range of the transmission system is applied to the adjacent end faces of the valve spools so that the valve spool acting as the switching valve element is held in the downshift position when the manual forward drive range position is selected by the transmission gear shift valve. With this arrangement, the second or first gear position lock valve usually incorporated into a known hydraulic control system of an automatic power transmission system can be dispensed with.

SUMMARY OF THE INVENTION

In accordance with the present invention, there is provided in an automatic power transmission system including fluid operated frictional units to be selectively made operative to produce a plurality of forward drive gear ratios and a hydraulic control system including actuating fluid pressure generating means for producing an actuating fluid pressure to actuate each of the frictional units, first control pressure generating means for producing a first control, fluid pressure variable with vehicle speed and second control pressure generating means for producing a second control fluid pressure variable with engine load, a shift valve arrangement for incorporation into the hydraulic control system, comprising a shift valve including a switching valve element and a control valve element which are axially arranged in series, the switching valve element being responsive to the first control fluid pressure for switching the directions in which the actuating fluid pressure is to be passed through the shift valve, the control valve element being formed with a first pressure acting area to be acted upon by the second control fluid pressure when the control valve element is in a downshift position, a second pressure acting area to be acted upon by a fluid pressure under kickdown condition when the control valve element in the downshift position and a third pressure acting area to be acted upon by a fluid pressure under kickdown condition when the control valve element is in said downshift position thereof a downshift valve including a valve member formed with a first pressure acting area to be acted upon by the first control fluid pressure for urging the valve member to move in a first direction and a second pressure acting area to be acted upon by the second control fluid pressure for urging the valve member to move in a second direction opposite to the first direction, and resilient biasing means urging the valve member to move in the second direction, and passageway means providing communication between the shift valve and said downshift valve for directing a fluid pressure from the downshift valve to the shift valve and applying the fluid pressure into the adjacent end faces of the valve elements to urge the switching valve element toward a downshift position thereof when the valve member is moved in the second direction.

DESCRIPTION OF THE DRAWINGS

More detailed features and advantages of a hydraulic control system proposed by the present invention will be made apparent from the following description taken in conjunction with the accompanying drawings, in which:

FIGS. 2A-2C is a schematic view showing the arrangement of a hydraulic control system embodying the present invention and compatible with the transmission mechanism illustrated in FIG. 1.

DETAILED DESCRIPTION OF THE INVENTION

Power Transmission Mechanism—General Construction

Figures 1, 3:
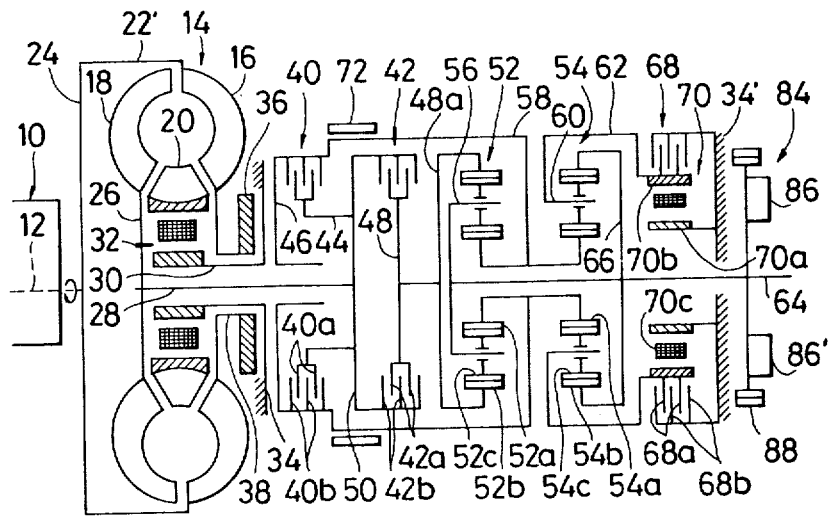
FIG. 1 is a schematic view showing the general construction of a transmission mechanism for which a hydraulic control system according to the present invention may be used in an automatic power transmission of an automotive vehicle.
FIG. 3 is a graph indicating, by way of example, the characteristics of various control pressures developed in the hydraulic control system illustrated in FIGS. 2A-2C in terms of the opening degree of the carburetor provided in an internal combustion engine.

Description will be hereinafter made regarding the general construction and arrangement of a representative example of an automatic power transmission mechanism to which a hydraulic control system embodying the present invention is to be applied. The transmission mechanism forms part of the power train of an automotive vehicle equipped with a power plant such as an internal combustion engine 10 having a crankshaft 12 as the power output delivering member as partially and schematically illustrated in FIG. 1 of the drawings and is operatively connected to the crankshaft 12 of the engine 10 through a hydrodynamic torque converter 14. The torque converter 14 is herein assumed to be of the three member design by way of example and is thus shown comprising a driving member or pump impeller 16, a driven member or turbine runner 18, and a reaction member or stator 20 as is well known in the art. The pump impeller 16 is connected by a converter cover 22' and a converter driving plate 24 to the crankshaft 12 of the engine 10 and is rotatable with the engine crankshaft 12 about an axis which is aligned with the axis of rotation of the crankshaft 12. The turbine runner 18 is mounted on a turbine support disc 26 which is keyed or splined to a transmission input shaft 28 having a center axis which is also aligned with the axis of rotation of the engine crankshaft 12. The stator 20 serving as the reaction member of the torque converter 14 is positioned between the pump impeller 16 and the turbine runner 18 thus arranged and is mounted on a stator support hollow shaft 30 through a torque converter one-way clutch assembly 32. The stator support hollow shaft 30 has the transmission input shaft 28 axially passed therethrough in substantially coaxial relationship and is fixedly connected to or forms part of a stationary wall structure 34. The stator 20 is permitted to rotate about the center axis of the transmission input shaft 28 in the same direction as the direction of rotation of the pump impeller 16 of the torque converter 14 and accordingly as the direction of rotation of the engine crankshaft 12. Though not shown, each of the pump impeller 16, turbine runner 18 and stator 20 of the torque converter 14 has a number of vanes arranged and inclined in symmetry about the center axis of the transmission input shaft 28. Behind the torque converter 14 thus constructed and arranged is positioned a transmission oil pump assembly 36 including, though not shown, an oil pump body bolted or otherwise secured to the above mentioned stationary wall structure 34 and a drive gear keyed or splined to an oil pump support sleeve 38 coaxially surrounding and rotatable on the outer peripheral surface of the stator support hollow shaft 30 and welded or otherwise securely connected to the pump impeller 16 of the torque converter 14.

When the engine 10 is in operation, the driving power produced by the engine is delivered from the crankshaft 12 of the engine 10 to the pump impeller 16 of the torque converter 14 through the converter driving plate 24 and the converter cover 22 and is transmitted from the pump impeller 16 to the transmission input shaft 28 through the turbine runner 18 of the torque converter 14 with a torque multiplied by means of the stator 20 at a ratio which is variable with the ratio between the revolution speed of the engine crankshaft 12 driving the pump impeller 16 and the revolution speed of the transmission input shaft 28 driven by the turbine runner 18 of the torque converter 14, as is well known in the art. The pump impeller 16 of the torque converter 14 drives not only the turbine runner 18 of the torque converter but the transmission oil pump assembly 36 through the pump support sleeve 38 so that the oil pump assembly 36 delivers oil under pressure which is also variable with the revolution speed of the crankshaft 12 of the engine 10.

The power transmission mechanism herein shown is assumed to be of the three forward speed and one reverse speed type by way of example and comprises first and second or high-and-reverse and forward drive clutches 40 and 42 which are positioned in series at the rear of the transmission oil pump assembly 36. The high-and-reverse clutch 40 comprises a plurality of clutch discs 40a keyed or splined at their inner peripheral edges to a clutch hub 44 and clutch plates 40b keyed or splined at their outer peripheral edges to a front clutch drum 46 which is in part positioned between the clutches 40 and 42 as shown. Likewise, the forward drive clutch 42 comprises a plurality of clutch discs 42a keyed or splined at their inner peripheral edges to a clutch hub 48 and clutch plates 42b keyed or splined at their outer peripheral edges to a rear clutch drum 50. The clutch hub 44 for the high-and-reverse clutch 40 and the rear clutch drum 50 for the forward drive clutch 42 are integral with each other and are rotatable with the transmission input shaft 28 with the rear clutch drum 50 keyed or splined to a rear end portion of the transmission input shaft 28 which axially projects from the stator support hollow shaft 30 as shown. The clutch discs 40a of the high-and-reverse clutch 40 and the clutch plate 42b of the forward drive clutch 42 thus serve as driving friction elements and, accordingly, the clutch plates 40b of the high-and-reverse clutch 40 and the clutch discs 42a of the forward drive clutch 42 serve as driven friction elements in the clutches 40 and 42, respectively. Though not shown in the drawings, each of the clutches 40 and 42 has incorporated therein a clutch piston which is adapted to bring the clutch discs and plates into engagement with one another when moved by a fluid pressure developed in a fluid chamber which is formed between the piston and the clutch drum 46. Each of the clutches 40 and 42 further includes a return spring urging the clutch piston to move in a direction to uncouple the clutch, though not shown in the drawings but as is well known in the art.

The power transmission mechanism shown in FIG. 1 further comprises first and second planetary gear assemblies 52 and 54 which are arranged in series at the rear of the forward drive clutch 42. The first planetary gear assembly 52 comprises an externally toothed sun gear 52a and an internally toothed ring gear 52b which have a common axis of rotation aligned with the center axis of the transmission input shaft 28. The clutch hub 48 for the forward drive clutch 42 has a rear extension or flange 48a to which the ring gear 52b of the second planetary gear assembly 52 is keyed or splined as diagrammatically illustrated in the drawing. The first planetary gear assembly 52 further comprises at least two planet pinions 52c each of which is in mesh with the sun and ring gears 52a and 52b and which is rotatable about an axis revolvable around the common axis of rotation of the sun and ring gears 52a and 52b. The planet pinions 52c of the first planetary gear assembly 52 are jointly connected to a pinion carrier 56 rotatable about the common axis of rotation of the sun and ring gears 52a and 52b. The second planetary gear assembly 54 is constructed similarly to the first planetary gear assembly 52 and thus comprises an externally toothed sun gear 54a and an internally toothed ring gear 54b which have a common axis of rotation aligned with the center axis of the transmission input shaft 28. The sun gears 52a and 54a of the first and second planetary gear assemblies 52 and 54, respectively, are jointly splined or otherwise fastened to a connecting shell 58 enclosing the forward drive clutch 42 and the first planetary gear assembly 52 therein and integral with or securely connected to the front clutch drum 46 for the high-and-reverse clutch 40. The second planetary gear assembly 54 further comprises at least two planet pinions 54c each of which is in mesh with the sun and ring gears 54a and 54b and which is rotatable about an axis around the common axis of rotation of the sun and ring gears 54a and 54b. The planet pinions 54c of the second planetary gear assembly 54 are jointly connected to a pinion carrier 60 which is keyed or splined at its outer peripheral edge to a connecting drum 62 enclosing the second planetary gear assembly 54 therein. The connecting drum 62 has a rear axial extension extending rearwardly away from the second planetary gear assembly 54 as shown. The respective sun gears 52a and 54a of the first and second planetary gear assemblies 52 and 54 are formed with axial bores through which a transmission output shaft 64 having a center axis aligned with the center axis of the transmission input shaft 28 is passed through and axially extends rearwardly away from the second planetary gear assembly 54. The transmission output shaft 64 is connected to the pinion carrier 56 of the first planetary gear assembly 52 direction at its foremost end portion and further to the ring gear 54b of the second planetary gear assembly 54 through a generally disc shaped connecting member 66 which is keyed or splined at its inner peripheral edge to an intermediate axial portion of the transmission output shaft 64 and at its outer peripheral edge to the ring gear 54b of the second planetary gear assembly 54. The clutches 40 and 42, the planetary gear assemblies 52 and 54 and the connecting members between the clutches and planetary gear assemblies are enclosed within a transmission case (not shown). The previously mentioned stationary wall structure 34 integral with or securely connected to the stator support hollow shaft 30 may be constituted by a front end portion of the transmission case.

Within a rear end portion of the transmission case is positioned a low-and-reverse brake 68. The low-and-reverse brake 68 is herein assumed to be of the multiple disc type by way of example and is, thus, shown composed of a plurality of brake discs 68a keyed or splined at their inner peripheral edges to the rear axial extension of the connecting drum 62 engaging the pinion carrier 60 of the second planetary gear assembly 52, and a plurality of brake plates 68b which are keyed or splined at their outer peripheral edges to a stationary wall structure 34'. The stationary wall structure 34' may be constituted by a rear end portion of the transmission case. Though not shown in the drawings, the low-and-reverse brake 68 has further incorporated therein a brake piston which is adapted to bring the brake discs and plates 68a and 68b into engagement with one another when the piston is moved by a fluid pressure developed in a fluid chamber which is formed between the piston and the above mentioned stationary wall structure 34', as is well known in the art. The brake 68 further includes a return spring (not shown) which urges the brake piston to move in a direction to release the brake, as is also well known in the art. It is apparent that the low-and-reverse brake 68 of the multiple disc type as above described may be replaced with a brake unit of the band type which is well known in the art.

The low-and-reverse brake 68 is paralleled in effect by a transmission one-way clutch 70 which is positioned within the rear axial extension of the above mentioned connecting drum 68. The transmission one-way clutch 70 is assumed to be of the sprag type by way of example and is, thus, shown comprising a stationary inner race member 70a, a rotatable outer race member 70b and a series of spring loaded sprag segments 70c disposed between the inner and outer race members 70a and 70b. The stationary inner race member 70a is centrally bored to have the transmission output shaft 64 axially passed therethrough and is bolted or otherwise securely fastened to the stationary wall structure 34' which may form part of the transmission case. On the other hand, the rotatable outer race member 70b is keyed or splined along its outer periphery to the rear axial extension of the connecting drum 62 carrying the brake discs 68a of the low-and-reverse brake 68. The sprag segments 70c provided between the inner and outer race members 70a and 70b are arranged in such a manner that the sprag segments 70c are caused to stick to the inner and outer race members 70a and 70b and thereby lock up the rotatable outer race member 70b to the stationary inner race member 70a when the outer race member 70b is urged to turn about the center axis of the transmission output shaft 64 in a direction opposite to the direction of rotation of the crankshaft 12 of the engine 10, viz., to the direction of rotation of the transmission output shaft 64 to produce a forward drive mode of an automotive vehicle. The direction of rotation of any member rotatable about an axis coincident or parallel with the center axis of the transmission output shaft 64 will be herein referred to as forward direction if the direction of rotation of the member is identical with the direction of rotation of the transmission output shaft 64 to produce a forward drive condition in a vehicle and as reverse direction if the direction of rotation of the member is identical with the direction of rotation of the transmission output shaft 64 to produce a rearward drive condition of the vehicle. Thus, the above described transmission one-way clutch 70 is adapted to allow the connecting drum 62 and accordingly the pinion carrier 60 of the second planetary gear assembly 54 to turn in the forward direction about the center axis of the transmission output shaft 64 but prohibit the connecting drum 60 and the pinion carrier 60 from being rotated in the reverse direction about the center axis of the transmission output shaft 62. The forward direction herein referred to is identical with the direction of rotation of the crankshaft 12 of the engine 10 and accordingly with the direction of rotation of the transmission input shaft 28. It is apparent that the transmission one-way clutch 70 of the sprag type as above described may be replaced with a one-way clutch of the well known cam and roller type if desired.

The power transmission mechanism shown in FIG. 1 further comprises a brake band 72 wrapped around the outer peripheral surface of an axial portion of the connecting shell 58 integral with or securely fastened to the clutch drum 46 for the high-and-reverse clutch 40. The brake band 72 is anchored at one end to the transmission casing and is at the other end connected to or engaged by a fluid operated band servo unit 74 which is illustrated at the top of FIG. 2. Referring to FIG. 2, the band servo unit 74 has a housing formed with brake-apply and brake-release fluid chambers 76 and 76' which are separated by a servo piston 78 connected by a piston rod 80 to the brake band 72. The servo piston 78 is axially moved in a direction to cause the brake band 72 to be contracted and tightened upon the outer peripheral surface of the connecting shell 58 when there is a fluid pressure developed in the brake-apply fluid chamber 76 in the absence of a fluid pressure in the brake-release fluid chamber 76'. The servo piston 78 is biased to axially move in a direction to contract the brake-apply fluid chamber, via., cause the brake band 72 to be disengaged from the connecting shell 58 by means of a return spring 82 incorporated into the servo unit 74. Furthermore, the piston 78 and the housing of the servo unit 74 are designed so that the piston 78 has a differential pressure acting area effective to move the piston in the particular direction when the piston is subjected to fluid pressures on both sides thereof. When a fluid pressure is built up in the brake-release fluid chamber 76', the servo piston 78 is axially moved in a direction to cause the brake band 72 to expand and disengage from the connecting shell 58 regardless of the presence or absence of a fluid pressure in the brake-apply fluid chamber 76 of the servo unit 74.

Turning back to FIG. 1, the output shaft 64 of the power transmission mechanism thus constructed and arranged projects rearwardly from the transmission case and has mounted thereon a transmission governor assembly 84 consisting of primary and secondary gevernor valves 86 and 86' which are arranged in diametrically opposed relationship to each other across the center axis of the transmission output shaft 64. Indicated at 88 is a transmission output shaft locking gear which forms part of a parking lock assembly to lock the transmission output shaft 64 during parking of the vehicle and which is mounted together with a transmission oil distributor (not shown) on the transmission output shaft 64. Though not shown in the drawings, the transmission output shaft 64 is connected at the rear end thereof to the final drive mechanism of the vehicle and thus makes up the power train between the internal combustion engine 10 and the driving road wheels of the vehicle, as well known in the art.

Power Transmission Mechanism—Operation

The high-and-reverse and forward drive clutches 40 and 42, and low-and-reverse brake 68, one-way clutch 70 and brake band 72 of the power transmission mechanism having the construction hereinbefore described are operated in accordance with schedules indicated in Table I.

In Table I, the sign "o" indicates that for each of the high-and-reverse, forward-drive and one-way clutches the clutch in question is in a coupled condition and for the low-and-reverse brake 68 the brake is in a condition applied. As to the brake band 72, the sign "o" in the column under "Applied" indicates that the brake band 72 is actuated to lock up the connecting shell 58 and the sign "o" in the column under "Released" indicates that the brake band 72 is released from the disconnecting shell 58.

TABLE 1

| Gear Positions | Clutches High/Rev 40 | Clutches Forward 42 | Low/Rev Brake 68 | One-way Clutch 70 | Brake Band 72 Applied | Brake Band 72 Released |
|---|---|---|---|---|---|---|
| "P" | | | | | | |
| "R" | o | | o | | | |
| "N" | | | | | | |
| "D" D₁ | | o | | o | | |
| "D" D₂ | | o | | | o | |
| "D" D₃ | o | o | | | (o) | o |
| "2" 2nd | | o | | | o | |
| "2" 1st | | o | | o | | |
| "1" 2nd | | o | | | o | |
| "1" 1st | | o | o | | | |

The sign "o" enclosed in the parentheses means that there is a fluid pressure developed in the brake-apply chamber 76 of the servo unit 74 (FIG. 2A) but the brake band 72 is released from the connecting shell 58 with a fluid pressure also developed in the brake-release chamber 76' of the servo unit 74.

The parking, reverse drive and neutral gear positions and the automatic forward drive and manual first and second forward drive ranges as indicated in the leftmost column of Table I are selectively established in the transmission mechanism by manipulating a manually operated transmission gear shift lever (not shown) which have positions, "P", "R", "N", "D", "2" and "1" respectively corresponding to the above mentioned gear positions and ranges.

When, now, the transmission gear shift lever is in the parking gear position "P" or the neutral gear position "N", both of the high-and-reverse and forward drive clutches 40 and 42 in the transmission mechanism are held in the uncoupled conditions thereof so that the driving connection between the transmission input and output shafts 28 and 64 is interrupted and as a consequence the transmission output shaft 64 is maintained at rest even though the engine 10 may be in operation delivering its power output from the crankshaft 12. Under these conditions, either the parking gear position or the neutral gear position is established in the transmission mechanism depending upon whether the transmission gear shift lever is in the parking gear position "P" or in the neutral gear position "N". If the transmission gear shift lever is in the parking gear position "P", the transmission output shaft locking gear 88 mounted on the output shaft 64 is engaged by a locking pawl of the above mentioned parking lock assembly so that the transmission output shaft 64 is locked up to the transmission case.

When the transmission gear shift lever is manually moved into the automatic forward drive range position. "D" with the engine 10 operating, the forward drive clutch 42 is caused to couple. The power output delivered from the crankshaft 12 of the engine 10 to the transmission input shaft 28 through the torque converter 14 is transmitted through the forward drive clutch 42 and the clutch hub 48 to the internally toothed ring gear 52b of the first planetary gear assembly 52. The ring gear 52b of the first planetary gear assembly 52 is driven to rotate in the forward direction about the center axis of the transmission output shaft 64 and thereby causes the externally toothed sun gear 52a of the planetary gear assembly 52 to rotate in the opposite direction about the center axis of the shaft 64 through the planet pinions 52c each of which is rotated in the same direction as the ring gear 52b about its own axis of rotation. The externally toothed sun gear 54a of the second planetary gear assembly 54 is rotated with the sun gear 52a of the first planetary gear assembly 52 in the reverse direction about the center axis of the transmission output shaft 64 and causes the internally toothed ring gear 54b of the second planetary gear assembly 54 to turn in the forward direction about the center axis of the transmission output shaft 64. Under these conditions, the individual planet pinions 54c of the second planetary gear assembly 54 are caused to rotate in the forward direction about the respective axes of rotation thereof and therefore attempt to turn in the reverse direction about the center axis of the transmission output shaft 64. The revolution of the pinion carrier 60 of the second planetary gear assembly 54 is, however, prohibited by the one-way clutch 70 connected to the pinion carrier 60 by the connecting drum 62 with the result that the pinion carrier 60 is locked to the transmission case and act as reaction elements for the ring gear 54b which drives the transmission output shaft 64 to rotate in the forward direction about the center axis thereof. The transmission output shaft 64 is connected to the pinion carrier 56 of the first planetary gear assembly 52 so that the planet pinions 52c of the first planetary gear assembly 52 is rotated about the center axis of the transmission output shaft 64 in the same direction as the direction of rotation of the ring gear 52b of the planetary gear assembly 52 but at a revolution speed which is lower with a certain ratio than the revolution speed of the ring gear 52b on which the planet pinions 52c are rolling, thereby creating the first or "low" gear ratio ($D_1$) in the automatic forward drive range in the transmission mechanism.

If the vehicle is thereafter sped up and the vehicle speed reaches a certain level, the band servo unit 74 for the brake band 72 is actuated by a fluid pressure developed in the brake-apply fluid chamber 76 of the servo unit 72 (FIG. 2A) and causes the brake band 72 to be tightened around the connecting shell 58 which is keyed or splined to the respective sun gears 52a and 54a of the first and second planetary gear assemblies 52 and 54. The sun gear 52a of the first planetary gear assembly 52 now acts as a reaction element for the planet pinions 52c which are being driven to turn in the forward direction about the center axis of the transmission output shaft 64 by the ring gear 52b rotating with the transmission input shaft 28 through the forward drive clutch 42 which is kept coupled. The driving torque carried over to the ring gear 52b of the first planetary gear assembly 52 through the forward drive clutch 42 is therefore transmitted to the transmission output shaft 64 by means of the planet pinions 52c of the first planetary gear assembly 52 and the associated pinion carrier 56. Under these conditions, the individual planet pinions 52c of the first planetary gear assembly 52 are caused to rotate in the forward direction about the respective axes of rotation thereof and thus roll on the internally toothed ring gear 52b of the planetary gear assembly 52 while rotating in the forward direction about the center axis of the transmission output shaft 64. The transmission output shaft 64 is thus rotated in the forward direction about the center axis thereof at a speed higher than that achieved under the first forward drive gear condition but lower with a certain ratio than the revolution speed of the ring gear 52b of the first planetary gear assembly 52, thereby producing the second or "intermediate" gear ratio "$D_2$" in the automatic forward in the transmission mechanism. Under the second gear ratio condition thus established, the transmission output shaft 64 drives the ring gear 54b of the second planetary gear assembly 54 to rotate in the forward direction about the center axis of the shaft 64 and thereby causes the planet pinions 54c of the planetary gear assembly 54 to turn about the center axis of the transmission output shaft 64 in the same direction as the direction of rotation of the ring gear 54b. Thus, the pinion carrier 60 of the second planetary gear assembly 54 and accordingly the connecting drum 62 are also rotated in the forward direction about the center axis of the transmission output shaft 64 and case the outer race member 70b of the transmission one-way clutch 70 to run idle around the inner race member 70a of the clutch 70.

As the vehicle speed further increases, a fluid pressure is developed in the brake-release fluid chamber 76' of the band servo unit 72 (FIG. 2A) and causes the brake band 72 to be released from the connecting shell 58 and, substantially at the same time, the high-and-reverse clutch 40 is actuated to couple. The power output delivered from the crankshaft 12 of the engine 10 to the transmission input shaft 28 is now transmitted on the one hand to the respective sun gears 52a and 54a of the first and second planetary gear assemblies 52 and 54 through the high-and-reverse clutch 40 and the connecting shell 58 released from the brake band 72 and on the other hand to the ring gear 52b of the first planetary gear assembly 52 by way of the forward drive clutch 42 and the clutch hub 48. It therefore follows that the sun gear 52a and the ring gear 52b of the first planetary gear assembly 52 are interlocked together so that the sun and ring gears 52a and 52b and the planet pinions 52c of the first planetary gear assembly 52 as well as the transmission output shaft 64 connected to the planet pinions 52c by the pinion carrier 56 are driven to rotate as a single unit in the forward direction about the center axis of the transmission output shaft 64. The transmission output shaft 64 is thus rotated in the forward direction about the center axis thereof at a speed substantially equal to the revolution speed of the transmission input shaft 28, thereby providing the third or "high" gear ratio ($D_3$) in the automatic forward drive range in the transmission mechanism.

When the manually operated transmission gear shift lever is moved into the reverse drive gear position "R", the high-and-reverse clutch 40 and the low-and-reverse brake 68 are actuated in the transmission mechanism illustrated in FIG. 1. With the high-and-reverse clutch 40 thus coupled, the power output delivered from the crankshaft 12 of the engine 10 to the transmission input shaft 28 by way of the torque converter 14 is transmitted through the clutch 40, front clutch drum 46 and connecting shell 58 to the sun gears 52a and 54a of the first and second planetary gear assemblies 52 and 54, respectively, causing the sun gears 52a and 54a to rotate in the forward direction about the center axis of the transmission output shaft 64. The low-and-reverse brake 68 being actuated to lock the connecting drum 62 to the transmission case, the pinion carrier 60 of the second planetary gear assembly 54 is held stationary with respect to the transmission case, with the result that the planet pinions 54c of the second planetary gear assembly 54 and driven by the sun gear 54a of the second planetary gear assembly 54 for rotation in the reverse direction about their respective axes of rotation. This causes the ring gear 54b of the second planetary gear assembly 54 and accordingly the transmission output shaft 64 to rotate in the reverse direction about the center axis thereof at a speed which is lower with a certain ratio than the revolution speed of the sun gears 52a and 54a of the planetary gear assemblies 52 and 54 and accordingly of the transmission input shaft 28, establishing the reverse drive gear condition in the transmission mechanism.

When the transmission gear shift lever is in the manual second forward drive range position "2", only the forward drive clutch 42 is actuated or both the forward drive clutch 42 and the brake band 72 are actuated depending upon the road speed of the vehicle. If the vehicle speed being produced is at a relatively low level, only the forward drive clutch 42 is made operative so that the first gear condition is provided in the transmission mechanism under the cooperation of the one-way clutch 70 as in the case where the first gear ratio in the automatic forward drive range is selected in the transmission mechanism. If, however, the vehicle speed is at a relatively high level when the transmission gear shift lever is moved to the manual second forward drive range position "2", then the brake band 72 is applied with the forward drive clutch 42 maintained in the coupled condition thereof, thereby producing the second gear ratio in the transmission mechanism as in the case where the second gear ratio in the automatic forward drive range is selected in the transmission mechanism. In these manners, either the first gear ratio or the second gear ratio is selected in the transmission mechanism when the transmission gear shift lever is in the manual second forward drive range position "2".

Under the condition in which the transmission gear shift lever is in the manual first forward drive range position "1", either the low-and-reverse brake 68 or the band brake 72 is put into operation depending upon the vehicle speed, in addition to the forward drive clutch 42 which is maintained in the coupled condition. If, in this instance, the vehicle speed being produced is at a relatively high level, the forward drive clutch 42 and the brake band 72 are operative in combination so that the second gear ratio is selected in the transmission mechanism as in the case of the second gear ratio in the automatic or manual second forward drive range. If, however, the vehicle speed being produced when the transmission gear shift lever is moved into the manual first forward drive range position "1", the low-and-reverse brake 68 is put into operation with the forward drive clutch 42 remaining in the coupled condition. In this instance, the transmission output shaft 64 is driven to rotate in the forward direction about the center axis thereof by the ring gear 54b of the second planetary gear assembly having the pinion carrier 60 held stationary with respect to the transmission case, as in the first gear ratio condition produced with the transmission gear shift lever held in the automatic forward drive range position "D". While the pinion carrier 60 of the second planetary gear assembly 54 is locked to the transmission case by the action of the transmission one-way clutch 70 under the first gear ratio condition produced in the automatic forward drive range, the pinion carrier 60 is locked to the transmission case by means of the low-and-reverse brake 68 under the first gear ratio condition produced in the manual first forward drive range. During the first forward speed gear condition in the manual forward drive range, therefore, a driving torque can be transmitted backwardly from the ring gear 54b to the sun gear 54a through the planet pinions 54c in the second planetary gear assembly 54.

Figure 2B:
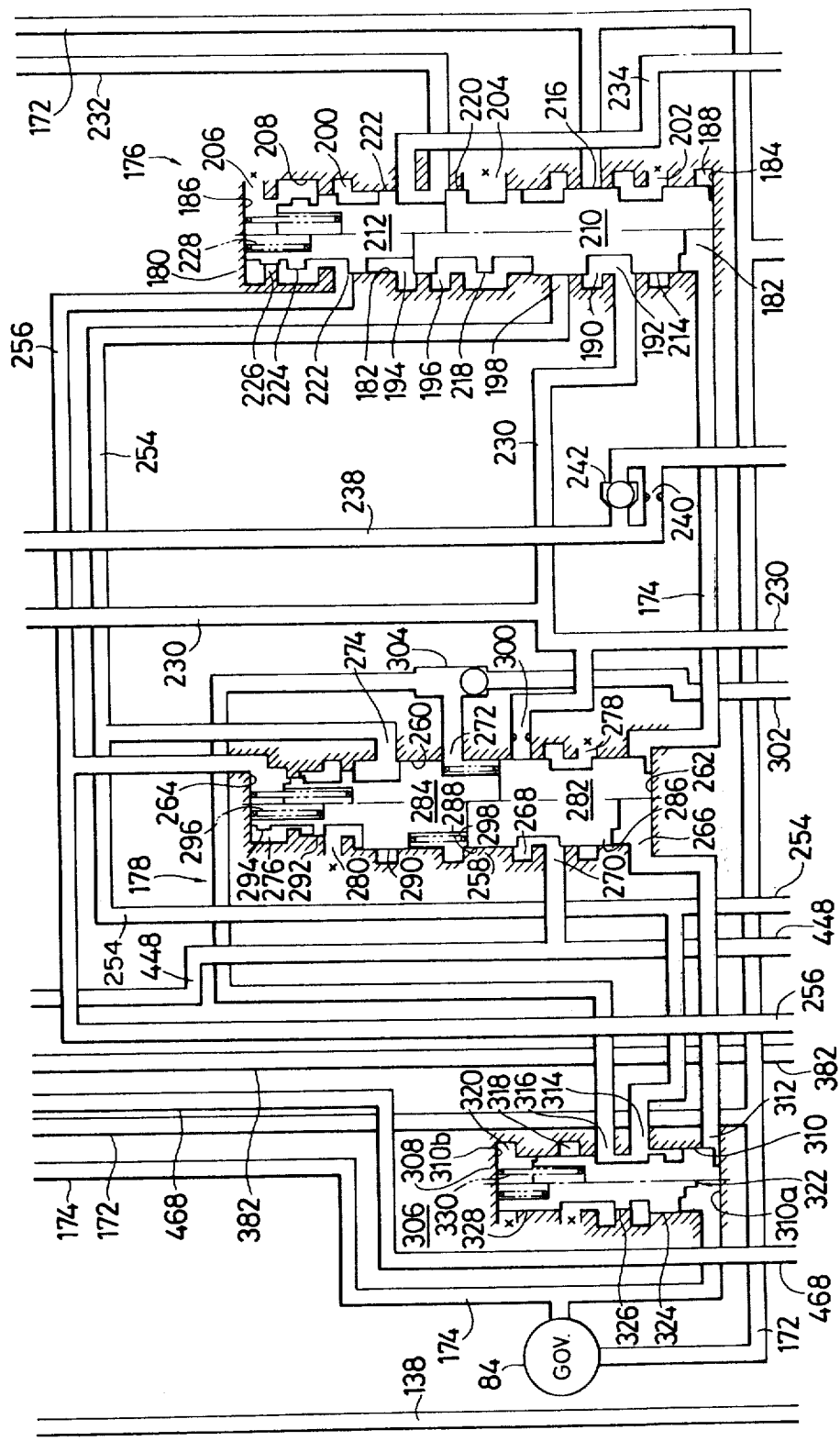
Figure 2C:
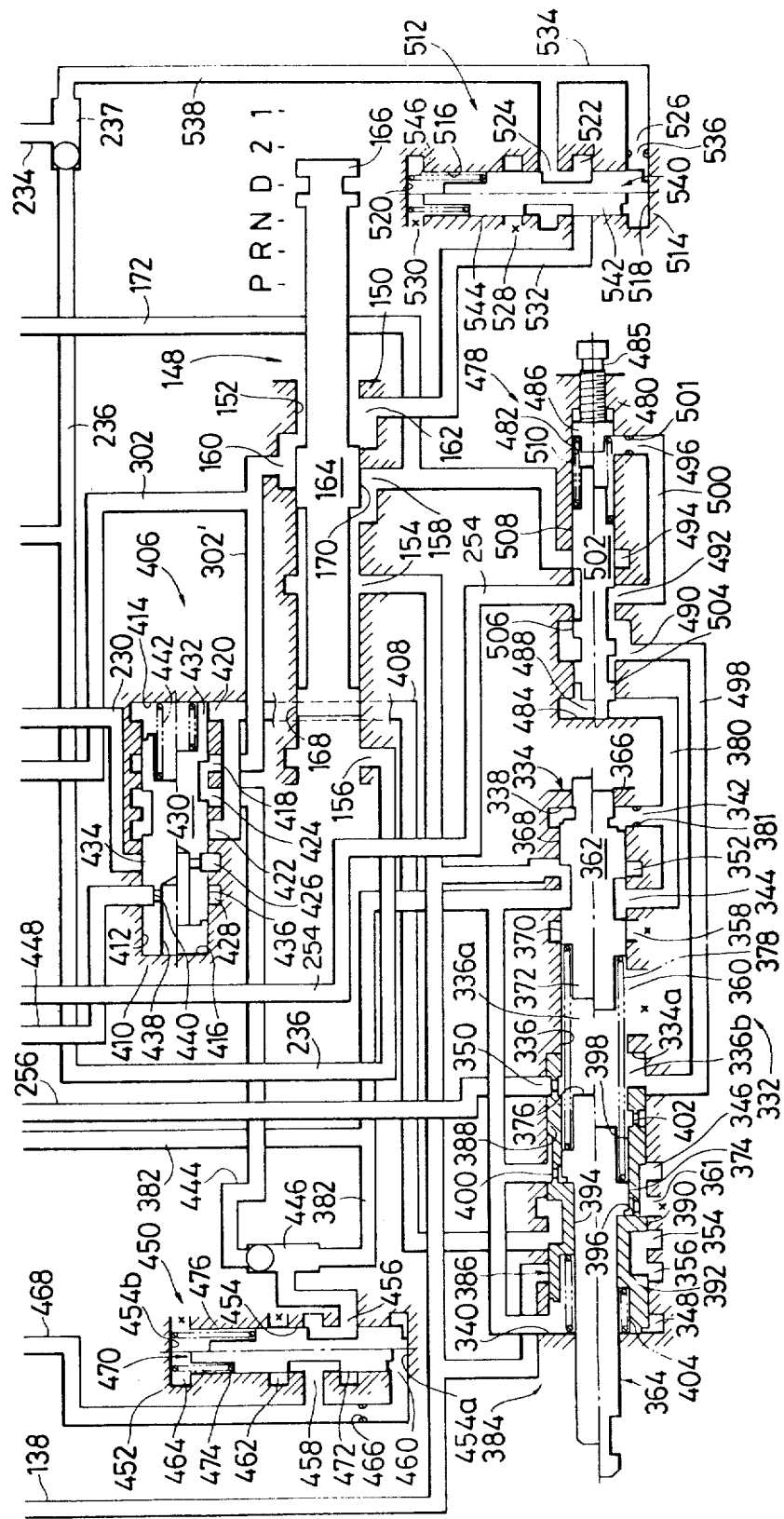

In accordance with the present invention, the clutches and brakes incorporated in the transmission mechanism thus constructed and arranged are actuated selectively by means of a hydraulic control system illustrated in FIGS. 2A–2C. It should however be borne in mind that the transmission mechanism hereinbefore described with reference to FIG. 1 is merely illustrative of a representative example of a transmission mechanism to which the hydraulic control system according to the present invention is applicable and that the hydraulic control system illustrated in FIGS. 2A–2C is compatible with any power transmission mechanism including clutches and brakes which are to be actuated in accordance with the schedules indicated in Table 1.

Hydraulic Control System—Arrangement

A hydraulic control system for a power transmission mechanism uses fluid under pressure supplied from the transmission oil pump assembly 36 which is driven by the pump impeller 16 (FIG. 1) of the torque converter 14 as previously discussed and which sucks in fluid from an oil sump through an oil strainer when the engine is in operation. Though not shown in the drawings, the oil sump and the oil strainer are installed below a transmission control valve assembly bolted or otherwise securely attached to the bottom of the transmission case. Throughout operation of the engine, the engine driven oil pump assembly 36 is delivering a fluid pressure which is variable with the revolution speed of the engine crankshaft driving the pump impeller of the torque converter 16. The fluid pressure delivered from the transmission oil pump assembly 36 is thus subject to fluctuations responsive to various operating conditions of the engine. In order to suppress such fluctuations in the pump pressure and to convert the pump pressure into a fluid pressure which is useful in the hydraulic control system for the power transmission mechanism, the hydraulic control system shown in FIGS. 2A-2C comprises a pressure regulator valve 94 which is adapted to develop a line pressure Pl which is continuously variable under some predetermined conditions and which are maintained substantially constant under other predetermined conditions as will be clarified as the description proceeds.

Pressure Regulator Valve 94

Similarly to most of the other control valves incorporated into the hydraulic control system to be described hereinafter, the pressure regulator valve 94 is built into the body structure of the transmission control valve assembly attached to the transmission case (not shown). Thus, the pressure regulator valve 94 comprises a wall portion 96 forming part of the body structure of the transmission control valve assembly. The wall portion 96 is formed with an elongated valve chamber 98 which is closed at both axial ends by internal wall surfaces 100 and 102 of the wall portion 96. The wall portion 96 is further formed with first and second line pressure ports 104 and 106, first and second modified pressure ports 108 and 110, a control port 112, a torque converter fluid supply port 114, and first and second drain ports 116 and 118. The first and second modified pressure ports 108 and 110 are located adjacent to the internal wall surfaces 100 and 102, respectively, at both axial ends of the valve chamber 98 and the first and second line pressure ports 104 and 106 are located intermediate between these modified pressure ports 108 and 110 in such a manner that the first line pressure port 104 is closer to the internal wall surface 100 adjacent to one axial end of the chamber 98 and the second line pressure port 106 is closer to the internal wall surface 102 adjacent to the other axial end of the chamber 98, as shown. The control port 112 is located between the first line pressure port 104 and the drain port 118 and the torque converter fluid supply port 114 is located between the second line pressure port 106 and the second modified pressure port 110. The first drain port 116 is located between the first line pressure port 104 and the first modified pressure port 108 and the second drain port 118 is located between the control port 112 and the second line pressure port 106. Within the valve chamber 98 is axially slidably mounted a valve spool 120 having first, second, third, fourth, fifth and sixth circumferential lands 122, 124, 126, 128, 130 and 132 which are arranged in this sequence away from the first modified pressure port 108 toward the second modified pressure port 110. The lands 122, 124, 126, 128, 130 and 132 are axially spaced apart from each other and, thus, have a circumferential groove between every adjacent two of them. The groove between the second and third circumferential lands 124 and 126 and the groove between the fifth and sixths circumferential lands 130 and 132 are constantly open to the first and second line pressure ports 104 and 106, respectively, irrespective of the axial position of the valve spool 120 within the valve chamber 98. The groove between the third and fourth circumferential lands 126 and 128 is constantly open to the control port 112 and the groove between the fourth and fifth circumferential lands 128 and 130 is constantly open to the second drain port 118 irrespective of the axial position of the valve spool 120 within the valve chamber 98. The first and third circumferential lands 122 and 126 are larger in cross sectional area than the second circumferential land 124. The fourth, fifth and sixth circumferential lands 128, 130 and 132 have substantially equal cross sectional areas which are larger than the cross sectional area of the third circumferential land 126. The second circumferential land 124 is smaller in cross sectional area than the third circumferential land 126 the cross sectional area of which is smaller than the cross sectional area of the fourth, fifth and sixth circumferential lands 128, 130 and 132 as above described. Between the second and third circumferential lands 124 and 126 and between the third and fourth circumferential lands 126 and 128 of the valve spool 120 are, thus, formed differential pressure acting areas which are effective to urge the valve spool 120 away from the internal wall surface 100 at one axial end of the valve chamber 98. The valve spool 120 further has an axial extension 134 axially projecting from the sixth circumferential land 132 of the valve spool 120 toward the internal wall surface 102 at the other axial end of the valve chamber 98 for limiting the axial movement of the valve spool 120 toward the internal wall surface 102. The first circumferential land 122 of the valve spool 120 may be constructed by a plunger which is formed separately of the remaining portion of the valve spool. Such a construction of the valve spool 120 will prove useful for adjusting or changing the cross sectional area to be acted upon by the fluid pressure in the port 108 and accordingly modifying the performance characteristics of the pressure regulator valve 94 because plunger can be readily replaced with another plunger having a different cross sectional area. A plunger having a cross sectional area smaller than the land 122 may be mounted within the valve chamber 98 by the use of a bushing designed to be compatible with such a plunger.

The valve spool 120 of the pressure regulator valve 94 thus constructed and arranged is axially movable within the valve chamber 98 between a first axial position having the first circumferential land 122 bearing at its outer axial end against one internal wall surface 100 of the wall portion 96 as indicated by the left half of the valve spool, and a second axial position having the above-mentioned axial extension 134 bearing at its leading end against the other internal wall surface 102 of the wall portion 96. The valve spool 120 is urged to move toward the first axial position thereby by means of a preloaded compression spring 136 which is seated at one end on the internal wall surface 102 of the wall portion 96 and at the other end on the axially outer annular end face of the sixth circumferential land 132.

The first line pressure port 104 constantly communicates through an orifice 137 with a main line pressure circuit 138 leading to the fluid discharge port of the transmission oil pump assembly 36. The second line pressure port 106 is in constant and direct communication with the main line pressure circuit 138. The drain ports 116 and 118 are open to the previously mentioned transmission oil pump. Into the control port 112 is to be introduced a line pressure when any one of the automatic and manual forward drive range positions "D", "2" and "1" is being selected, as will be described later. The torque converter fluid supply port 114 is in communication with the torque converter 14 through a torque converter fluid supply circuit 141 having an orifice 142 incorporated therein. The fluid discharged from the torque converter 14 is passed through an oil cooler 144 and is distributed past the valves 146 to various slidable members the transmission mechanism for lubricating purposes.

When the engine is in operation, a fluid pressure, or pump pressure is developed at the delivery port (not shown) of the transmission oil pump assembly 36 and is directed through the main line pressure circuit 138 to the first and second line pressure ports 104 and 106 of the pressure regulator valve 94 thus constructed and arranged. The fluid pressure thus developed in the first line pressure port 104 acts on the differential pressure acting area between the second and third circumferential lands 124 and 126 of the valve spool 120 and urges the valve spool 120 to move toward the second axial position thereof against the force of the spring 136, assuming that there is no fluid pressure developed in each of the first and second modified pressure ports 108 and 110 and the control port 112. The valve spool 120 being moved toward the second axial position thereof, there is a clearance formed between the second line pressure port 106 and the torque converter fluid supply port 114 past the sixth circumferential land 132 of the valve spool 120 so that the fluid in the main line pressure circuit 138 is allowed to leak into the torque converter fluid supply circuit 141 through the port 114, causing reduction in the fluid pressure in the main line pressure circuit 138. If the leakage of the fluid through the torque converter fluid supply port 114 is insufficient to stop the movement of the valve spool 120 being moved toward the second axial position thereof, there is a clearance further formed between the second line pressure port 106 and the drain port 118 past the fourth circumferential land 130 of the valve spool 120 and allows the fluid pressure in the second line pressure port 106 to flow through not only the torque converter fluid supply port 114 but also the drain port 118. When the force resulting from the fluid pressure acting on the differential pressure acting area between the lands 124 and 126 of the valve spool 120 is reduced to such a value as to be equally balanced by the force of the spring 136, the valve spool 120 movement within the valve chamber 98 and develops a substantially constant fluid pressure in the line pressure ports 104 and 106 and accordingly in the main line pressure circuit 138 in the absence of a fluid pressure in each of the ports 108, 110 and 112. If, there is a fluid pressure developed in each of the modified pressure ports 108 and 110, the fluid pressure acting on the differential pressure acting area between the lands 124 and 126 is opposed by not only the force of the spring 136 but a force substantially equal to the difference between the forces resulting from the fluid pressure acting on the respective outer end faces of the first and sixth circuumferential lands 122 and 132 of the valve spool 120 and is thereby made higher by a value corresponding such a difference by means of the valve spool 120 attempting to stay in an equilibrium axial position within the valve chamber 98. If a fluid pressure is developed further in the control port 112, the fluid pressure acts on the differential pressure acting area between the second and third circumferential lands 126 and 128 of the valve spool 120 and urges the valve spool 120 to move toward the second axial position thereof. The force urging the valve spool 120 to move toward the second axial position thereof by the fluid pressure developed in the first line pressure port 104 is reinforced by the force resulting from the fluid pressure thus developed in the control port 112 and is reduced by a value substantially equal to the force produced by the fluid pressure developed in the control port 112. The fluid pressure thus developed in the line pressure ports 104 and 106 of the pressure regulator valve 94 and accordingly in the main line pressure circuit 138 in the presence of a fluid pressure in each of the modified pressure ports 108 and 110 and in the presence or absence of a fluid pressure in the control port 112 is herein referred to as line pressure Pl and is variable with the fluid pressure to be developed in the first and second modified pressure ports 108 and 110. As will be described, the fluid pressure to be developed in the modified pressure ports 108 and 110 is normally a modified throttle pressure Pmt which is variable with the opening degree of the carburetor throttle valve (not shown) or, more exactly, with the torque output of the engine.

The line pressure Pl thus developed in the main line pressure circuit 138 is distributed to the fluid chambers of the previously described clutches 40 and 42, brake 68 and band servo unit 74 through a manually operated gear position selector valve 148.

Gear Position Selector Valve 148

The gear position selector valve 148 comprises a wall portion 150 forming part of the body structure of the transmission control valve body and formed with an elongated valve chamber 152 which is open at both axial ends. The wall portion 150 is further formed with a fluid inlet port 154 and first, second, third and fourth fluid outlet ports 156, 158, 160 and 162. The first and fourth fluid outlet ports 156 and 162 are located adjacent the open axial ends, respectively, of the valve chamber 152, and the fluid inlet port 154 is located intermediate between these ports 156 and 162. The second fluid outlet port 158 is located between the fluid inlet port 154 and the fourth fluid outlet port 162 adjacent to one open axial end of the valve chamber 152, and the third fluid outlet port 160 is located between the second and fourth fluid outlet ports 158 and 162 and laterally on the opposite side to the ports 158 and 162 across the valve chamber 152, as shown. A valve spool 164 having a circumferentially grooved yoke 166 at one axial end thereof is axially slidable in the valve chamber 152. The valve spool 164 has a first circumferential land 168 at the axial end of the valve spool opposite to the grooved yoke 166 and a second circumferential land 170 axially inwardly spaced apart from the yoke 166 and the first circumferential land 170 so as to form a circumferential groove between the first and second circumferential lands 168 and 170 and a circumferential groove between the yoke 166 and the second circumferential land 168. The valve spool 164 is axially movable through the valve chamber 152 between a parking gear position "P", a reverse drive gear position "R", a neutral gear position "N", an automatic forward drive range position "D", a manual second forward drive range position "2", and a manual first forward drive range position "1". The positions "P", "R", "N", "D", "2" and "1" are assumed by the valve spool 164 when the valve spool 164 is axially moved in a direction in which the yoke 166 is moved away from one open axial end of the valve chamber 152 adjacent the fourth fluid outlet port 162. When the valve spool 164 is in the parking gear position "P", the fluid inlet port 164 is closed by the second circumferential land 170 of the valve spool 164. The first fluid outlet port 156 is open to one open axial end of the valve chamber 152 through the groove between the first and second circumferential lands 168 and 170 and the second, third and fourth fluid outlet ports 158, 160 and 162 are jointly open to the other open axial end of the valve chamber 152 through the groove between the second circumferential lands 170 and the yoke 166. When the valve spool 164 is in the reverse drive gear position "R", communication is provided between the fluid inlet port 154 and the first fluid outlet port 156 through the groove between the lands 168 and 170 of the valve spool 164. Furthermore, the first land 168 of the valve spool 164 closes the open axial end of the valve chamber 152 adjacent to the first fluid outlet port 156 and the second circumferential land 170 of the valve spool 164 is located to isolate the fluid inlet port 154 from the second, third and fourth fluid outlet ports 158, 160 and 162, which are accordingly open to the other open axial end of the valve chamber 152. When the valve spool 164 is in the neutral gear position "N", the first circumferential land 168 of the valve spool 164 is located between the fluid inlet port 154 and the first fluid outlet port 156 and the second circumferential land 170 is located to isolate the fluid inlet port 154 from the second, third and fourth fluid outlet ports 158, 160 and 162. The first fluid outlet port 156 is open to one axial open end of the valve chamber 152, while the second, third and fourth fluid outlet ports 158, 160 and 162 are open to the other open axial end of the valve chamber 152 through the groove between the second circumferential land 170 and the yoke 166 of the valve spool 164. When the valve spool 164 is in the automatic forward drive range position "D" as shown in the drawing, the first circumferential land 168 is located between the fluid inlet port 154 and the first fluid outlet port 156, and the second circumferential land 170 is located to provide communication between the fluid inlet port 154 and the second fluid outlet port 158 through the groove between the first and second circumferential lands 168 and 170 and isolate the fluid inlet port 154 and the second fluid outlet port 158 from the third and fourth fluid outlet ports 160 and 162. The first fluid outlet port 156 is open to one axial open end of the valve chamber 152, and the third and fourth fluid outlet ports 160 and 162 are open to the other axial open end of the valve chamber 152 through the groove between the second circumferential land 170 and the yoke 166 of the valve spool 164. When the valve spool 164 is in the manual second forward drive range position "2", the first circumferential land 168 of the valve spool 164 is located between the fluid inlet port 154 and the first fluid outlet port 156 and the second circumferential land 170 of the spool 164 is located to provide communication between the fluid inlet port 154 and the second and third fluid outlet ports 158 and 160 through the groove between the first and second circumferential lands 168 and 170. The first fluid outlet port 156 is open to one open axial end of the valve chamber 152, and the fourth fluid outlet port 162 is open to the other open axial end of the valve chamber 152 through the groove between the second circumferential land 170 and the yoke 166 of the valve spool 164. When the valve spool 164 is in the manual first forward drive range position "1", the first circumferential land 168 is located between the fluid inlet port 154 and the first fluid outlet port 156 and the second circumferential land 170 is located to provide communication between the fluid inlet port 154 and the second, third and fourth fluid outlet ports 158, 160 and 162 through the groove between the first and second circumferential lands 168 and 170 of the valve spool 164.

In summary, the first fluid outlet port 156 is permitted to be open to the fluid inlet port 154 when the valve spool 164 is in the reverse drive gear position "R". The second fluid outlet port 158 is open to the fluid inlet port 154 when the valve spool 164 is in any of the automatic and manual forward drive range positions "D", "2" and "1". The third fluid outlet port 160 is open to the fluid inlet port 154 when the valve spool 164 is either in the manual second forward drive range position "2" or in the manual first forward drive range position "1". The fourth fluid outlet port 162 is permitted to be open to the fluid inlet port only when the valve spool 164 is in the manual first forward drive range position "1". The valve spool 164 has its grooved yoke connected to or otherwise engaged by the manually operated transmission gear shift lever having positions corresponding to the positions "P", "R", "N", "D", "2" and "1" of the valve spool 164 of the gear position selector valve 148. The fluid inlet port 154 is in constant communication with the main line pressure circuit 138 so that the line pressure Pl developed by the previously described pressure regulator valve 94 is constantly directed into the fluid inlet port 154 of the gear position selector valve 148 when the engine is in operation.

Of the fluid outlet ports 156, 158, 160 and 162 of the transmission gear position selector valve 148 thus constructed and arranged, the second fluid outlet port 158 to be in communication with the fluid inlet port 154 when the valve spool 164 of the gear position selector valve 148 is in any of the forward drive range positions "D", "2" and "1" as above mentioned is in constant communication with a forward drive clutch actuating fluid circuit 172 which terminates in the fluid chamber for the previously described forward drive clutch 42 and causes the clutch 42 to couple when the line pressure Pl is directed through the fluid inlet port 154 and second fluid outlet port 158 of the gear position selector valve 148 to the fluid circuit 172. The forward drive clutch actuating fluid circuit 172 is further in constant communication with the secondary governor valve 86' (FIG. 1) of the previously described transmission governor assembly 84 mounted on and thus rotatable with the transmission output shaft about the center axis of the shaft. The line pressure Pl developed in the forward drive clutch actuating fluid circuit 172 is thus directed to the secondary governor valve of the transmission governor assembly 84 and acts on a weighted valve spool (not shown) incorporated in the secondary governor valve. When the transmission output shaft is being driven to rotate in the forward direction about the center axis thereof, the weighted valve spool of the secondary governor valve is subjected to a centrifugal force which is variable with the angular velocity and accordingly the revolution speed of the transmission output shaft and the secondary governor valve develops a fluid pressure which is continuously variable with the revolution speed of the transmission outlet shaft being driven to rotate in the forward direction. The fluid pressure thus developed in the secondary governor valve is passed to the primary governor valve 86 (FIG. 1). The primary governor valve is also arranged with a weighted valve spool to be subjected to a centrifugal force when the transmission output shaft is being driven for rotation about the center axis thereof. The centrifugal force thus created in the weighted valve spool of the primary governor valve is opposed by a preloaded spring also incorporated into the primary governor valve and is forced to stay in situ and holds the primary governor valve closed until the centrifugal force produced in the valve spool and accordingly the revolution speed of the transmission output shaft are increased to predetermined values. When the revolution speed of the transmission output shaft reaches such a predetermined value, the valve spool of the primary governor valve allows the valve to open so that the fluid pressure which has been directed from the secondary governor valve to the primary governor valve is delivered from the primary governor valve. The fluid pressure which is delivered from the primary governor valve of the transmission governor assembly 84 is herein referred to as governor pressure and denoted by Pg. As will have been understood from the above description, the governor pressure Pg remains at a zero level when the revolution speed of the transmission output shaft is lower than a predetermined value but is continuously variable with the revolution speed of the transmission output shaft when the revolution speed is higher than the predetermined value. The revolution speed of the transmission output shaft being substantially proportional to the road speed of a vehicle, the governor pressure Pg is continuously variable with the road speed of the vehicle when the vehicle road speed is higher than a predetermined value. The construction and arrangement of a transmission governor assembly per se is well known in the art and is herein illustrated only schematically. In the hydraulic control system embodying the present invention, the governor pressure Pg is directed through a governor pressure circuit 174 to transmission gear shift control valves which include a first-second gear shift valve 176 and a second-third gear shift valve 178.

First-Second Gear Shift Valve 176

The first-second gear shift valve 176 comprises a wall portion 180 forming part of the body structure of the transmission control valve assembly. The wall portion 180 is formed with an elongated valve chamber 182 which is closed at both axial ends by internal wall surfaces 184 and 186 of the wall portion 180. The wall portion 180 is further formed with a governor pressure port 188, first line pressure inlet and outlet ports 190 and 192, second line pressure inlet and outlet ports 194 and 196, a modulated throttle pressure port 198, a kickdown port 200, first, second and third drain ports 202, 204 and 206, and an internal annular groove 208. The governor pressure port 188 is located adjacent to the internal wall surface 184 at one axial end of the valve chamber 182, and the third drain port 206 is located adjacent to the internal wall surface 186 at the other axial end of the valve chamber 182. The first line pressure outlet and inlet ports 192 and 190 are arranged this sequence away from the governor pressure port 188 with the first drain port 202 located between the governor pressure port and the first line pressure outlet port 192. The modulated throttle pressure port 198 is located between the first line pressure inlet port 190 and the second line pressure outlet port 196 with the second drain port 204 located between the modulated throttle pressure port 198 and the brake actuating pressure outlet port 196. The kickdown port 200 and the annular groove 208 are located between the second line pressure inlet port 194 and the third drain port 206 in such a manner that the annular projection which the annular projection which the wall portion 180 has formed between the kickdown port 200 and the annular groove 208 is slightly larger in inside diameter than the annular projection which the wall portion has formed between the third drain port 206 and the annular groove 208.

Within the valve chamber 182 thus formed in the wall portion 180 are axially slidably mounted first and second valve spools 210 and 212 which are arranged axially in series with each other and located closer to the governor pressure port 188 and the third drain port 206, respectively, as shown. The first valve spool 210 has first, second, third and fourth circumferential lands 214, 216, 218 and 220 which are axially spaced apart from each other so as to form a circumferential groove between every adjacent two of them. Likewise, the second valve spool 212 has first, second and third circumferential lands 222, 224 and 226 which are axially spaced apart from each other so as to form a circumferential groove between the first and second circumferential lands 222 and 224 and a circumferential groove between the second and third circumferential lands 224 and 226. When the first and second valve spools 210 and 212 are axially held together as illustrated, there is further formed a circumferential groove between the fourth circumferential land 220 of the first valve spool 210 and the first circumferential land 222 of the second valve spool 212, which is thus formed with an axial extension projecting from the land 222 of the valve spool 212 toward the land 220 of the first valve spool 210. The first and second circumferential lands 214 and 216 of the first valve spool 210 have substantially equal cross sectional areas. The third circumferential land 218 of the first valve spool 210 is slightly smaller in cross sectional area than the first and second circumferential lands 214 and 216 and slightly larger in cross sectional area than the fourth circumferential land 220 of the valve spool 210. Between the second and third circumferential lands 216 and 218 of the first valve spool 210 is therefore formed a differential pressure acting area which is effective to urge the valve spool 210 toward the internal wall surface 184 adjacent the governor pressure port 188 when a fluid pressure acts on the differential pressure acting area. The first, second and third circumferential lands 222, 224 and 226 of the second valve spool 212 are larger in cross sectional area than each other in this sequence, the cross sectional area of the second circumferential land 224 being substantially equal to the cross sectional area encircled by the annular projection between the kickdown port 200 and the annular groove 208 in the wall portion 180 and the cross sectional area of the third circumferential land 226 being substantially equal to the cross sectional area encircled by the annular projection between the annular groove 208 and the third drain port 206 in the wall portion 180. Between the first and second circumferential lands 222 and 224 and between the second and third circumferential lands 224 and 226 of the second valve spool 212 are therefore respectively formed differential pressure acting areas each of which is effective to urge the valve spool 212 to move away from the internal wall surface 186 adjacent to the third drain port 206 when a fluid pressure acts on the differential pressure acting area. The fourth circumferential land 220 of the first valve spool 210 may be substantially equal to or slightly larger in cross sectional area than the first circumferential land 222 of the second valve spool 212. The second valve spool 212 is further formed with an axial blind bore which is open toward the above mentioned internal wall surface 186 of the wall portion 180 and which has an internal end face at the bottom of the bore as will be seen from the drawing.

The groove between the first and second circumferential lands 214 and 216 of the first valve spool 210 is constantly open to the first line pressure outlet port 192 irrespective of the axial position of the valve spool 210 within the valve chamber 182 and is open selectively to the first line pressure inlet port 190 or to the first drain port 202 depending upon the axial position of the valve spool 210 within the valve chamber 182. The groove between the second and third circumferential lands 216 and 218 of the first valve spool 210 is open selectively to the modulated throttle pressure port 198 or to the second drain port 204 depending upon the axial position of the valve spool 210 within the valve chamber 182. The groove between the third and fourth circumferential lands 218 and 220 of the first valve spool 210 is constantly open to the second drain port 204 irrespective of the axial position of the first valve spool 210 within the valve chamber 182 and is communicable with the second line pressure outlet port 196 depending upon the axial position of the valve spool 210 within the valve chamber 182. The groove to be formed between the fourth circumferential land 220 of the first valve spool 210 and the first circumferential land 222 of the second valve spool 212 when the first and second valve spools 210 and 212 are axially held together is constantly open to the second line pressure inlet port 194 irrespective of the axial position of the valve spools 210 and 212 held together within the valve chamber 182 and is communicable with the second line pressure outlet port 196 depending upon the axial position of the valve spool 210 within the valve chamber 182. The groove between the first and second circumferential lands 222 and 224 of the second valve spool 212 is constantly open to the kickdown port 200 irrespective of the axial position of the second valve spool 212 within the valve chamber 182 and is communicable with the annular groove 208 in the wall portion 180 depending upon the axial position of the second valve spool 212 within the valve chamber 182. On the other hand, the groove between the second and third circumferential lands 224 and 226 of the second valve spool 212 is constantly open to the annular groove 208 in the wall portion 180 irrespective of the axial position of the second valve spool 212 within the valve chamber 182 and is communicable with the third drain port 206 depending upon the axial position of the second valve spool 212 within the valve chamber 182. Thus, the first valve spool 210 is axially movable within the valve chamber 182 between a first axial position providing communication between the first line pressure outlet port 192 and the first drain port 202 through the groove between the first and second circumferential lands 214 and 216 and closing the first line pressure inlet port 190 by the second circumferential land 216 thereof as indicated by the right half of the valve spool 210, and a second axial position providing communication between the first line pressure inlet and outlet ports 190 and 192 through the groove between the first and second circumferential lands 214 and 216 thereof and communication between the second line pressure outlet port 196 and the second drain port 204 through the third and fourth circumferential lands 218 and 220 thereof and closing the first drain port 202 by the first circumferential land 214 and the modulated throttle pressure port 198 by the second circumferential land 216 thereof as indicated by the left half of the valve spool 210. When the first valve spool 210 is in the first axial position thereof, the second line pressure outlet port 196 is isolated from the second drain port 204 by the fourth circumferential land 220 of the valve spool 210 and communication is further provided between the second line pressure inlet and outlet ports 194 and 196 through the groove between the fourth circumferential land 220 of the first spool valve 210 and the first circumferential land 222 of the second valve spool 212 held in engagement with the first valve spool 210 or through a space formed between the first and second valve spools 210 and 212 when the valve spools are axially spaced apart from each other. When first valve spool 210 is in the second axial position thereof, the communication between the second line pressure inlet and outlet ports 194 and 196 is blocked by the fourth circumferential land 220 of the valve spool 210. The first valve spool 210 in the first axial position thereof bears at its axial end adjacent the first circumferential land 214 thereof against the internal wall surface 184 at one axial end of the valve chamber 182 so that the second valve spool 212 is movable between a first axial position held in engagement with the first valve spool 210 thus positioned, and a second axial position bearing at its end adjacent the third circumferential land 226 thereof against the internal wall surface 186 at the other axial end of the valve chamber 182. The first valve spool 210 is permitted to assume the second axial position thereof only when the second valve spool 212 is in the second axial position thereof as indicated by the left half of the valve spool 212. When the second valve spool 212 is in the first axial position thereof with the first valve spool 210 also held in the first axial position thereof as indicated by the respective right halves of the valve spools 210 and 212, the annular groove 208 in the wall portion 180 is isolated from the kickdown pressure port 200 by the second circumferential land 224 of the valve spool 212 and is open to the third drain port 206 with the second circumferential land 224 located within the annular groove 208. When the second valve spool 212 is in the second axial position thereof, communication is provided between the kickdown port 200 and the annular groove 208 in the wall portion 180 through the groove between the first and second circumferential lands 222 and 224 of the valve spool 212 with the second circumferential land 224 located within the annular groove 208 and the annular groove 208 is isolated from the third drain port 206. The first valve spool 210 is urged to move toward the axial position thereof by means of a preloaded helical compression spring 228 which is shown seated at one end on the previously mentioned internal end face in the second valve spool 212 and at the other end on the internal wall surface 186 adjacent to the third drain port 206. When the first and second valve spools 210 and 212 are axially held together, the spring 228 is effective to urge both of the valve spools 210 and 212 to move toward their respective first axial positions within the valve chamber 182.

In the brake actuating pressure inlet port 194 is to be developed a fluid pressure only when shift is made to the reverse drive gear position and the manual first forward drive range positions. In the modulated throttle pressure port 198 is to be developed a fluid pressure variable with the previously mentioned throttle pressure Pt under predetermined operating conditions of the engine, as will be described in more detail. Into the kickdown port 200 is to be introduced a fluid pressure only when the accelerator pedal is depressed a distance greater than a predetermined value under forward drive range conditions, as will also be described in more detail. Under normal forward drive conditions with the automatic forward drive range position "D" or the manual second forward drive range position "2" selected in the transmission system and in the absence of a fluid pressure in the modulated throttle pressure port 198, the first and second valve spools 210 and 212 of the first-second gear shift valve 176 are subjected only to the force of the spring 228 and the force resulting from the governor pressure Pg acting on the end face of the first circumferential land 214 of the first valve spool 210 from the governor pressure port 188. If, under these conditions, the governor pressure Pg lower than a predetermined value or, in other words, the vehicle speed is lower than a predetermined value, the force of the governor pressure thus acting on the first valve spool 210 is overcome by the opposing force of the spring 228 so that the first and second valve spools 210 and 212 are held in the respective axial positions thereof and are axially held together. If a fluid pressure is developed in the second line pressure outlet port 196, the first and second valve spools 210 and 212 are acted upon at their respective end face adjacent to the port 196 by the fluid pressure thus developed. If therefore follows that the first valve spool 210 is maintained in the first axial position thereof by the force produced by the fluid pressure urging the valve spool 210 toward the first axial position and the second valve spool 212 is forced to move away from the first valve spool 210 into the second axial position thereof against the force of the spring 228. If, in this instance, the engine is operating under predetermined conditions, there is another fluid pressure developed in the modulated throttle pressure port 198. The fluid pressure in the port 198 acts on the differential pressure acting area between the second and third circumferential lands 216 and 218 of the first valve spool 210, which is, as a consequence, urged to stay in the first axial position thereof not only by the force of the spring 228 but the force thus exerted on the valve spool 210 by the fluid pressure developed in the modified throttle pressure port 198. The pressure to be developed in the second line pressure inlet port 194 is the line pressure Pl or a fluid pressure slightly lower than the line pressure as will be described. If the vehicle speed and accordingly the governor pressure Pg developed in the governor pressure port 188 is higher than predetermined values with the automatic forward drive range position "D" or the manual forward drive range position "2" in play in the transmission system, then the force exerted on the first valve spool 210 by the governor pressure Pg in the governor pressure port 188 of the first-second gear shift valve overcomes the opposing force of the spring 228 or the sum of the force of the spring 228 and the force resulting from the fluid pressure in the modulated throttle pressure port 198 in the absence of a fluid pressure in the second line pressure inlet port 194 so that both of the first and second valve spools 210 and 212 are held in their respective second axial positions. If, under these conditions, the accelerator pedal is depressed a distance greater than a predetermined value, there is a force produced by the fluid pressure acting on the differential pressure acting area between the first and second circumferential lands 222 and 224 and the differential pressure acting area between the second and third circumferential lands 224 and 226 of the second valve spool 212. The force thus exerted on the second valve spool 212 is combined with the force of the spring 228 and causes the first and second valve spools 210 and 212 into their respective first axial positions against the force produced by the governor pressure Pg acting on the first valve spool 210.

The governor pressure port 188 is in constant communication with the previously mentioned governor pressure circuit 174. The first line pressure inlet port 190 is in constant communication with the second fluid outlet port 158 of the manually operated gear position selector valve 148 and accordingly with the previously described forward drive clutch actuating fluid circuit 172. The first line pressure outlet port 192 communicates with the second-third gear shift valve 178 to be described later through a band actuating fluid circuit 230 leading to the brake-apply fluid chamber 76 of the band servo unit 74. The second line pressure outlet port 196 is in constant communication through a low-and-reverse brake actuating fluid circuit 232 with the fluid chamber (not shown) for the previously described low-and-reverse brake 68 which is adapted to be actuated the reverse drive gear position "R" and the first forward speed gear ratio in the manual first forward drive range "1" is to be selected in the power transmission mechanism as previously described. On the other hand, the second pressure inlet port 194 of the first-second gear shift valve 176 is open to a fluid passageway 234 leading from a high-and-reverse clutch actuating fluid circuit 236 across a two-inlet shuttle valve 238 having one inlet port open to the clutch actuating fluid circuit 236 and an outlet port open to the fluid passageway 234 leading to the second pressure outlet port 196 of the first-second gear shift valve 176. The high-and-reverse clutch actuating fluid circuit 236 leads from the first fluid outlet port 156 of the previously described transmission gear position selector valve 148 to the fluid chamber (not shown) for the high-and-reverse clutch 40 which is adapted to be actuated when the reverse drive gear position "R" or the third gear ratio ($D_3$) in the automatic forward drive range is to be selected in the power transmission mechanism as previously described. The high-and-reverse clutch actuating fluid circuit 238 is provided with one-way flow restriction means composed of a parallel combination of an orifice 240 and a one-way check valve 242 which prevents a flow of fluid therethrough when the fluid attempt to flow from the first fluid outlet port 156 of the gear transmission gear position selector valve 148 toward the fluid chamber for the high-and-reverse clutch 40 but which allows fluid to flow in the opposite direction therethrough. Likewise, the above mentioned band actuating fluid circuit 230 is provided with one-way flow restricting means comprising a parallel combination of an orifice 244 and a one-way check valve 246 which allows fluid to be passed therethrough backwardly from the brake-apply fluid chamber 76 of the band servo unit 74 but which prevents fluid from flowing toward the brake-apply fluid chamber 76. The band actuating fluid circuit 230 is shown to be further provided with an orifice 248 between the brake-apply chamber 76 of the band servo unit 74 and the above described one-way flow restricting means provided for the fluid circuit 230. One-way flow restricting means is also provided for the previously described forward drive clutch actuating fluid circuit 172 leading to the forward drive clutch 42, comprising an orifice 250 shunted by a one-way check valve 252 which is adapted to pass fluid backwardly from the fluid chamber (not shown) for the forward drive clutch 42 toward the second fluid outlet port 158 of the transmission gear position selector valve 148 but prevent fluid from flowing through the check valve 252 in the opposite direction.

The modulated throttle pressure port 198 and the kickdown port 200 of the first-second gear shift valve 176 above described are in constant communication with a modulated pressure circuit 254 and a kickdown pressure circuit 256, respectively, which lead to the previously mentioned second-third gear shift valve 178.

Second-Third Gear Shift Valve 178

The second-third gear shift valve 178 comprises a wall portion 258 forming part of the body structure of the transmission control valve body. The wall portion 258 is formed with an elongated valve chamber 260 which is closed at both axial ends by internal wall surfaces 262 and 264 of the wall portion 258. The wall portion 258 is further formed with a governor pressure port 266, line pressure inlet and outlet ports 268 and 270, a control port 272, a modulated throttle pressure port 274, a kickdown port 276, and first and second drain ports 278 and 280. The governor pressure port 266 is located adjacent to the internal wall surface 262 at one axial end of the valve chamber 260 and the kickdown port 276 is located adjacent to the internal wall surface 264 at the other axial end of the valve chamber 260. The line pressure outlet and inlet ports 270 and 268, the control port 272 and the modulated throttle pressure port 274 are arranged in this sequence away from the governor pressure port 266 toward the kickdown port 276 with the first drain port 278 located between the governor pressure port 266 and the line pressure outlet port 270 and with the second drain port 280 located between the modulated throttle pressure port 274 and the kickdown port 276, as shown. The annular projection which the wall portion 258 has formed between the modulated throttle pressure port 274 and the second drain port 280 is slightly larger in inside diameter than the annular projection which the wall portion 258 has formed between the second drain port 280 and the kickdown port 276.

Within the valve chamber 260 thus formed are axially slidably mounted first and second valve spools 282 and 284 which are arranged axially in series with each other and located closer to the governor pressure port 266 and the kickdown port 276, respectively, as shown. The first valve spool 282 has first and second lands 286 and 288 which are axially spaced apart from each other to form a circumferential groove therebetween and, likewise, the second valve spool 284 had first, second and third circumferential lands 290, 292 and 294 which are axially spaced apart from each other and which is thus formed with a circumferential groove between the first and second circumferential lands 290 and 292 and a circumferential groove between the second the third circumferential lands 292 and 294. When the first and second valve spools 282 and 284 are axially held together as illustrated, there is further formed a circumferential groove between the second circumferential land 288 of the first valve spool 282 and the first circumferential land 290 of the second valve spool 284, which is thus formed with an axial extension projecting from the first circumferential land 290 toward the second circumferential land 288 of the first valve spool 282. The first and second circumferential lands 286 and 288 of the first valve spool 282 have substantially equal cross sectional areas which are slightly larger than the cross sectional area of the first circumferential land 290 of the second valve spool 284. The first, second and third circumferential lands 290, 292 and 294 of the second valve spool 284 are larger in cross sectional area than each other this sequence, the cross sectional area of the second circumferential land 292 being substantially equal to the cross sectional area encircled by the annular projection between the modulated throttle pressure port 274 and the second drain port 280 and the cross sectional area of the third circumferential land 294 being substantially equal to the cross sectional area encircled by the annular projection between the second drain port 280 and the kickdown port 276. Thus, there are a differential pressure acting area formed between the first and second circumferential lands 290 and 292 and a differential pressure acting area between the second and third circumferential lands 292 and 294 of the second valve spool 284 so that the valve spool 284 is urged to move away from the internal wall surface 264 adjacent to the kickdown port 276 when a fluid pressure acts on each of these differential pressure acting areas. The second valve spool 284 is further formed with an axial blind bore which is open toward the internal wall surface 264 adjacent to the kickdown port 276 and which has an internal end face at the bottom of the axial blind bore as will be seen from the drawing.

The groove between the lands 286 and 288 of the first valve spool 282 is constantly open to the line pressure outlet port 270 irrespective of the axial position of the valve spool 282 within the valve chamber 260 and is open selectively to the second line pressure inlet port 268 or the first drain port 278 depending upon the axial position of the valve chamber 260. The groove to be formed between the second circumferential land 288 of the first valve spool 282 and the first circumferential land 290 of the second valve spool 284 when the first and second valve spools 282 and 284 are axially held together is constantly open to the control port 272 irrespective of the axial position of the valve spools 282 and 284. The groove between the first and second circumferential lands 290 and 292 of the second valve spool 284 is communicable with the modulated throttle pressure port 274 or the second drain port 280 past the second circumferential land 292 depending upon the axial position of the valve spool 284 within the valve chamber 260. The groove formed between the second and third circumferential lands 292 and 294 of the second valve spool 284 is communicable with the kickdown port 276 or the second drain port 280 depending upon the axial position of the valve spool 284 within the valve chamber 260. Thus, the first valve spool 282 of the second-third gear shift valve 178 is axially movable within the valve chamber 260 between a first axial position providing communication between the line pressure outlet port 270 and the first drain port 280 through the groove between the lands 286 and 288 of the valve spool 282 and closing the line pressure inlet port 268 by the second circumferential land 288 of the valve spool 282 as indicated by the right half of the valve spool 282, and a second axial position closing the first drain port 278 by the first circumferential land 286 of the valve spool 282 and providing communication between the line pressure inlet and outlet ports 268 and 270 through the groove between the lands 286 and 288 of the valve spool 282 as indicated by the left half of the valve spool 282. The first valve spool 282 held in the first axial position bears at its axial end adjacent the first circumferential land 286 thereof against the internal wall surface 262 at one axial end of the valve chamber 260. The second valve spool 284 is movable within the valve chamber 260 between a first axial position held in engagement with the first valve spool 282 thus in the first axial position thereof, and a second axial position bearing at its axial end adjacent the third circumferential land 294 thereof against the internal wall surface 264 at the other axial end of the valve chamber 260. The first valve spool 282 is permitted to assume the second axial position thereof when the second valve spool 284 is in the second axial position thereof as indicated by the left half of the valve spool 284. When the second valve spool 284 is in the second axial position thereof with the first valve spool 282 held in the second axial position thereof as indicated by the respective left halves of the valve spools 282 and 284, the modulated throttle pressure port 274 is closed by the first circumferential land 290 and the kickdown port 276 is isolated from the second drain port 280 by the second circumferential land 292 of the valve spool 284. The second valve spool 284 is urged to move away from the second position thereof by means of a first preloaded helical compression spring 296 which is shown seated at one end on the internal wall surface 264 adjacent to the kickdown port 276 and at the other end on the previously mentioned internal end face formed at the bottom of the axial blind bore in the valve spool 284. Between the first and second valve spools 282 and 284 is provided a second preloaded helical compression spring 298 which is seated at one end on the end face of the second circumferential land 288 of the first valve spool 282 and at the other end on the axially on one end face of the first circumferential land 290 of the second valve spool 284 as shown, urging the first and second valve spools 282 and 284 to axially move away from each other.

The governor port 266 is in constant communication with the governor pressure circuit 174. The line pressure inlet port 268 is in constant communication with the previously described band actuating fluid circuit 230 through an orifice 300. The control port 272 is communicable with the third fluid outlet port 160 of the transmission gear position selector valve 148 through a fluid circuit 302 across a two-inlet shuttle valve 304 having one inlet port communicating with the third fluid outlet port 160 of the gear position selector valve 148 and an outlet port communicating with the control port 272 of the second-third gear shift valve 178. The modulated throttle pressure port 274 is in constant communication with the previously mentioned modulated pressure circuit 254, and the kickdown port 276 is in constant communication with the previously mentioned kickdown circuit 256. The drain port 278 and 280 are open to the transmission oil sump.

In the control port 272 of the second-third gear shift valve 178 thus constructed and arranged is to be developed a line pressure Pl or a modulated throttle pressure Pdt depending upon the operating conditions of the engine when any of the automatic and manual forward drive range conditions "D", "2" and "1" is selected in the power transmission system as will be described. The fluid pressure thus developed in the control port 272 acts on the end face of the second circumferential land 288 of the first valve spool 282 and urges the valve spool 282 to move toward the first axial position thereof against the force of the governor pressure Pg acting on the end face of the first circumferential land 286 of the first valve spool 282 from the governor pressure port 266. If, in this instance, the vehicle speed and accordingly the governor pressure Pg are less than predetermined values, the force resulting from the governor pressure Pg urging the first valve spool 282 toward the second axial position thereof is overcome by the force of the second spring 298 and the force resulting from the fluid pressure acting on the end face of the second circumferential land 288 of the first valve spool 282 from the control port 272 with the result that the first valve spool 282 is held in the first axial position thereof. The fluid pressure developed in the control port 272 also acts on the respective end faces of the first circumferential land 290 and the adjacent axial extension of the second valve spool 284 and urges the second valve spool 284 to move toward the second axial position thereof. If, in this instance, the fluid pressure developed in the control port 272 is the modulated throttle pressure Pdt, the same fluid pressure acts on the differential pressure acting area between the first and second circumferential lands 290 and 292 of second valve spool 284. The force resulting from the modulated throttle pressure Pdt thus acting on the differential pressure acting area of the second valve spool 284 is smaller than the force resulting from the same fluid pressure acting on the respective end faces of the first circumferential land 290 and the adjacent axial extension of the second valve spool 284 and is overcome by the latter. As a consequence, the modulated throttle pressure Pdt developed in the control port 272 is effective to move the second valve spool 284 toward the second axial position thereof. If, on the other hand, the fluid pressure developed in the control port 272 is the line pressure Pl, the second valve spool 284 is held in the second axial position thereof irrespective of the presence or absence of a fluid pressure in the modulated throttle port 274 in the absence of a fluid pressure in the kickdown port 276 by the force of the second spring 298 and the force resulting from the line pressure acting on the valve spool 284 from the control port 272. When the vehicle speed and accordingly the governor pressure Pg are higher than predetermined values, the force resulting from the governor pressure acting on the end face of the first circumferential land 286 of the first valve spool 282 overcomes the opposing forces exerted on the first and second valve spools 282 and 284, which are consequently held in the respective second axial position thereof. When a fluid pressure is developed in the kickdown port 276, the fluid pressure acts on the second valve spool 284 from the kickdown port 276 and overcomes the forces urging the second valve spool 284 to stay in the second axial position thereof or the forces urging the first and second valve spools 282 and 284 to stay in their respective second axial positions, causing the second valve spool 284 to move into the first axial position thereof engaging the first valve spool or causing the first and second valve spools 282 and 284 to move together into the respective first axial position thereof. The modulated throttle pressure Pdt to be developed in the control port 272 is directed thereto by way of a third-second downshift valve 306.

Third-Second Downshift Valve 306

The third-second downshift valve 306 comprises a wall portion 308 forming part of the body structure of the transmission control valve assembly formed with an elongated valve chamber 310 which is closed at both axial ends by internal wall surfaces 310a and 310b of the wall portion 308. The wall portion 308 is further formed with a governor pressure port 312, a modulated throttle pressure inlet port 314, a modulated throttle pressure outlet port 316, and first and second drain ports 318 and 320. The ports 312, 314, 316, 318 and 320 are arranged in this sequence away from the internal wall surface 310a at one axial end of the valve chamber 310 with the governor pressure port 312 and the second drain port 320 located adjacent to the internal wall surfaces 310a and 310b, respectively, at both axial ends of the valve chamber 310. Within the valve chamber 310 thus formed is axially slidably mounted a valve spool 322 having first, second and third circumferential lands 324, 326 and 328 which are arranged in this sequence away from the governor pressure port 312. The lands 324, 326 and 328 are axially spaced apart from each other and have formed a circumferential groove between the first and second circumferential lands 324 and 326 and a circumferential groove between the second and third circumferential lands 326 and 328, as shown. The groove between the first and second circumferential lands 324 and 326 is constantly open to the modulated throttle pressure inlet port 314 irrespective of the axial position of the valve spool 322 within the valve chamber 310 and is communicable with the modulated throttle pressure outlet port 316 depending upon the axial position of the valve spool 322 within the valve chamber 310. The groove between the second and third circumferential lands 326 and 328 is open selectively to the modulated throttle pressure outlet port 316 or th the first drain port 318. The first circumferential land 324 is larger in cross sectional area than the second and third circumferential lands 326 and 328 which have substantially equal cross sectional areas, the lands 324 and 326 thus having a differential pressure acting area formed therebetween. The valve spool 322 is thus axially movable within the valve chamber 310 between a first axial position providing communication between the modulated throttle pressure inlet and outlet ports 314 and 316 through the groove between the second and third circumferential lands 326 and 328 and closing the first drain port 318 by the third circumferential land 328 as indicated by the right half of the valve spool 322, and a second axial position isolating the modulated throttle pressure inlet and outlet ports 314 and 316 from each other by the second circumferential land 326 and providing communication between the modulated throttle pressure outlet port 316 and the first drain port 318 through the groove between the second and third circumferential lands 326 and 328 as indicated by the left half of the valve spool 322. The third circumferential land 328 of the valve spool 322 is formed with an axial blind bore which is open toward the internal wall surface 310b adjacent to the second drain port 320 and which has an internal end face at the bottom of the blind bore as shown. The valve spool 322 thus constructed is urged to move toward the first axial position thereof by means of a preloaded helical compression spring 330 which is shown seated at one end on the internal wall surface 310b adjacent to the second drain port 320 and at the other end on the above mentioned internal end face at the bottom of the blind bore in the third circumferential land 328 of the valve spool 322. The governor pressure port 312 is in constant communication with the groove pressure circuit 174, and the modulated throttle pressure inlet port 314 is in constant communication with a modulated throttle pressure circuit 254. The modulated throttle pressure outlet port 316 is in constant communication with the other inlet port of the previously mentioned shuttle valve 304 having its outlet port in constant communication with the control port 272 of the above described second-third gear shift valve 178. The first and second drain ports 318 and 320 are open to the transmission oil sump. The valve spool 322 of the third-second downshift valve 306 thus constructed and arranged is held in the first axial position thereof when the vehicle speed and accordingly the governor pressure Pg to be developed in the governor port 312 are lower than predetermined values which are dictated by the spring 330 and the differential pressure acting area between the first and second circumferential lands 324 and 326 of the valve spool 322. If there is a fluid pressure developed in the modulated throttle pressure circuit 254 under these conditions, the fluid pressure, or modulated throttle pressure, is directed through the modulated throttle pressure inlet and outlet ports 314 and 316 of the third-second downshifts valve 306 to the control port 272 of the second-third gear shift valve 178 through one inlet port of the shuttle valve 304 in the absence of a line pressure in the other inlet port of the shuttle valve 304. The modulated throttle pressure Pdt for controlling the first-second and second-third gear shift valves 176 and 178 developed on the basis of a throttle pressure Pt developed by a transmission throttle valve 332.

Transmission Throttle Valve 332

The transmission throttle valve 332 comprises a wall portion 334 forming part of the body structure of the transmission control valve assembly and formed with an elongated valve chamber 336 consisting of a first axial portion 336a and a second axial portion 336b larger in cross-sectional area than the first axial portion 336a. These axial portions 336a and 336b of the valve chamber 336 merge into each other at their respective inner axial ends at which the wall portion 334 forms an annular end face 334a encircling the inner axial end of the first axial portion 336a and defining the inner axial end of the second axial portion 336b of the valve chamber 336. The first and second axial portions 336a and 336b of the valve chamber 336 axially outwardly terminate at internal wall surfaces 338 and 340 of the wall portion 334. The wall portion 334 is further formed with axial bores which are aligned with the valve chamber 336 and which are open at their axially other ends. The first and second axial portions 336a and 336b of the valve chamber 336 are respectively contiguous to these axial bores at their respective outer axial ends. The wall portion 334 is further formed with first, second, third and fourth throttle pressure ports 342, 344, 346 and 348, a kickdown port 350, first, second and third line pressure ports 352, 354 and 356, and first, second and third drain ports 358, 360 and 361. The first throttle pressure port 342 is located adjacent to the internal wall surface 338 adjacent to the outer axial end of the first axial portion 336a of the valve chamber 336, and the second drain port 360 is located adjacent to the inner axial end of the first axial portion 336a of the valve chamber 336. The first line pressure port 352, the second throttle pressure port 344 and the second drain port 360 are arranged in this sequence away from the first throttle pressure port 342 with the first drain port 358 located between the second throttle pressure port 344 and the second drain port 360. The kickdown port 350 is located adjacent to the inner axial end of the second axial portion 336b of the valve chamber 336 and the fourth throttle pressure port 348 is located adjacent to the outer axial end of the second axial portion 336b of the valve chamber 336. The third throttle pressure port 346 and the second and third line pressure ports 354 and 356 are located between the kickdown port 350 and the fourth throttle pressure port 348 and are arranged in this sequence away from the kickdown port 350. Thus, the first throttle pressure port 342, the first line pressure port 352, the second throttle pressure port 344, and the first and second drain ports 358 and 360 are open to the first axial portion 336a of the valve chamber 336 and are arranged in this sequence away from the internal wall surface 338 of the valve chamber 336. On the other hand, the kickdown port 350, the third throttle pressure port 346, the third drain port 361, the second and third line pressure ports 354 and 356, and the fourth throttle pressure port 348 are open to the second axial portion 336b of the valve chamber 336 and are located closer in this sequence toward the internal wall surface 340 of the valve chamber 336, as shown.

Within the valve chamber 336 thus formed in the wall portion 334 are axially movably mounted a valve spool 362 and a valve plunger 364 which are axially arranged in series with each other. The valve spool 362 has first, second and third circumferential lands 366, 368 and 370 which are axially slidable in the first axial portion 336a of the valve chamber 366 and which are axially spaced apart from each other to form a circumferential groove between the first and second circumferential lands 366 and 368 and a circumferential groove between the second and third circumferential lands 368 and 370 of the valve spool 362. The first circumferential land 366 usually projects into the above mentioned bore formed adjacent to the outer axial end of the first axial portion 336a of the valve chamber 336 and is axially slidable therein. The valve spool 362 further has an axial extension 372 projecting axially inwardly from the third circumferential land 370 of the valve spool 362 toward the valve plunger 364. The groove between the first and second circumferential lands 366 and 368 is constantly open to the first throttle pressure port 342 irrespective of the axial position of the valve spool 362 within the first axial portion 336a of the valve chamber 336, while the groove between the second and third circumferential lands 368 and 370 is constantly open to the second throttle pressure port 344 irrespective of the axial position of the valve spool 362 within the first axial portion 336a of the valve chamber 336 and is open selectively to the first line pressure port 352 or to the first drain port 358 depending upon the axial position of the valve spool 362 within the first axial portion 336a of the valve chamber 336. The second and third circumferential lands 368 and 370 have substantially equal cross sectional areas and the first circumferential land 336 is smaller in cross sectional area than the second and third circumferential lands 368 and 370 so that a differential pressure acting area is formed between the first and second circumferential lands 366 and 368. The differential pressure acting area is effective to urge the valve spool 362 toward the second axial portion 336b of the valve chamber 336 when there is a fluid pressure developed in the first throttle pressure port 342. The valve spool 362 thus constructed is axially movable within the first axial portion 336a of the valve chamber 336 between a first axial position (not shown) having the second circumferential land 368 bearing against the internal wall surface 338 adjacent to the first throttle pressure port 342, and a second axial position displaced toward the second axial portion 336b of the valve chamber 336 as indicated by the lower half of the valve spool 362. When the valve spool 362 is in the first axial position thereof, communication is provided between the second throttle pressure port 344 and the first line pressure port 352 through the groove between the second and third circumferential lands 368 and 370 with the throttle pressure port 344 isolated from the first drain port 358 by the third circumferential land 370 of the valve spool 362. When the valve spool 362 is in the second axial position, the second circumferential land 368 is on the point of opening or closing the first line pressure port 352 and simultaneously the third circumferential land 370 is on the point of closing and opening, respectively, the first drain port 358.

On the other hand, the valve plunger 364 axially projects from the wall portion 334 through the previously mentioned bore formed in the wall portion 334 adjacent to the outer axial end of the second axial portion 336b of the valve chamber 336 and is axially movable toward and away from the valve spool 362. The valve plunger 364 is engaged at its outer axial end by a suitable mechanical linkage (not shown) connected to the accelerator pedal of the vehicle and is axially moved inwardly of the valve chamber 336 in the wall portion 334 as the accelerator pedal is depressed. The plunger 364 or the mechanical linkage engaged by the plunger 364 is provided with suitable biasing means (not shown) urging the plunger 364 to move axially outwardly of the valve chamber 336 in the wall portion 334. Such a movement of the valve plunger 364 is limited by stop means forming part of the linkage so that the plunger 364 assumes an axially outer limit position indicated by the lower half of the valve plunger 364. When the accelerated pedal is in a position producing an idling condition in the engine, the valve plunger 364 is held in an axial position slightly displaced inwardly from such an outer limit position as indicated by the upper half of the plunger 364. The valve plunger 364 has formed on its axial portion projecting into the valve chamber 336 a flange or annular projection 374 having a radially stepped or reduced end portion on its axially outer side as illustrated. The valve plunger 364 further has an axial extension 376 projecting from the annular projection 374 toward the valve spool 362. The valve spool 362 and the valve plunger 364 thus arranged are urged to be axially spaced apart from each other by means of a helical compression spring 378 which is shown seated at one end on the axially inner end face of the annular projection 374 of the valve plunger 364 and at the other end on the axially inner end face of the third circumferential land 370 of the valve spool 362. When the accelerator pedal is depressed a distance greater than a predetermined value, the valve plunger 364 is axially moved against the force of the spring 378 through the second axial portion 336b and thereafter the first axial portion 336a of the valve chamber 336 into pressing engagement with the valve spool 362 at the leading end of the axial extension 376 thereof until the valve spool 362 is moved into the above described first axial position thereof.

The first and second throttle pressure ports 342 and 344 are in constant communication with each other through a throttle pressure feedback passageway 380 and, together with the third and fourth throttle pressure ports 346 and 348, with a throttle pressure circuit 382. The first line and third line pressure ports 352 and 356 are in constant communication with the previously described main line pressure circuit 138 leading from the pressure regulator valve 94. The kickdown port 350 is in constant communication with the previously described kickdown pressure circuit 256 leading to the respective kickdown ports 200 and 276 of the first-second and second-third gear shift valves 176 and 178. The first, second and third drain ports 358, 360 and 361 are open to the transmission oil sump. The second drain port 360 in particular is constantly open to a space formed between the valve spool 362 and the valve plunger 364 axially spaced apart from the valve spool 362 or to a circumferential groove which is to be formed between the flange or annular projection 374 of the valve plunger 364 and the third circumferential land 370 of the valve spool 362 when the valve plunger 364 is axially moved into abutting engagement with the valve spool 362. The above-mentioned space or the circumferential groove to which the second drain port 360 is open is part of the first axial portion 336a of the valve chamber 336 in the wall portion 334.

When the valve spool 362 of the transmission throttle valve 332 thus constructed and arranged is held in the first axial position by the force of the spring 378 provided between the valve spool 362 and the valve plunger 364 as above described, communication is established between the first line pressure port 352 and the second throttle pressure port 344 in the throttle valve 322. If the line pressure Pl is introduced from the main line pressure circuit 138 into the first pressure port 352 under this condition, the line pressure is passed through the throttle pressure feedback passageway 380 to the first throttle pressure port 342 of the throttle valve 332. The line pressure Pl developed in the first throttle pressure port 342 acts on the differential pressure acting area between the first and second circumferential lands 366 and 368 of the valve spool 362 and forces the valve spool 362 to move away from the first axial position toward the second axial portion 336b of the valve chamber 336 against the force of the spring 378 seated between the valve spool 362 and the valve plunger 364. With this movement of the valve spool 362, the third circumferential land 370 of the valve spool 362 slides on the annular projection which the wall portion 334 has formed between the second throttle pressure port 344 and the first drain port 358, maintaining the first drain port 358 closed by the land 370. When the valve spool 362 reaches a certain axial position, the circumferential edge on the trailing side of the land 370 is moved slightly past the circumferential edge of the leading side of the annular projection between the second throttle pressure port 344 and the first drain port 358 and at the same time the circumferential edge on the leading side of the second circumferential land 368 of the valve spool 362 is moved slightly past the circumferential edge on the trailing side of the annular projection which the wall portion 344 has formed between the first line pressure port 352 and the second throttle pressure port 344. The first drain port 358 being thus slightly open to the groove between the second and third circumferential lands 368 and 370 of the valve spool 362, the line pressure which has been developed in the second throttle pressure port 344 is allowed to leak into the first drain port 358 and through the drain port 358 into the transmission oil sump, giving rise to a decrease in the fluid pressure in the second and accordingly first throttle pressure ports 344 and 342. The force resulting from the fluid pressure acting on the differential pressure acting area between the first and second circumferential lands 366 and 368 of the valve spool 362 is therefore overcome by the opposing force of the spring 378 and, as a consequence, the valve spool 362 tends to be moved back toward the first axial position thereof, for closing the first drain port 358 and allowing the first line pressure port 352 to open for a second time. This causes the fluid pressure in the first and second throttle pressure ports 342 and 344 to rise and the valve spool 362 to move away from the first axial position thereof. The valve spool 362 is in this manner operative to attain an equilibrium axial position in which the force resulting from the fluid pressure acting on the differential pressure acting area between the first and second circumferential lands 366 and 368 of the valve spool 362 is equally balanced with the opposing force of the spring 378. The previously mentioned second axial position of the valve spool 362 is the equilibrium axial position reached by the valve spool 362 and the previously mentioned throttle pressure Pt is the fluid pressure which is developed in the first and second throttle pressure ports 342 and 344 and accordingly in the throttle pressure circuit 382. Since the spring 378 is seated at one end on the valve plunger 364 which is continuously movable through the valve chamber 336 as the accelerator pedal is moved, the force exerted on the valve spool 362 by the spring 378 is continuously variable with the position of the accelerator pedal with the result that the throttle pressure Pt developed in the throttle pressure circuit 382 varies in direct proportion to the amount of displacement of the accelerator pedal and accordingly to the degree to which the throttle valve provided in the carburetor of the engine is open, as indicated by plot a-b in FIG. 3. If, therefore, it happens that a failure is invited in the mechanical linkage between the accelerator pedal and the plunger 364, the throttle pressure Pt will be eliminated in the throttle pressure circuit 382. In the hydraulic control system embodying the present invention, there is provided a throttle failsafe valve 384 adapted to cope with such a circumstance.

Throttle Failsafe Valve 384

The throttle failsafe valve 384 is largely constituted by a valve sleeve 386 which is mounted in the above-mentioned second axial portion 336b of the valve chamber 336 in the wall portion 334 and which is axially slidable between the internal wall surface 340 adjacent to the fourth throttle pressure port 348 of the throttle valve 332 and the annular end face 334a formed by the wall portion 334 at the inner axial end of the second axial portion 336b of the valve chamber 336. The failsafe valve sleeve 386 has first, second and third circumferential lands 388, 390 and 392 and an internal annular projection 394 having axial ends spaced apart predetermined distances from the opposite axial ends of the sleeve. The internal annular projection 394 has an inside diameter which is such that the valve plunger 364 of the transmission throttle valve 332 is axially slidable on the inner peripheral surface of the projection 394 with the annular projection 374 of the plunger located on the axially inner side of the internal annular projection 394 of the sleeve 386. The internal annular projection 394 of the valve sleeve 386 thus serves as a guide for the axial movement of the valve plunger 364. The first, second and third circumferential lands 388, 390 and 392 of the failsafe valve sleeve 386 are arranged in this sequence away from the inner axial end of the second axial portion 336b of the valve chamber 336 and are axially spaced apart from each other so as to form a circumferential groove between the first and second circumferential lands 388 and 390 and a circumferential groove between the second and third circumferential lands 390 and 392. The groove between first and second circumferential lands 388 and 390 of the valve sleeve 386 is constantly open to the third throttle pressure port 346 irrespective of the axial position of the sleeve 386 within the second axial portion 336b of the valve chamber 336 and is communicable with the third drain port 361 as well depending upon the axial position of the sleeve 386 within the second axial portion 336b of the valve chamber 336. On the other hand, the groove between the second and third circumferential lands 390 and 392 of the valve sleeve 386 is constantly open to the second line pressure port 354 irrespective of the axial position of the sleeve 386 within the second axial portion 336b of the valve chamber 336 and is open to selectively to the third line pressure port 356 to the third drain port 361 depending upon the axial position of the valve sleeve 386 within the second axial portion 336b of the valve chamber 336.

The first and second circumferential lands 388 and 390 form part of a generally cylindrical wall portion 398 projecting axially inwardly from the annular projection 394. The cylindrical wall portion 398 is formed with an internal circumferential groove 396 adjacent the inner axial end of the annular projection 394 and open radially outwardly to the second axial portion 336b of the valve chamber 336 as shown. A differential pressure acting area is thus formed between the axial end faces defining the internal circumferential groove 396 in the sleeve 386. Furthermore, the inside diameter of the above mentioned circumferential wall portion 398 of the valve sleeve 386 is such that the flange or annular projection 374 of the valve spool 362 slidably received on the inner peripheral surface of the internal annular projection 394 of the sleeve 386 is axially slidable toward and away from the annular end face which the internal annular projection 394 of the sleeve 386 has formed at the axially outer end of the groove 396 in the sleeve 386. The flange or annular projection 374 of the valve spool 362 being thus slidably received on the inner peripheral surface of the circumferential wall portion 398, there is an annular space formed between the valve plunger 362 and the sleeve 386, the groove 396 in the sleeve 386 forming part of the space. The valve sleeve 386 is further formed with a first radial port 400 radially open at one end to the circumferential groove between the first and second circumferential lands 388 and 390 of the sleeve 386 and at the other end to the internal circumferential groove 396 in the sleeve 386 and through the groove 396 further to the above mentioned annular space formed between the sleeve 386 and the valve plunger 364, and a second radial port 402 which is formed radially in the first circumferential land 388 of the sleeve 386 and which is open in the vicinity of the end of the cylindrical wall portion 398 as shown, the bore portion being defined by the inner peripheral surface of the above mentioned circumferential wall portion 398 of the sleeve 386 and having a substantially uniform diameter throughout its axial length.

The failsafe valve sleeve 386 thus constructed is axially slidable within the second axial portion 336b of the valve chamber 336 in the wall portion 334 between a first axial position bearing at its inner axial end against the previously mentioned annular end face 334a of the axial portion 336b of the valve chamber 336 as indicated by the upper half of the valve sleeve 386, and a second axial position bearing at its outer axial end against the internal wall surface 340 adjacent to the fourth throttle pressure port 348 of the throttle valve 332 as indicated by the lower half of the sleeve 386. When the valve sleeve 386 is in the first axial position thereof, the groove formed between the first and second circumferential lands 388 and 390 of the valve sleeve 386 is open to the second throttle pressure port 346 of the throttle valve 332 and the groove formed between the second and third circumferential lands 390 and 392 of the sleeve 386 and 392 is open to both of the second line pressure port 354 and the third drain port 361, providing communication between the line pressure port 354 and the drain port 361. The third line pressure port 356 is closed by the third circumferential land 392 of the valve sleeve 386. When the valve sleeve 386 is in the second axial position thereof, the groove formed between the first and second circumferential lands 388 and 390 of the sleeve 386 is open to both of the third throttle pressure port 346 and the third drain port 361 while the groove between the second and third circumferential lands 390 and 392 is open to both of the second and third line pressure ports 354 and 356, thereby providing communication between the third throttle pressure port 346 and the third drain port 361 and between the second and third line pressure ports 354 and 356. Suitable biasing means is provided to urge the valve sleeve 386 to move toward the first axial position thereof, such means being shown comprising a preloaded helical compression spring 404 seated at one end on the internal wall surface 340 of the wall portion 334 and at the other end on the axially outer end face of the internal annular projection 394 of the sleeve 386. When a throttle pressure Pt is present in the throttle pressure circuit 382, the pressure is directed through the fourth throttle pressure port 348 into the second axial portion 336b of the valve chamber 336 and acts on the end face of the third circumferential land 392 and on the axially outer end face of the internal annular projection 394 of the valve sleeve 386 so that the valve sleeve 386 is urged to stay in the first axial position thereof not only by the force of the spring 404 but by the force thus exerted on the valve sleeve 386 by the throttle pressure developed in the fourth throttle pressure port 348 of the throttle valve 332.

When the valve sleeve 386 is in the first axial position thereof, the first and second radial ports 400 and 402 in the sleeve 386 are laterally or radially aligned with the third throttle pressure port 346 and the kickdown port 350 of the throttle valve 332. When there is a throttle pressure Pt developed in the throttle pressure circuit 382 as previously discussed, the throttle pressure is directed through the third throttle port 346 into the groove between the first and second circumferential lands 388 and 390 of the failsafe valve sleeve 386 and past the groove between the lands 388 and 390 into the internal groove 396 through the first radial port 400 in the sleeve 386. The throttle pressure Pt thus introduced into the internal groove 396 in the failsafe valve sleeve 386 acts on the flange or annular projection 374 of the valve plunger 364 and urges the plunger 364 to move axially inwardly of the valve chamber 336, thereby aiding the operator of the accelerator pedal in depressing the pedal. The second radial port 402 in the valve sleeve 386 being aligned with the kickdown port 350 of the throttle valve 332, the kickdown circuit 256 is in communication with the second drain port 360 of the throttle valve 332 through the kickdown pressure port 350 of the throttle valve 332 and the second radial port 402 of the throttle failsafe valve sleeve 386. If, under these conditions, the accelerator pedal is depressed a distance greater than a predetermined value from the fully released position thereof, the valve plunger 364 of the throttle valve 332 is axially moved into pressing engagement at the leading end of the axial extension 376 with the axial extension 372 of the valve spool 362 and moves the valve spool 362 into the first axial position thereof against the force resulting from the throttle pressure Pt which has been developed in the first throttle pressure port 342. Communication is therefore maintained between the first line pressure port 352 and the second throttle pressure port 344 of the throttle valve 332 and accordingly between the main line pressure circuit 138 and the throttle pressure circuit 382 through the groove between the second and third circumferential lands 368 and 370 of the valve spool 362 of the throttle valve 332. The fluid pressure in the throttle pressure circuit 382 is increased to the level of the line pressure Pl as indicated by plot b-c-d in FIG. 3. Under these conditions, the flange or annular projection 374 of the valve plunger 364 of the throttle valve 332 is received on the annular projection which the wall portion 334 has formed between the second drain port 360 and the kickdown port 350 of the throttle valve 332 and thereby isolates the kickdown port 350 from the second drain port 360. At the same time, the line pressure port 344 is isolated from the first drain port 358 which in turn is closed by the third circumferential land 370 of the valve spool 362 so that the line pressure Pl developed in the throttle valve 332 is prevented from being discharged through any of the drain ports 358, 360 and 361 of the throttle valve 332. The flange or annular projection 374 of the valve plunger 364 having been moved into the first axial portion 336a of the valve chamber 336, viz., out of the previously mentioned bore portion in the circumferential wall portion 398 of the valve sleeve 386, communication is provided between the first and second radial ports 400 and 402 in the valve sleeve 386 through a circumferential groove formed between the flange or annular projection 374 of the valve plunger 364 and the internal annular projection 394 of the valve sleeve 386, though not shown as such in the drawing. Since, under these conditions, the internal circumferential groove 396 in the valve sleeve 396 is isolated from the third drain port 361 partly by the internal annular projection 394 of the valve sleeve 386 and partly by that axial portion of the valve plunger 364 which extends axially outwardly from the flange or annular projection 374, the line pressure Pl obtaining in the throttle pressure circuit 382 as above described is passed over to the kickdown circuit 256 through the third throttle pressure port 346 of the throttle valve 332 and the first radial port 400 and the internal circumferential groove 396 in the failsafe valve sleeve 386 and, past the groove 396, further through the bore portion in the circumferential wall portion 398 of the valve sleeve 386 and the second radial port 402 in the sleeve 386. In the kickdown circuit 256 is therefore developed the line pressure Pl which is passed from the line pressure circuit 138 by way of the throttle pressure circuit 382. The line pressure Pl thus developed in the kickdown circuit 256 introduced into the respective kickdown port 200 and 276 of the first-second and second-third gear shift valves 176 and 178 and urges the valve spools 210 and 212 of the first-second gear shift valve 176 and the valve spools 282 and 284 of the second-third gear shift valve 178 to move into the respective first axial positions thereof if the valve spools have been held in the second axial positions thereof.

In the event the mechanical linkage connecting the valve plunger 364 of the transmission throttle valve 332 to the accelerator pedal of the vehicle is damaged or otherwise disabled from properly connecting the plunger 364 to the accelerator pedal for one reason or another, the valve plunger 364 may be moved to project excessively from the valve chamber 336 by, for example, the force of the previously mentioned biasing means connected to the valve plunger 364 or to the mechanical linkage between the plunger 364 and the accelerator pedal. When this occurs, the failsafe valve sleeve 386 is moved into the second axial position indicated by the lower half of the plunger 386 by the flange or annular projection 374 of the valve plunger 364 moved away from the valve spool 362 of the throttle valve 332 and is brought into pressing contact at the outer axial end of the third circumferential land 392 of the sleeve 386 with the internal wall surface 340 of the valve chamber 336. The valve sleeve 386 being thus moved into the second axial position thereof, the third throttle pressure port 346 is permitted to be open to the third drain port 361 through the groove between the first and second circumferential lands 388 and 390 of the valve sleeve 386 and allows the fluid pressure in the throttle pressure circuit 382 to be discharged to the transmission oil sump through the third throttle pressure port 346 and the third drain port 361 of the throttle valve 332. With the valve plunger 364 moved to the limit axial position remote from the valve spool 362 and disengaged from the spring 378, furthermore, the force exerted by the spring 378 on the valve spool 362 is eliminated or reduced to a minimum so that the valve spool 362 which has been held in the second axial position on the point of closing or opening the first line pressure port 352 by the second circumferential land 368 thereof is enabled to move beyond the second axial position toward the valve plunger 364 and closes the first line pressure port 352, while the failsafe valve sleeve 386 is moved into the above mentioned second axial position by the valve plunger 364 and provides communication between the third throttle pressure port 346 and the third drain port 361. The fluid pressure which has been developed in the throttle feedback passageway 380 joining the first and second throttle pressure ports 342 and 344 of the throttle valve 332 is thus confined therein and remains effective to hold the valve spool 362 in the axial position closing the first line pressure port 352 of the throttle valve 332. The main line pressure circuit 138 is therefore isolated from the throttle pressure circuit 382 which is in a condition drained off through the third drain port 361 of the throttle valve 332. On the other hand, the failsafe valve sleeve 386 moved into the second axial position thereof further provides communication between the second and third line pressure ports 354 and 356 of the throttle valve 332 so that the line pressure is directed from the main line pressure circuit 138 to the second line pressure port 354 through the third line pressure port 356 of the throttle valve 332. The line pressure thus developed in the second line pressure port 354 of the transmission throttle valve 332 is directed to a line pressure booster valve 406 by way of a fluid passageway 408.

Line Pressure Booster Valve 406

The line pressure booster valve 406 comprises a wall portion 410 forming part of the body structure of the transmission control valve assembly and formed with an elongated valve chamber 412 which is closed at both axial ends by internal wall surfaces 414 and 416 of the wall portion 410. The wall portion 410 is further formed with first, second and third line pressure inlet ports 418, 420 and 422, a line pressure outlet port 424, a holding port 426 and a trigger port 428. The first line pressure inlet port 418 is located next to the second line pressure inlet port 420 which is located adjacent to the internal wall surface 414 at one axial end of the valve chamber 412. The line pressure outlet port 424, the third line pressure inlet port 422, the holding port 426 and the trigger port 428 are located intermediate between the first line pressure inlet port 418 and the internal wall surface 416 at the other axial end of the valve chamber 412 and are arranged in this sequence away from the internal wall surface 416 as shown.

Within the valve chamber 412 thus formed is axially slidably mounted a valve spool 430 having first, second and third circumferential lands 432, 434 and 436 which are arranged in this sequence away from the axial end of the valve chamber 412 adjacent to the second line pressure inlet port 420. The circumferential lands 432, 434 and 436 of the valve spool 430 are axially spaced apart from each other and thus form a circumferential groove between the first and second circumferential lands 432 and 434 and a circumferential groove between the second and third circumferential lands 434 and 436. The groove formed between the first and second circumferential lands 432 and 434 is constantly open to the line pressure outlet port 424 irrespective of the axial position of the valve spool 430 within the valve chamber 412 and is open selectively to the first or third line pressure port 418 or 422 depending upon the axial position of the valve spool 430 within the valve chamber 412. On the other hand, the groove formed between the second and third circumferential lands 434 and 436 of the valve spool 430 is open selectively to the holding port 426 or the trigger port 428 depending upon the axial position of the valve spool 430 within the valve chamber 412. The valve spool 430 is further formed with an axial bore 438 which is open toward the axial end of the valve chamber 412 defined by the internal wall surface 416 and which terminates halfway in the valve spool 430, and a radial port 440 providing constant communication between the groove between the second and third circumferential lands 434 and 436 and the above-mentioned axial bore 438 in the valve spool 430.

The valve spool 430 thus configured is axially movable within the valve chamber 412 between a first axial position closing the first line pressure inlet port 418 and the trigger port 428 by the first and second circumferential lands 432 and 434, respectively, thereof and providing communication between the third line pressure inlet port 422 and the line pressure outlet port 424 through the groove between the first and second circumferential lands 432 and 434 thereof as indicated by the upper half of the valve spool 430, and a second axial position closing the third line pressure inlet port 422 and the trigger port 428 by the second and third circumferential lands 434 and 436, respectively, thereof and providing communication between the first line pressure inlet port 418 and the line pressure outlet port 424 through the groove between the first and second circumferential lands 432 and 434 thereof as indicated by the lower half of the valve spool 430. When the valve spool 430 is in the first axial position thereof, the groove between the second and third circumferential lands 434 and 436 and accordingly the radial port 440 formed in the valve spool 30 are open to the trigger port 428. When the valve spool 430 is in the second axial position thereof, the groove between the lands 434 and 436 and accordingly the radial port 440 in the valve spool 430 is open to the holding port 426. The valve spool 430 is urged to move toward the first axial position thereof by means of a preloaded helical compression spring 442.

The second and third line pressure inlet port 420 and 422 are jointly in constant communication with the second line pressure port 354 of the transmission throttle valve 332 through the above-mentioned fluid passageway 408. The first line pressure port 418 of the line pressure booster valve 406 is in constant communication through a fluid passageway 302' with the previously mentioned fluid passageway 302 leading from the third fluid outlet port 160 of the gear position selector valve 148. The line pressure outlet port 424 of the line pressure booster valve 406 is open to a fluid passageway 444 which terminates in one inlet port of a two-inlet shuttle valve 446, the other inlet port of the shuttle valve 446 being in communication with the throttle pressure circuit 382. The holding port 426 of the line pressure booster valve 406 is in constant communication with the line pressure outlet port 192 of the first-second gear shift valve 176 through the previously mentioned band actuating fluid circuit 230 leading to the brakeapply fluid chamber 76 of the band servo unit 74. The trigger port 428 of the line pressure booster valve 406 is in constant communication with a fluid circuit 448 which communicates with the line pressure outlet port 270 of the second-third gear shift valve 178. The above-mentioned two-inlet shuttle valve 446 has an outlet port leading to a pressure modifier or limiter valve 450.

Pressure Modifier Valve 450

The pressure modifier or limiter valve 450 is adapted to cut off an input pressure higher than a predetermined level and comprises a wall portion 452 forming part of the body structure of the transmission control valve assembly. The wall portion 452 is formed with an elongated valve chamber 454 which is closed at both axial ends by internal wall surfaces 454a and 454b of the wall portion 452. The wall portion 452 is further formed with pressure inlet and outlet ports 456 and 458, a pressure feedback port 460, and first and second drain ports 462 and 464. The pressure feedback port 460 and the second drain port 464 are located adjacent the internal wall surfaces 454a and 454b, respectively, at the axial ends of the valve chamber 454. The pressure outlet port 458 is located intermediate between these ports 460 and 464 with the pressure inlet port 456 located between the pressure outlet and feedback ports 458 and 460 and with the first drain port 462 located between the pressure outlet port 458 and the second drain port 464, as shown. The pressure inlet port 456 is in constant communication with the outlet port of the above-mentioned shuttle valve 446 and across the shuttle valve 446 with the throttle pressure circuit 382 and the fluid passageway 444 leading from the line pressure outlet port 424 of the line pressure booster valve 406. The pressure outlet and feedback ports 458 and 460 of the pressure modifier valve 450 constantly communicate with each other through an orifice 466 and are further jointly in constant communication with a modified or limited pressure circuit 468 which leads to the first and second modified pressure ports 108 and 110 of the previously described pressure regulator valve 94. The drain ports 462 and 464 are open to the transmission oil sump.

Within the valve chamber 454 thus formed is axially slidably mounted a valve spool 470 having first and second circumferential lands 472 and 474. The lands 472 and 474 of the valve spool 470 are substantially equal in cross sectional area to each other and are axially spaced apart from each other and have formed therebetween a circumferential groove which is constantly open to the pressure outlet port 458 irrespective of the axial position of the valve spool 470 within the valve chamber 454. The groove between the lands 472 and 474 of the valve spool 470 is selectively open to the pressure inlet port 456 or the first drain port 462. Thus, the valve spool 470 of the pressure modifier or limiter valve 450 is axially movable within the valve chamber 454 toward and away from a limit axial position closing the first drain port 462 by the second circumferential land 474 thereof and providing communication between the pressure inlet and outlet ports 456 and 458 through the groove between the lands 472 and 474 thereof as indicated by the right half of the valve spool 470. The valve spool 470 is urged to axially move within the valve chamber 454 toward this limit axial position thereof by means of a helical compression spring 476. When, thus, there is a fluid pressure developed in the pressure outlet port 458 and accordingly in the pressure feedback port 460, the valve spool 470 is subjected to a force urging the valve spool 470 to move away from the limit axial position thereof against the force of the spring 476 by the fluid pressure which acts on the outer axial end face of the first circumferential land 472 of the valve spool 470 from the feedback port 460. If the pressure thus acting on the valve spool 470 from the pressure feedback port 460 is such that the force thus exerted on the valve spool 470 by the fluid pressure against the force of the spring 476 is smaller than the latter, the fluid pressure occurring in the pressure inlet port 456 is passed to the pressure outlet and feedback ports 458 and 460 and through the port 458 to the modified pressure circuit 468 without being modified. The result is that the fluid pressure developed in the modified pressure circuit 468 under these conditions is substantially equal to or, in other words, continuously variable with the fluid pressure developed in the pressure inlet port 456. The fluid pressure to be introduced into this pressure inlet port 456 of the pressure modifier valve thus arranged is the line pressure Pl or the throttle pressure Pt which varies with the degree to which the throttle valve in the carburetor of the engine is open, as will be seen from plot a-e in FIG. 3. When the throttle pressure Pt reaches a certain value (which is assumed to be about 3 kg/cm² in FIG. 3), the valve spool 470 which has been moved away from the limit axial position thereof will assume an axial position in which the first circumferential land 472 is on the point of riding on the annular projection which the wall portion 452 has formed between the pressure outlet port 458 and the pressure inlet port 456 and at the same time the second circumferential land 474 of the valve spool 470 is moving past the annular projection which the wall portion 452 has formed between the pressure outlet port 458 and the first drain port 462. Further axial movement of the valve spool 470 will cause leak of fluid from the pressure outlet port 458 into the first drain port 462 past the annular projection between the ports 458 and 462. When this is taking place, the pressure inlet port 456 is fully closed so that there is caused a drop in the fluid pressure in the modified pressure circuit 468. When the fluid pressure in the modified pressure circuit 468 is reduced to a certain level which is dictated by the force of the spring 476, the force exerted on the valve spool 470 by the fluid pressure developed in the pressure feedback port 460 is overcome by the opposing force of the spring 476 and allows the valve spool 470 to move back toward the initial limit axial position thereof, thereby closing the first drain port 462 and open up the pressure inlet port 456. If the pressure which is passed over to the modified pressure circuit 468 upon re-opening of the pressure inlet port 456 is higher than the above mentioned level, the pressure inlet port 456 is closed and the first drain port 462 is opened up for a second time until the fluid pressure in the pressure feedback port 460 is reduced to the particular level. In this fashion, a fluid pressure higher than a predetermined value cannot be developed in the modified pressure circuit 468 and as a consequence only a fluid pressure lower than such a predetermined value is passed from the pressure inlet port 456 to the modified pressure circuit 468. Thus, the fluid pressure to be developed in the modified pressure circuit 468 is equal to and continuously variable with the fluid pressure developed in the pressure inlet port 456 if the fluid pressure in the inlet port 456 is lower than a predetermined limit value, but is maintained at the limit value when the fluid pressure in the pressure inlet port 456 is higher than the limit value, as indicated by plot a-e-f in FIG. 3. The fluid pressure which is to be developed in the modified pressure circuit 468 in the presence of the throttle pressure Pt in the pressure inlet port 456 of the pressure modifier or limiter valve 450 is herein referred to as modified pressure and is denoted by Pmt as previously mentioned. The limit value of the throttle pressure Pt to be passed without being modified or limited through the pressure modifier valve 450 is, preferably, substantially equal to the line pressure Pl to be developed by the pressure regulator valve 94 when the carburetor throttle valve is in an idling position producing an opening degree approximating zero as will be seen from the graph of FIG. 3. The modified throttle pressure Pmt thus developed by the modifier valve 450 varies with the torque output delivered from the engine substantially throughout the various operating condition of the engine. In the hydraulic control system embodying the present invention, the modified throttle pressure Pmt is utilized in combination with the previously mentioned modulated throttle pressure Pdt which is developed by a throttle pressure modulator valve 478.

Throttle Pressure Modulator Valve 478

The throttle pressure modulator valve 478 comprises a wall portion 480 which forms part of the body structure of the previously mentioned transmission control body assembly and which is formed with an elongated valve chamber 482 closed at one axial end by an internal wall surface 484 of the wall portion 480. In the throttle pressure modulator valve 478, the wall portion 480 is formed with a tapped hole through which an adjusting bolt 485 is screwed into the valve chamber 482 and is attached at its leading end to an adjustment plug 486. The adjusting bolt 485 thus connected to the adjustment plug 486 projects outwardly from the wall portion 480 so that the distance between the internal wall surface 484 at one axial end of the valve chamber and the front or inner end of the plug 486 can be adjusted arbitrarily from the outside of the transmission control valve assembly (not shown).

The wall portion 480 thus arranged of the throttle pressure modifier valve 478 is further formed with a throttle pressure port 488, a kickdown port 490, a modulated pressure outlet port 492, a line pressure port 494, and a modulated pressure feedback port 496, the ports 488, 490, 492, 494 and 496 being arranged in this sequence away from the above mentioned internal wall surface 484 at one axial end of the wall portion 480 with the throttle pressure port 488 located adjacent the wall surface 484 and with the modulated throttle pressure feedback port 496 located adjacent to but axially inwardly of the adjustment plug 486 located adjacent to the other axial end of the valve chamber 482. The throttle pressure port 488 is in constant communication with the throttle pressure circuit 382, and the kickdown port 490 is in constant communication with a fluid passageway 498 communicable with the kickdown circuit 256 through the second axial portion 336b of the valve chamber 336 of the previously described transmission throttle valve 332. The modulated throttle pressure outlet and feedback ports 492 and 496 communicates with each other through a modulated throttle pressure feedback passageway 500 having an orifice 501 incorporated therein and is further jointly in constant communication with the modulated pressure circuit 254. The line pressure port 494 of the throttle pressure modulator valve 478 is in constant communication with the second fluid outlet port 158 of the gear position selector valve 148.

Within the valve chamber 482 thus arranged is axially slidably mounted a valve spool 502 which has first, second and third circumferential lands 504, 506 and 508. These lands 504, 506 and 508 of the valve spool 502 are arranged to be in this sequence away from the adjustment plug 486 and are axially spaced apart from each other so as to form a circumferential groove between the first and second circumferential lands 504 and 506 and a circumferential groove between the second and third circumferential lands 506 and 508, as shown. The groove formed between the first and second circumferential lands 504 and 506 is constantly open to the kickdown port 490 irrespective of the axial position of the valve spool 502 within the valve chamber 482, while the groove between the second and third circumferential lands 506 and 508 is constantly open to the modulated throttle pressure outlet port 492 irrespective of the axial position of the valve spool 502 within the valve chamber 482 and is communicable with the line pressure port 494 depending upon the axial position of the valve spool 502 within the valve chamber 482. Thus, the valve spool 502 of the throttle pressure modulator valve 478 is axially movable within the valve chamber 482 between a limit axial position as indicated by the lower half of the valve spool 502, bearing at its end adjacent to the first circumferential land 504 against the internal wall surface 484 at one axial end of the valve chamber 482. When the valve spool 502 is in this limit axial position, the line pressure port 494 is closed by the third circumferential land 508 of the valve spool 502 and communication is provided between the kickdown port 490 and the modulated pressure outlet port 492 through the groove between the second and third circumferential lands 506 and 508 of the valve spool 502. The valve spool 502 is urged to move toward the limit axial position by means of a preloaded helical compression spring 510 which is seated at one end on the adjustment plug 486 and at the other end on the axially outer face of the third circumferential land 508 of the valve spool 502. The first circumferential land 504 is slightly larger in cross sectional area than the second and third circumferential lands 506 and 508 having substantially equal cross sectional areas so that there is a differential pressure acting area formed between the first and second circumferential lands 504 and 506.

Except when the accelerator pedal is being depressed a distance greater than a predetermined value from the fully released position thereof, the passageway 498 leading from the kickdown port 490 of the throttle pressure modulator valve 478 is open to the valve chamber 336b of the transmission throttle valve 332 normally through the second radial port 402 in the valve sleeve 386 of the throttle failsafe valve 384 and is drained off through the second drain port 360 of the throttle 332 as previously described in connection with the kickdown circuit 256. Thus, there is no fluid pressure developed in the kickdown port 490 of the throttle pressure modulator valve 478 except when the accelerator pedal is being depressed a distance greater than a predetermined distance from the fully released position thereof. When the engine is operating in low load conditions, moreover, the throttle pressure Pt is maintained at relatively low levels and, as a consequence, the force acting on the first circumferential land 504 of the valve spool 502 from the throttle pressure port 488 of the throttle modulator valve 478 is overcome by the opposing force of the spring 510 seated between the valve spool 502 and the adjustment plug 486. As the horsepower output delivered from the engine increases, the throttle pressure acting on the end face of the first circumferential land 504 of the valve spool 502 from the throttle pressure port 488 increases accordingly and causes the valve spool 502 to move away from the limit axial position thereof against the opposing force of the spring 510. Until the valve spool 502 reaches an axial position having the third circumferential land 508 on the point of leaving the annular projection which the wall portion 480 has formed between the modulator throttle pressure outlet port 492 and the line pressure port 494, the line pressure 494 is kept closed so that there is no fluid pressure developed in the modulated throttle pressure outlet port 492. Once, however, the throttle pressure Pt acting on the valve spool 502 from the throttle pressure port 488 of the throttle pressure modulator valve 478 is increased beyond a certain level, the valve spool 502 is forced to move beyond such a critical axial position against the force of the spring 510 and opens up the line pressure port 494. The line pressure Pl thus allowed into the groove between the second and third circumferential lands 506 and 508 of the valve spool 502 is passed to the modulated throttle pressure feedback port 494 by way of the passageway 500 and acts on the end face of the third circumferential land 508 of the valve spool 502. As a consequence, the force resulting from the throttle pressure Pt acting on the end face of the first circumferential land 504 of the valve spool 502 is opposed not only by the force of the spring 510 but the force thus produced by the line pressure Pl developed in the modulated throttle pressure feedback port 496. The valve spool 502 is therefore moved back toward the limit axial position thereof against the force exerted on the valve spool 502 by the throttle pressure Pt in the throttle pressure port 488. In this fashion, the valve spool 502 attains a certain equilibrium axial position in which the forces urging the valve spool 502 to move in the opposite directions are equally balanced. In the modulated throttle pressure circuit 332 leading from the modulated throttle pressure outlet and feedback ports 492 and 496 is thus developed a modulated throttle pressure Pdt which is continuously variable with the throttle pressure Pt when the throttle pressure appearing in the throttle pressure port 488 of the throttle pressure modulator valve 478 is higher than a predetermined value which is dictated by the firce of the spring 510.

The modulated throttle pressure Pdt thus developed by the throttle pressure modulator valve varies at a rate approximately equal to the rate of change of the throttle pressure as will be seen from plot g-h in the graph of FIG. 3.

During kickdown condition to be brought about with the accelerator pedal depressed a distance greater than a predetermined value from the fully released position thereof, there is developed a line pressure Pl in the throttle pressure circuit 382 and the kickdown circuit 256 by means of the throttle valve 332 as previously discussed. The line pressure in these circuits 256 and 382 is directed through the passageways 498 and 380 to the kickdown port 490 and the throttle pressure port 488 of the throttle pressure modulator valve 478 acts on the differential pressure acting area between the first and second circumferential lands 504 and 506 of the modulator valve spool 502, which is accordingly moved into the first axial position thereof. As a consequence, the communication between the modulated throttle pressure outlet port 492 and the line pressure port 494 by the third land 508 thereof is blocked and, in turn, communication is provided between the kickdown port 490 and the modulated throttle pressure outlet port 492 through the groove between the second and third circumferential lands 506 and 508 thereof. The line pressure Pl which has been directed from the kickdown circuit 256 to the kickdown passageway 498 through the throttle valve 332 is therefore admitted into the modulated throttle pressure circuit 332 by way of the kickdown and modulated throttle pressure outlet ports 490 and 492. The line pressure Pl is also directed into the modulated throttle pressure feedback port 496 and lends itself to opposing the throttle pressure Pt acting on the first land 504 of the valve spool 502 in lieu of the line pressure which has been directed into the port 496. Thus, the modulated throttle pressure Pdt is increased to the level of the line pressure Pl during kickdown condition as indicated by plot h-c-d in FIG. 3.

Low-and-Reverse Brake Actuating Pressure Reducing Valve 512

The hydraulic control system embodying the present invention further comprises a low-and-reverse brake actuating pressure reducing valve 512 which comprises a wall portion 514 which forms part of the body structure of the transmission control valve assembly and which is formed with an elongated valve chamber 516 having closed axial ends defined by internal wall surfaces 518 and 520 of the wall portion 514. The wall portion 514 is further formed with a line pressure inlet port 522, a pressure outlet port 524, a pressure feedback port 526, and first and second drain ports 528 and 530. The pressure feedback port 526 and the second drain port 530 are located adjacent the above mentioned internal wall surfaces 518 and 520, respectively, at the opposite axial ends of the valve chamber 514, and the line pressure inlet port 522 is located between the pressure feedback port 526 and the pressure outlet port 524. The first drain port 528 is located intermediate between the pressure outlet port 524 and the second drain port 530 as shown. The line pressure inlet port 522 is in constant communication with the fourth fluid outlet port 162 of the gear position selector valve 148 through a fluid passageway 532. The pressure outlet and feedback ports 524 and 526 constantly communicates with each other through a feedback passageway 534 having an orifice 536 incorporated therein and is further jointly in constant communication with one inlet port of the previously mentioned shuttle valve 237 through a fluid passageway 538, the other inlet port of the shuttle valve 237 being in communication with the first fluid outlet port 156 of the gear position selector valve 148.

Within the valve chamber 516 of the first-range pressure reducing valve 512 is axially slidably mounted a valve spool 540 having first and second circumferential ladns 542 and 544 which are axially arranged to be closer to the internal wall surfaces 518 and 520, respectively, at the opposite axial end of the valve chamber 516. The lands 542 and 544 are axially spaced apart from each other and have formed therebetween a circumferential groove which is constantly open to the pressure outlet port 524. The valve spool 540 is axially movable within the valve chamber 516 to and from a first axial position bearing at its axial end adjacent to the first circumferential land 542 against the internal wall surface 518 adjacent to the pressure feedback port 526. When the valve spool 540 is in the first axial position, the groove between the lands 542 and 544 is open to both of the line pressure inlet port 522 and the pressure outlet port 524 as indicated by the right half of the valve spool 540. The valve spool 540 is urged to stay in this axial position by means of a preloaded helical compression spring 546 which is shown seated at one end on the axially outer end face of the second circumferential land 544 of the valve spool 540 and at the other end on the internal wall surface 520 adjacent to the second drain port 530.

When a line pressure Pl is directed into the line pressure inlet port 522 with the valve spool 540 held in the first axial position thereof by the force of the spring 546, the line pressure is passed through the pressure outlet port 524 and the fluid passageway 534 into the pressure feedback port 526 and acts on the end face of the first circumferential land 542 of the valve spool 540 in the first axial position. The valve spool 540 is urged to move away from the first axial position thereof by the force produced by the line pressure Pl thus acting on the first circumferential land 542 of the valve spool 540. When the valve spool 540 is moved away from the first axial position thereof and reaches a certain axial position, the first circumferential land 542 is located to be on the point of fully closing the line pressure inlet port 522 and the second circumferential land 544 is located to be on the point of leaving the annular projection which the wall portion 514 has formed between the pressure outlet port 524 and the first drain port 528. Further movement of the valve spool 540 away from the first axial position causes leak of fluid from the pressure outlet port 524 into the first drain port 528, giving rise to a drop in the fluid pressure in the reduced line pressure outlet port 524 which is now isolated from the line pressure inlet port 522 by the first circumferential land 542 of the valve spool 540. Due to the drop in the fluid pressure in the pressure outlet port 524 and accordingly in the pressure feedback port 526, the valve spool 540 tends to be moved back toward the first axial position thereof by the force of the spring 546 overcoming the force of the fluid pressure acting on the valve spool 540 from the pressure feedback port 526. The valve spool 540 is in this fashion repeatedly switched across a second axial position on the point of opening or closing each of the line pressure inlet port 522 and the first drain port 528 with the result that the fluid pressure to be developed in the fluid circuit 538 leading from the pressure outlet and feedback ports 524 and 526 cannot be increased beyond a predetermined limit value which is dictated by the force of the spring.

Pressure Accumulator Unit 548

The first fluid outlet port 156 of the manually operated gear position selector valve 148 is in communication with the high-and-reverse clutch according fluid circuit 238 which leads to the fluid chamber for the high-and-reverse clutch 40 through the parallel combination of the orifice 240 and one-way check valve 242 as previously described. In the hydraulic control system embodying the present invention, the high-and-reverse clutch actuating fluid circuit 238 and the band actuating fluid circuit 230 are provided with a common pressure accumulator unit 548. The pressure accumulator unit 548 comprises a wall portion 550 which forms part of the body structure of the transmission control valve assembly and which is formed with a cavity 552. The cavity 552 consists of two portions having different cross-sectional areas defined by laterally or radially stepped internal peripheral wall surfaces which are laterally or radially joined by an annular or otherwise shaped internal end face 554 located at the inner axial end of the cavity portion having the larger cross-section. Within such a cavity 554 is mounted a piston 556 having a smaller flange portion 558 formed at or adjacent one axial end of the piston, a larger flange portion 560 which is axially spaced apart from the smaller flange portion 558 and which is formed at or adjacent the other axial end of the piston, and a hollow cylindrical portion 562 which is closed at its end adjacent the smaller flange portion 558 and open at its end adjacent the larger flange portion 560 as shown. The piston 556 thus constructed is accommodated in the cavity 550 in such a manner that the smaller and larger flange portions 558 and 560 are axially slidably received on the respective internal peripheral surfaces defining the cavity portions having the smaller and larger cross-sectional area, respectively. Thus, hollow cylindrical portion 562 is closed in the cavity portion with the smaller cross-sectional area and is open in the cavity portion with the larger cross-sectional area. The slidable contact between the flange portion 558 and the internal peripheral surface defining the cavity portion with the smaller cross-sectional area and the slidable contact between the larger flange portion 560 and the internal peripheral surface defining the cavity portion with the larger cross-sectional area are hermetically sealed off by suitable sealing elements 564 and 566, respectively. The cylindrical portion 562 axially extending between the flange portions 558 and 560 has a cross-sectional area which is smaller than the cross-sectional area of the cavity portion having the smaller cross-sectional area so that the piston 556 mounted in the cavity 552 forms within the cavity a first variable-volume fluid chamber 568 formed between the smaller flange portion 558 of the piston 556 and the closed, outer axial end of the cavity portion with the smaller cross-sectional area, a second variable-volume fluid chamber 570 formed in part between the annular outer face of the larger flange portion 560 and the closed, outer axial end of the cavity portion with the larger cross-sectional area and in part by the axial blind bore in the cylindrical portion 562 of the piston 556, and a third or intermediate variable-volume fluid chamber 572 axially extending between the smaller and larger flange portions 558 and 560 of the piston 556. The piston 556 is urged to axially move in a direction to contract the first variable-volume chamber 568 and expand the second variable-volume fluid chamber 570 by suitable biasing means which is shown comprising a preloaded helical compression spring 574 which is seated at one end on a closed inner face of the smaller flange portion 558 and at the other end on the end face. which the wall portion 550 has formed at the outer axial end of the cavity portion with the larger cross sectional area. The first variable-volume chamber 568 is in constant communication with the high-and-reverse clutch actuating fluid circuit 238, and the second variable-volume chamber 570 is in constant communication with the band actuating fluid circuit 230. The second or intermediate variable-volume fluid chamber 572 is in constant communication with the forward drive clutch actuating fluid circuit 172.

Second-Third Gearshift Timing Valve 576

The hydraulic control system embodying the present invention further comprises a second-third gearshift timing valve 576 which comprises a wall portion 578 which forms part of the body structure of the previously mentioned transmission control assembly and which is formed with an elongated valve chamber 580 closed at both axial ends by internal wall surfaces 582 and 584 of the wall portion 578. The wall portion 578 is further formed with line pressure inlet and outlet ports 586 and 588, and first and second drain ports 590 and 592, which are arranged in this sequence away from the internal wall surface 582 at one axial end of the valve chamber 580 with the line pressure inlet port 586 located adjacent to the wall surface 582 and the second drain port located adjacent to the internal wall surface 584 at the other axial end of the valve chamber 580, as shown. The line pressure inlet port 586 is in constant communication with the previously mentioned fluid circuit 448 leading from the line pressure outlet port 270 of the second-third gear shift valve 178 and the sixth line pressure port 428 of the line pressure booster valve 406. The line pressure outlet port 588 of the second-third gearshift timing valve 576 is in constant communication with the brake-release chamber 76' of the band servo unit 74 through a band releasing fluid circuit 594 which is provided with one-way flow restricting means composed of a parallel combination of an orifice 596 and a one-way check valve 598 which is adapted to allow fluid to flow toward the brake-release fluid chamber 76' of the band servo unit 74 through the check valve 598 but prevents fluid from flowing in the opposite direction therethrough.

Within the valve chamber 580 thus arranged is axially slidably mounted a valve spool 600 having first and second circumferential lands 602 and 604 which are arranged to be closer to the line pressure inlet port 586 and the second drain port 592, respectively. The lands 602 and 604 of the valve spool 600 are axially spaced apart from each other and thus have formed therebetween a circumferential groove which is constantly open to the first drain port 590 irrespective of the axial position of the valve spool 600 within the valve chamber 580. The groove between the lands 602 and 604 of the valve spool 600 is communicable with the line pressure outlet port 588 depending upon the axial position of the valve spool 600 within the valve chamber 580. Thus, the valve spool 600 is axially movable within the valve chamber 580 between a first axial position bearing at the axial end of its projection adjacent to the first circumferential land 602 against the internal wall surface 582 at one axial end of the valve chamber 580 as indicated by the right half of the valve spool 600, and a second axial position bearing at the axial end of its projection adjacent the second circumferential land 604 against the internal wall surface 584 at the other axial end of the valve chamber 580 as indicated by the left half of the valve spool 600. When the valve spool 600 is in the first axial position thereof, the groove between the lands 602 and 604 of the valve spool is open to both of the line pressure outlet port 588 and the first drain port 590. When the valve spool 600 is in the second axial position thereof, the groove between the lands 602 and 604 is open to the first drain port 590 with the first circumferential land 602 moved past the line pressure inlet and outlet ports 586 and 588 which are accordingly open to each other. The valve spool 600 is urged to move toward the first axial position thereof by means of a preloaded helical compression spring 606 which is shown seated at one end on the axially outer end face of the second circumferential land 604 of the valve spool 600 and at the other end on the internal wall surface 584 adjacent to the second drain port 592. The first drain port 590 is open to the transmission oil sump through an orifice 608 so that, when communication is provided between the line pressure outlet port 588 and the first drain port 590, the fluid pressure developed in the line pressure outlet port 588 is released at a limited rate. The line pressure outlet port 588 of the second-third gearshift timing valve 576 communicates not only with the above mentioned band releasing fluid circuit 594 but with a third-second gear shift timing valve 610.

Third-Second Gearshift Timing Valve 610

The third-second gearshift timing valve 610 comprises a wall portion 612 which forms part of the body structure of the transmission control valve assembly and which is formed with an elongated valve chamber 614 which is closed at both axial ends by internal wall surfaces 614a and 614b of the wall portion 612. The wall portion 612 is further formed with a governor pressure port 616, first and second fluid discharge ports 618 and 620, and a drain port 622. The governor pressure port 616 is located adjacent to the internal wall surface 614a at one axial end of the valve chamber 614 and the drain port 622 is located adjacent to the internal wall surface 614b at the other axial end of the valve chamber 614. The first fluid discharge port 618 is located closer to the drain port 622 and the second fluid discharge port 620 is located closer to the governor pressure port 616, as shown. The governor pressure port 616 is in constant communication with the previously described governor pressure circuit 174. The second fluid discharge port 620 is in constant communication with the line pressure outlet port 588 of the above described second-third gearshift timing valve 576 and accordingly with the brake-release fluid chamber 76' of the band servo unit 74 across the parallel combination of the orifice 596 and one-way check valve 598. The second fluid discharge port 620 of the third-second gearshift timing valve 610 communicates directly with the band releasing fluid circuit 594 in parallel with the combination of the one-way flow restricting means constituted by the combination of the orifice 596 and check valve 598.

Within the valve chamber 614 thus arranged is axially slidably mounted a valve spool 624 having first and second circumferential lands 626 and 628 which are arranged to be closer to the governor pressure port 616 and the drain port 622, respectively. The lands 626 and 628 of the valve spool 624 are axially spaced apart from each other and, thus, have formed therebetween a circumferential groove which is constantly open to the first fluid discharge port 618 irrespective of the axial position of the valve spool 624 within the valve chamber 614. The groove between the lands 626 and 628 of the valve spool 624 is communicable with the second fluid discharge port 620 depending upon the axial position of the valve spool 624 within the valve chamber 614. Thus, the valve spool 624 is axially movable within the valve chamber 614 between a first axial position bearing at the axial end of its projection adjacent the first circumferential land 626 against the internal wall surface 616 at one axial end of the valve chamber 614 as indicated by the right half of the valve spool 624, and a second axial position bearing at the axial end of its projection adjacent to the second circumferential land 628 against the internal wall surface 618 at the other axial end of the valve chamber 614 as indicated by the left half of the valve spool 624. When the valve spool 624 is in the first axial position thereof, communication is provided between the first and second fluid discharge ports 618 and 620. When the valve spool 624 is in the second axial position thereof, all the ports 616, 620 and 622 are isolated from one another by the lands 626 and 628 of the spool 624. The third-second gearshift timing valve 610 thus arranged constitutes bypass means bypassing the above-mentioned one-way flow restricting means.

High-and Reverse Clutch Actuating Pressure Reducing Valve 632

The hydraulic contol system embodying the present invention further comprises a high-and-reverse clutch actuating pressure reducing valve 632 comprising a wall portion 634 forming part of the body structure of the previously described transmission control valve assembly. The wall portion 634 is formed with an elongated valve chamber 636 closed at both axial ends by internal wall portions 638 and 640 of the wall portion 634. The wall portion 634 is further formed with a line pressure inlet port 642, a pressure outlet port 644, a pressure feedback port 646, first and second drain ports 648 and 650, and a throttle pressure port 652. The line pressure feedback port 646 and the throttle pressure port 652 are located adjacent to the above mentioned internal wall surfaces 638 and 640, respectively, at the opposite axial ends of the valve chamber 636. The first and second drain ports 648 and 650 are located next to the pressure feedback port 646 and the throttle pressure port 652, respectively, with the line pressure inlet port 642 located between the line pressure outlet port 644 and the first drain port 648. The drain ports 648 and 650 are open to the transmission oil sump. The throttle pressure port 652 is in constant communication with the throttle pressure circuit 382. The line pressure inlet port 642 is in constant communication with the previously described fluid circuit 448 leading from the line pressure outlet port 270 of the second-third gear shift valve 178. The pressure outlet port 644 and the pressure feedback port 646 communicate each other through a line pressure feedback passageway 656 provided with an orifice 654 and are further in constant communication jointly to the high-and-reverse clutch actuating fluid circuit 238 across a two-inlet shuttle valve 658. The shuttle valve 658 has one inlet port communicating directly with the first variable-volume fluid chamber 568 of the previously described pressure accumulator unit 548 and through the parallel combination of the orifice 240 and the one-way check valve 242 to the first fluid outlet port 156 of the manually operated gear position selector valve 148. The other inlet port of the shuttle valve 658 is in constant communication with the line pressure outlet port 644 of the high-and-reverse clutch actuating pressure reducing valve 632, and the outlet port of the shuttle valve 658 is in constant and direct communication with the fluid chamber for the piston operated high-and-reverse clutch 40.

Within the valve chamber 636 thus arranged is axially slidably mounted a valve spool 660 having first, second and third circumferential lands 662, 664 and 666 which are arraged in this sequence away from the internal wall surface 638 adjacent to the line pressure feedback port 646. The lands 662, 664 and 666 of the valve spool 660 are axially spaced apart from each other and have a circumferential groove formed between the first and second circumferential lands 662 and 664 and a circumferential groove formed between the second and third circumferential lands 664 and 666. The groove between the second and third circumferential lands 664 and 666 if constantly open to the pressure outlet port 644 irrespective of the axial position of the valve spool 660 within the valve chamber 636 and is selectively open to the pressure inlet port 642 or to the second drain port 650 depending upon the axial position of the valve spool 660 within the valve chamber 636. The valve spool 660 is, thus, axially movable within the valve chamber 636 into and out of a limit axial position bearing at its axial end adjacent the first circumferential land 662 against the internal wall surface 638 adjacent to the pressure feedback port 646 as indicated by the right half of the valve spool 660. While the second and third circumferential lands 662 and 664 have substantially equal cross sectional areas, the first circumferential land 662 of the valve spool 660 is larger in cross sectional area than the remaining two circumferential lands 664 and 666. The valve spool 660 is urged to move to or stay in the limit axial position thereof by means of a preloaded compression spring 668 which is shown seated at one end on the axially outer end face of the third circumferential land 666 of the valve spool 660 and at the other end on the internal wall surface 640 adjacent to the throttle pressure port 652.

When the valve spool 660 thus configured is in the limit axial position thereof, the second drain port 650 is closed by the third circumferential land 666 of the valve spool 660 and communication is provided between the pressure inlet and outlet ports 642 and 644 through the groove between the second and third circumferential lands 664 and 666. When a line pressure Pl is directed into the line pressure inlet port 642 under these conditions, the line pressure is passed through the pressure outlet port 644 of the high-and-reverse clutch actuating pressure reducing valve 632 and through the shuttle valve 658 to the fluid chamber of the high-and-reverse clutch 40. The line pressure developed in the line pressure outlet port 644 is also directed into the pressure feedback port 646 through the passageway 656 and acts on the end face of the first circumferential land 662 of the valve spool 660, urging the valve spool 660 to move away from the first axial position thereof. In the throttle pressure port 652 is developed a throttle pressure Pt variable with the opening degree of the carburetor throttle valve. The force urging the valve spool 660 to move away from the limit axial position is, thus, opposed by the force of the spring 668 and the force resulting from the throttle pressure Pt in the throttle pressure port 652. As a consequence, the valve spool 660 attempts to stay in an equilibrium axial position in which the forces thus urging the valve spool 660 to move in the opposite directions are equally balanced. Since, thus, the fluid pressure to be developed in the line pressure port 644 is variable with the throttle pressure Pt appearing in the throttle pressure port 652, the fluid pressure to be supplied to the high-and-reverse clutch 40 varies continuously with the throttle pressure Pt as indicated by plot i-j in FIG. 3. Under kickdown condition produced with the accelerator pedal a distance greater than a predetermined value from the fully released position thereof, the throttle pressure Pt is increased to the level of the line pressure Pl so that the fluid pressure appearing in the line pressure outlet port 644 of the high-and-reverse actuating clutch pressure reducing valve 632 is also increased to and maintained at a fixed level lower than the line pressure Pl as indicated by plot j-k-l.

Hydraulic Control System Operation

Throughout the condition in which the engine is in operation delivering power output from the crankshaft, the pressure regulator valve 94 is supplied at the first and second line pressure ports 104 and 106 with a pump pressure delivered from the engine driven transmission oil pump assembly 36 through the main line pressure circuit 138. The fluid in the main line pressure circuit 138 is also fed to the first and third line pressure ports 352 and 356 of the transmission throttle valve 332. The valve sleeve 386 of the throttle failsafe valve 384 being held in the first axial position thereof by the force of the spring 378 under normal conditions, the third line pressure port 356 of the throttle valve 332 is kept closed by the third circumferential land 392 of the failsafe valve sleeve 386. On the other hand, the fluid pressure developed in the first line pressure port 352 is allowed into the groove between the second and third circumferential lands 368 and 370 of the throttle valve spool 362 urged to move toward the first axial position thereof by the spring 378 and is passed through the groove to the second throttle pressure port 344 and past this port 344 to the first throttle pressure port 342 of the throttle valve 332 through the fluid passageway 380. The valve spool 362 is axially moved by the fluid pressure thus developed in the first throttle pressure port 342 away from the first axial position thereof against the force of the spring 378 and develops a throttle pressure Pt in the first and second throttle pressure ports 342 and 344 of the throttle valve 332 in an attempt to maintain the previously mentioned second axial position thereof which is on the point of closing the line pressure port 352 and opening up the first drain port 358 of the throttle valve 332 as previously described. The throttle pressure Pt thus developed at the second throttle pressure port 344 is directed through the throttle pressure circuit 382 to the third and fourth throttle pressure ports 346 and 348 of the throttle valve 332 and further to the pressure inlet port 456 of the pressure modifier valve 450 through the shuttle valve 446. In response to the throttle pressure Pt developed at the pressure inlet port 456 thereof, the pressure modifier valve 450 produces at the modified presure outlet and feedback ports 458 and 460 a modified throttle pressure Pmt which is equal to the throttle pressure Pt when the latter is lower than the previously mentioned predetermined limit value and which is maintained at the limit value to be determined by the force of the spring 476 when the throttle pressure Pt supplied from the throttle valve 332 is higher than the particular value as previously described. The modified throttle pressure Pmt developed at the modified pressure outlet and feedback ports 458 and 460 of the throttle pressure modifier valve 450 is directed through the modified pressure circuit 468 to the first and second modified throttle pressure ports 108 and 110 of the pressure regulator valve 94. Thus, the pressure regulator valve 94 develope a line pressure Pl which is dictated by the force of the spring 136 and the modified throttle pressure Pmt in each of the modified pressure ports 108 and 110 in whichsoever position the transmission gear shift valve may be held with the engine in operation. Under a condition in which the transmission gear shift lever is in any of the forward drive range positions "D", "2" and "1", the pressure regulator valve 94 is further supplied with the line pressure at the third line pressure port 112 so as to reduce the line pressure from a level which is to be obtained in the reverse drive gear position "R" as will be discussed in more detail.

The line pressure Pl is, thus, continuously variable with the modified throttle pressure Pmt which in turn is variable with the throttle pressure Pt. The throttle pressure Pt in turn is continuously variable with the force of the spring 378 seated between the valve spool 362 and the valve plunger 364 of the transmission throttle valve 332. The force of the spring 378 is, further in turn, continuously variable with the spacing between the valve spool 362 and the valve plunger 364 which is to be axially moved toward and away from the valve spool 362 when the accelerator pedal is depressed from the released position thereof. In this fashion, the line pressure Pl developed by the pressure regulator valve 94 is continuously variable with the opening degree of the carburetor throttle valve which is continuously movable between an idling position and a full throttle position through a part throttle position depending upon the position of the accelerator pedal. The line pressure Pl thus variable with the opening degree of the carburetor throttle valve is indicated by plot m-n in FIG. 3, in which the above mentioned predetermined value of the carburetor throttle valve is assumed to be approximately one half of the opening degree of the carburetor throttle valve in the full throttle position which is indicated by 4/4 on the axis of abscissa. When the opening degree of the carburetor throttle valve is larger than the predetermined value, the throttle pressure Pt developed by the transmission throttle valve 332 is higher than a predetermined level so that the modified throttle pressure Pmt is maintained at the particular level of the throttle pressure Pt with the result that the line pressure Pl developed by the pressure regulator valve 94 responsive to such a value of the modified throttle pressure Pmt is maintained at a predetermined value, as indicated by plot n-d in FIG. 3.

The line pressure Pl thus developed by the pressure regulator valve 94 is constantly directed through the main line pressure circuit 138 to the fluid inlet port 154 of the manually operated gear position selector valve 148 and distributed through the gear position selector valve 148 selectively to the respective fluid chambers for the clutches 40 and 42 and the brake 68 and the brake-apply and brake-release fluid chambers 76 and 76' of the band servo unit 74 primarily depending upon the axial position selected of the valve spool 164 of the manually operated gear position selector valve 148. As previously discussed in detail, the valve spool 164 of the gear position selector valve 148 of the hydraulic control system embodying the present invention is adapted to provide communication between the fluid inlet port 154 and each of the first, second, third and fourth fluid outlet ports 156, 158, 160 and 162 in accordance with the schedules which are indicated in Table 2.

TABLE 2

| Gear Positions | Port 156 | Port 158 | Port 160 | Port 162 |
|---|---|---|---|---|
| "P" | x | x | x | x |
| "R" | o | x | x | x |
| "N" | x | x | x | x |
| "D" | x | o | x | x |
| "2" | x | o | o | x |
| "1" | x | o | o | o |

In Table 2, the sign "o" indicates that the fluid outlet port in question is in communication with the fluid inlet port 154 so that a line pressure Pl is developed in the particular fluid outlet port, and the sign "x" indicates that the fluid outlet port in question is in a condition drained off through either of the open axial ends of the valve chamber 152 of the gear position selector valve 148.

Automatic Forward Drive Range Position "D"

When the transmission gear shift lever is manually moved from the neutral gear position "N" to the automatic forward drive range position "D" with the engine maintained operative in idling condition, the valve spool 164 of the gear position selector valve 148 is moved into the axial position providing communication between the fluid inlet port 154 and the second fluid outlet ports 158 and maintaining the remaining fluid outlet ports 156, 160 and 162 open to the transmission oil sump. The line pressure which has been directed through the main line pressure circuit 138 to the fluid inlet port 154 of the gear position selector valve 148 is now permitted to pass through the second fluid outlet port 158 of the valve 148 to the forward drive clutch actuating fluid circuit 172. The line pressure thus developed in the fluid circuit 172 is passed on the one hand to the line pressure port 494 of the throttle pressure modulator valve 478 and on the other hand toward the fluid chamber for the forward drive clutch 42. In the throttle pressure modulator valve 478, the valve spool 502 is being subjected to the force of the spring 510 urging the spool 502 to move toward the first axial position to close the line pressure port 494 and to the throttle pressure Pt which is introduced into the throttle pressure port 488 through the throttle pressure circuit 382 and which urges the valve spool 502 in the opposite direction against the force od the spring 510. When the engine is in idling condition or the opening degree of the carburetor throttle valve is smaller than a predetermined value (which is assumed to be one half of the opening degree of the valve in the full throttle position), the force resulting from the throttle pressure Pt acting on the valve spool 502 of the throttle pressure modulator valve 478 is overcome by the force of the spring 510 so that the valve spool 502 is held in the previously mentioned limit axial position thereof maintaining the line pressure port 494 closed by the third circumferential land 508 and providing communication between the modulated throttle pressure outlet port 492 and the kickdown port 490 of the modulator valve 478 as indicated by the lower half of the modulator valve 478. When the valve spool 502 is held in this axial position, the modulated throttle pressure outlet port 492 and accordingly the modulated throttle pressure feedback port 496 of the valve 478 are in communication with the valve chamber 336 of the transmission throttle valve 332 through the fluid passageway 498 and the second radial port 402 in the valve sleeve 386 of the throttle failsafe valve 384 and are therefore drained off through the valve chamber 336 and the second drain port 360 of the throttle valve 332. Under these conditions, there is no fluid pressure developed in the modulated throttle pressure circuit 254. When the carburetor throttle valve is open with a degree larger than the above mentioned predetermined value, the throttle pressure Pt acting on the valve spool 502 of the throttle pressure modulator valve 478 overcomes the opposing force of the spring 510 and causes the valve spool 502 to move away from the limit axial position against the force of the spring 510. As the valve spool 502 is thus axially moved and reaches an axial position isolating the modulated throttle pressure outlet port 492 from the kickdown port 490 by the second circumferential land 506 thereof and providing communication between the line pressure port 494 and the modulated throttle pressure port 492, the line pressure which has been developed in the line pressure port 494 as above discussed is allowed into the modulated throttle pressure outlet port 492 and through the feedback passageway 500 into the modulated throttle pressure feedback port 496. The valve spool 502 of the throttle pressure modulator valve 478 is now subjected to a third force produced by the fluid pressure thus developed in the modulated throttle pressure feedback port 496 and is urged to move back toward the initial limit axial position thereof. The valve spool 502 is in these manners maintained in the previously mentioned second axial position thereof which is on the point of closing the line pressure port 494 and providing communication between the modified throttle pressure outlet port 492 and the kickdown pressure port 490, thereby developing a modulated throttle pressure Pdt which increased with an increase in the throttle pressure Pt acting on the valve spool 502 from the throttle pressure port 488 and accordingly with an increase in the opening degree of the carburetor throttle valve when the carburetor throttle valve opening degree is larger than the previously mentioned predetermibed value, as indicated by the plot g-h in FIG. 3. The modulated throttle pressure Pdt thus developed by the throttle pressure modulator valve 478 is directed through the modulated throttle pressure circuit 254 to the corresponding ports 198, 274 and 314 of the first-second gear shift valve 176, the second-third gear shift 178 and the third-second downshift valve 306, respectively.

On the other hand, the line pressure directed toward the fluid chamber for the forward drive clutch 42 through the forward drive clutch actuating fluid circuit 172 is passed through the orifice 250 to the fluid chamber of the clutch 42 and to the third or intermediate variable-volume fluid chamber 572 of the pressure accumulator unit 548. The fluid pressure introduced into the third variable-volume fluid chamber 572 of the pressure accumulator unit 548 acts on the differential pressure acting area between the smaller and larger flange portions 558 and 560 of the piston 556 and causes the piston 556 to move in a direction to expand the third variable-volume fluid chamber 572 and accordingly contract the second variable-volume fluid chamber 570 against the opposing force of the spring 574. Thus, the fluid pressure to be developed in the fluid chamber for the clutch 42 is partially taken up by the compression of the spring 574 of the pressure accumulator unit 548 until the second variable-volume fluid chamber 570 of the unit 548 is contracted to a certain limit degree with the larger flange portion 560 of the piston 556 brought into pressing contact with the annular internal surface 554 of the wall portion 550. The forward drive clutch 42 is, in these manners, enabled to couple incipiently at a limited, relatively low rate and thereafter at a steeply increasing rate. The shocks which are usually encountered when a shift is being made from the neutral gear position "N" to the automatic forward drive range position "D" in the transmission mechanism of an ordinary power transmission system can thus be advantageously avoided by the provision of the orifice 250 and the pressure accumulator unit 548.

The forward drive clutch 42 being now coupled, the driving torque which has been delivered from the torque converter 14 to the transmission input shaft 28 is transmitted to the output shaft 64 through the first and secondary planetary gear assemblies 52 and 54 in the transmission mechanism shown in FIG. 1, as previously discussed, thereby establishing the first or "low" gear ratio ($D_1$) in the automatic forward drive range "D" in the transmission mechanism.

The line pressure Pl developed in the forward drive clutch actuating fluid circuit 172 is also directed to the line pressure inlet port 190 of the first-second gear shift valve 176 and further to the transmission governor assembly 84, which produces in the governor pressure circuit 174 a governor pressure Pg continuously variable with the vehicle speed as previously discussed. The governor pressure Pg acts on the respective first valve spools 210 and 282 of the first-second and second-third gear shift valves 176 and 178 and urge the valve spools 210 and 282 to move away from their respective first axial positions toward their respective second axial positions. In the absence of a fluid pressure in the fluid passageway 234 leading to the second line pressure inlet port 194 of the first-second gear shift valve 176, the first and second valve spools 210 and 212 of the gear shift valve 176 are urged to be held together by the governor pressure thus acting on the first valve spool 210 and the force of the spring 228 acting on the second valve spool 212, and are maintained in their respective first axial positions as shown by the right halves of the spools when the governor pressure Pg is lower than a predetermined value so that the force resulting from the governor pressure acting on the first circumferential land 214 of the first valve spool 210 is overcome by the opposing force of the spring 228. The first valve spool 210 of the first-second gear shift valve 176 being held in the first axial position thereof, the line pressure port 190 of the gear shift valve 176 is closed by the second circumferential land 216 of the valve spool 210 so that there is no fluid pressure developed in the line pressure outlet port 192 of the valve 176. If, under these conditions, the accelerator pedal is depressed to such an extent that the carburetor throttle valve is open with a degree larger than the previously mentioned predetermined value thereof, there is a modulated throttle pressure Pdt in the modulated pressure port 198 of the first-second gear shift valve 176 so that the first valve spool 210 is urged to stay in the first axial position thereof not only by the force of the spring 228 but by the modulated throttle pressure Pdt acting on the differential pressure acting area between the second and third circumferential lands 216 and 218 of the valve spool 210.

As the vehicle speed is increased and exceeds the above mentioned predetermined value thereof, the force of the spring 228 or the sum of the force of the spring 228 and the force resulting from the modulated throttle pressure Pg acting upon the first valve spool 210 of the first-second gear shift valve 176 is overcome by the force resulting from the governor pressure Pg acting on the first valve spool 210 with the result that the first valve spool 210 and accordingly the second valve spool 212 are caused to move away from their respective first axial positions toward their respective second axial positions which are shown by the left halves of the valve spools 210 and 212. In the course of the movement toward the second axial position thereof, the second circumferential land 216 of the first valve spool 210 moves past the annular projection between first line pressure inlet port 190 and the modulated throttle pressure port 198. If there is a modulated throttle pressure Pdt present in the port 198 at this instance, the modulated throttle pressure acts on the differential pressure acting area between the second and third circumferential lands 214 and 216 of the valve spool 210 while the port 198 is open. When, under this condition, the valve spool 210 reaches an axial position closing the modulated throttle pressure port 198 by the second circumferential land 216, the modulated throttle pressure which has been developed in the port 198 is confined in the groove between the second and third circumferential pands 216 and 218 and remains effective to urge the valve spool 210 toward the first axial position of the spool 210. At a point of time when the valve spool 210 thereafter reaches an axial position having the third circumferential land 218 totally surrounded by the second drain port 204, the fluid pressure which has been acting on the differential pressure acting area between the second and third circumferential lands 216 and 218 of the valve spool 210 is discharged through the drain port 204 so that the valve spool 210 is released from the force resulting from the fluid pressure acting on the differential pressure acting the valve spools 210 and 212 are permitted to move at a stroke into their respective second axial positions. Communication is now provided between the line pressure inlet and outlet ports 190 and 192 of the first-second gear shift valve 176 and allows the line pressure in the forward drive clutch actuating fluid circuit 172 is allowed to extend through these ports 190 and 192 to the band actuating fluid circuit 230 leading to the brake-apply fluid chamber 76 of the band servo unit 74. The line pressure thus directed toward the brake-apply fluid chamber 76 of the band servo unit 74 is passed through the orifices 244 and 248 provided in the fluid circuit 230 and past the orifice 244 into the second variable-volume fluid chamber 570 of the pressure accumulator unit 548 which has been held in a condition in which the particular fluid chamber 570 is contracted to a limit degree as previously noted. The fluid pressure admitted into the second variable-volume fluid chamber 570 of the pressure accumulator unit 548 acts on the piston 556 and causes the piston to move in a direction to expand the variable-volume chamber 570 in cooperation with the spring 574 of the accumulator unit 548 against the force being exerted on the differential pressure acting area between the flange portions 558 and 560 of the piston 556 by the line pressure of the fluid filling the third or intermediate variable-volume fluid chamber 572. Thus, the flow of the fluid to be directed to the brake-apply fluid chamber 76 of the band servo unit 74 is restricted by the orifices 244 and 248 in the band actuating fluid circuit 230 and, at the same time, the fluid pressure to be developed in the chamber 76 of the servo unit 74 partially taken up by the contraction of the third variable-volume fluid chamber 572 of the pressure accumulator unit 548 until the second variable-volume fluid chamber 570 is expanded to a certain limit degree. In this fashion, the brake band 72 is applied with a force which initially increases at a limited, relatively low rate and which thereafter increases at an exponentially increasing rate. A shift is therefore made from the first gear ratio ($D_1$) to the second gear ratio ($D_2$) in the automatic forward drive range in the transmission mechanism shown in FIG. 1 without producing shocks which are usually accompanied by shifting between the gear ratios in the transmission mechanism of an ordinary power transmission system. The fluid to be forced out of the third or intermediate variable-volume fluid chamber 572 of the pressure accumulator unit 548 when the second variable-volume fluid chamber 570 of the unit is being expanded is passed back to the forward drive clutch actuating circuit 172 (and further to the band actuating fluid circuit 230 via the ports 190 and 192 of the first-second gear shift valve 176) through the one-way check valve 252 bypassing the associated orifice 250 and is therefore withdrawn from the fluid chamber 572 of the pressure accumulator unit 548 at a relatively high rate. The line pressure developed in the band actuating fluid circuit 230 is also directed to the line pressure inlet port 268 of the second-third gear shift valve 178 and to the holding port 426 of the line pressure booster valve 406. When the governor pressure Pg developed in the governor pressure port 266 of the second-third gear shift valve 178 is lower than a predetermined value, the first and second valve spools 282 and 284 of the gear shift valve 178 are held in their respective first axial positions indicated by the right halves of the spools by the force of the spring 296 and, when the opening degree of the carburetor throttle valve is larger than the previously mentioned predetermined value, further by the force resulting from the modulated throttle pressure Pdt acting on the differential pressure acting area between the first and second circumferential lands 290 and 292 of the second valve spool 284. Under these conditions, the line pressure inlet port 268 of the second-third gear shift valve 178 is kept closed by the second circumferential land 288 of the first valve spool 282 of the gear shift valve 178 so that there is no fluid pressure developed in the fluid circuit 448 leading to the trigger port 428 of the line pressure booster valve 406, which is accordingly maintained in a condition having the valve spool 430 held in the first axial position thereof by the force of the spring 442. The holding port 426 of the booster valve 406 is therefore closed by the second circumferential land 434 of the booster valve spool 430 and, as a consequence, the line pressure directed into the port 426 is not allowed to act on the booster valve spool 430.

When the vehicle speed is thereafter increased to a certain relatively high level, the governor pressure Pg acting on the first valve spool 282 of the second-third gear shift valve 178 reaches the above mentioned predetermined value thereof and overcome the opposing force of the spring 296 or, when the opening degree of the carburetor throttle valve is larger than the previously mentioned predetermined value thereof, the sum of the force of the spring 296 and the force resulting from the modulated throttle pressure Pdt acting on the differential pressure acting area betweeen the first and second circumferential lands 290 and 292 of the second valve spool 284. The first and second valve spools 282 and 284 of the second-third gear shift valve 178 are now moved away from their respective first axial positions toward the respective second axial positions thereof. If, in this instance, there is a modulated throttle pressure Pdt present in the modulated throttle pressure port 274 of the second-third gear shift valve 178, the first and second valve spools 282 and 284 must be moved against not only the force of the spring 296 but the modulated throttle pressure port acting on the differential pressure acting area of the second valve spool 284 as above mentioned in their way toward the second axial positions thereof. At an instant the first circumferential land 290 of the second valve spool 284 is axially moved past the annular projection between the modulated throttle pressure port 274 and the second drain port 280 of the gear shift valve 178, however, the modulated throttle pressure in the port 274 is allowed into the drain port 280 so that the first and second valve spools 282 and 284 are cleared of the force resulting from the modulated throttle pressure and are accordingly permitted to move into the respective second axial positions thereof in a moment after such an instant. After the valve spools 282 and 284 are moved into the second axial positions thereof, the modulated throttle pressure port 274 of the second-third gear shift valve 178 is closed by the first circumferential land 290 of the second valve spool 284 so that there is established a modulated throttle pressure Pdt in the fluid circuit 254 for a second time.

With the first and second valve spools 282 and 284 of the second-third gear shift valve 178 thus moved into the respective second axial positions thereof, communication is now provided between the line pressure inlet and outlet ports 268 and 270 of the gear shift valve 178 and allows the line pressure to be passed from the band actuating fluid circuit 230 to the fluid circuit 448 through these ports 268 and 270 and the orifice 300 located upstream of the line pressure inlet port 268. The line pressure developed in the fluid circuit 448 is directed on the one hand to the trigger port 428 of the line pressure booster valve 406 and on the other hand to the respective line pressure inlet ports 586 and 642 of the second-third gearshift timing valve 576 and the high-and-reverse clutch pressure reducing valve 632. The line pressure directed to the trigger port 428 of the line pressure booster valve 406 is admitted into the axial blind bore 438 in the booster valve spool 430 through the radial port 440 in the valve spool 430 which is held in the first axial position thereof as above described. The line pressure thus developed in the axial blind bore 438 causes the valve spool 430 to move from the first axial position to the second axial position thereof against the force of the spring 442. When the valve spool 430 reaches the second axial position thereof as indicated by the lower half of the valve spool, the radial port 440 in the valve spool 430 is isolated from the trigger port 428 but is now brought into communication with the holding port 426 of the booster valve 406 and is enabled to stay in the second axial position by the line pressure developed in the blind axial bore 438 on a portion of the valve chamber 412 by the line pressure which is present in the fifth line pressure port 426. Thus, the trigger port 428 of the line pressure booster valve 406 serves to pass therethrough the line pressure to trigger the valve spool 430 to move from the first axial position to the second axial position while the holding port 426 of the valve 406 serves to provide a passageway for the line pressure to hold the valve spool 430 in the second axial position thus reached by the spool 406. The second and accordingly third line pressure inlet ports 420 and 422 of the line pressure booster valve 406 are drained off through the third drain port 361 of the transmission through valve 332 with the valve sleeve 386 of the throttle failsafe valve 384 maintained in the first axial position thereof by the force of the spring 378 as shown by the upper half of the valve sleeve 386. On the other hand, the first line pressure port 418 and the line pressure outlet port 424 of the line pressure booster valve 406 are in communication with each other through the groove between the first and second circumferential lands 432 and 434 of the booster valve spool 430 in the second axial position thereof but are drained off through the third fluid outlet port 160 of the gear position selector valve 148.

During an incipient stage after communication is provided between the line pressure inlet and outlet ports 268 and 270 of the second-third gear shift valve 178, the flow rate of the fluid to be passed from the band actuating fluid circuit 230 to the fluid passage 448 downstream of the line pressure outlet port 270 is restricted by the orifice 300 located upstream of the line pressure inlet port 268. For a certain period of time after a fluid pressure is first developed in the fluid circuit 448, the fluid pressure directed by way of the fluid circuit 448 to the line pressure inlet port 586 of the second-third gearshift timing valve 576 is, for this reason, not permitted to rise to a predetermined value dictated by the force of the spring 606 of the timing valve 576 and is therefore not unable to overcome the opposing force of the spring 606 so that the valve spool 600 of the valve 576 is maintained in situ in the presence of a fluid pressure in the line pressure inlet port 586. The fluid pressure developed in the fluid circuit 448 is also directed to the pressure inlet port 642 of the high-and-reverse clutch actuating pressure reducing valve 632 which has been maintained in a condition having the valve spool 660 held in the first axial position thereof by the force of the associated spring 668 and the throttle pressure Pt developed in the throttle pressure port 652 of the valve 632. When the valve spool 660 of the high-and-reverse clutch actuating pressure reducing valve 632 is in the first axial position, there is established communication between the pressure inlet and outlet ports 642 and 644 and through the pressure outlet port 644 and the feedback passageway 656 between the pressure inlet and feedback ports 642 and 646 as previously described. The fluid pressure directed through the fluid circuit 448 to the pressure inlet port 642 of the pressure reducing valve 632 is, therefore passed over to the pressure feedback port 646 of the valve 632 and acts upon the outer end face of the first circumferential land 662 of the valve spool 660. For some time after fluid has been delivered to the pressure reducing valve 632, however, the pressure of the fluid is not permitted to rise sufficiently so that the fluid pressure acting on the first circumferential land 662 of the valve spool 660 from the feedback port 646 is unable to overcome the sum of the force of the spring 668 and the force resulting from the throttle pressure Pt being developed in the throttle pressure port 652 of the pressure reducing valve 632. The valve spool 660 of the high-and-reverse clutch actuating pressure reducing valve 632 is, for this reason, held in the initial first axial position thereof maintaining the communication between the pressure inlet and outlet ports 642 and 644 in the presence of a fluid pressure in the pressure feedback port 646. The fluid pressure which has reached the pressure inlet port 642 of the pressure reducing valve 632 is therefore passed through the pressure outlet port 644 of the valve 632 and is directed to the fluid chamber for the high-and-reverse clutch 40 by way of the shuttle valve 658 without being subjected to the pressure reducing effect of the valve 632, thereby causing the high-and-reverse clutch 40 to couple at a relatively high rate limited only by the flow rate of fluid through the orifice 300 after the second-third gear shift valve 178 has been conditioned to provide communication between the pressure inlet and outlet ports 268 and 270 thereof. When the high-and-reverse clutch 40 is thus initiated into motion to couple, the brake band 72 is still maintained in a condition applied by the fluid pressure developed in the brake-release fluid chamber 76' of the band servo unit 74 in the absence of fluid in the brake-release fluid chamber 76' of the band servo unit 74.

The flow rate of the fluid through the orifice 300 located upstream of the pressure inlet port 268 of the second-third gear shift valve 178 increases exponentially. When the fluid pressure in the fluid circuit 448 is increased to the above mentioned predetermined value dictated by the spring 606 of the second-third gearshift timing valve 576, the force of the spring 606 is overcome by the fluid pressure developed in the pressure inlet port 586 of the timing valve 576 and allows the valve spool 600 to move from the first axial position indicated by the right half of the spool to the second axial position indicated by the left half of the spool, thereby providing communication between the pressure inlet and outlet ports 586 and 588 of the timing valve 576. The fluid pressure in the fluid circuit 448 is now permitted to pass through the second-third gearshift valve 576 and through the one-way check valve 598 to the brake-release fluid chamber 76' of the band servo unit 74 with the result that the brake band 72 is released by the fluid pressure developed in the chamber 76' of the servo unit 74. The fluid pressure which has been developed in the brake-apply chamber 76 of the band servo unit 74 is forced out of the chamber 76 and returned to the band actuating fluid circuit 230 as the fluid pressure is thus introduced into the brake-release fluid chamber 76' of the band servo unit 74. While the brake band 72 is in this fashion being released, the fluid pressure acting on the pressure feedback port 646 of the high-and-reverse clutch actuating pressure reducing valve 632 is increased to a level capable of overcoming the sum of the force of the spring 668 and the force resulting from the throttle pressure acting on the valve spool 660 from the throttle pressure port 652 of the pressure reducing valve 632 and causes the valve spool 660 to move from the first axial position to the second axial position indicated by the left half of the valve spool 660. When the valve spool 660 is in the second axial position thereof, the fluid pressure occurring in the pressure outlet port 644 of the pressure reducing valve 632 is maintained at the particular level reached by the fluid pressure in the pressure inlet port 642 at the instant the valve spool 660 was initiated into motion to move from the first axial position toward the second axial position thereof by the fluid pressure developed in the pressure inlet port 642. After such a level is reached by the fluid pressure in the pressure inlet port 642 of the pressure reducing valve 632, the high-and-reverse clutch 40 is caused to couple at a substantially constant rate toward the fully coupled condition. Thus, the high-and-reverse clutch 40 is coupled prior to the point of time when the brake band 72 is released so that there is no time duration for which both of the high-and-reverse clutch 40 and the brake band 68 are held inoperative. This prevents the engine from racing when shift is being made from the second gear ratio ($D_2$) to the third gear ratio ($D_3$) in the automatic forward drive range. When the brake band 72 is completely released and the high-and-reverse clutch 40 is completely coupled, the third gear ratio ($D_3$) in the automatic forward drive range is established in the transmission mechanism with both of the high-and-reverse clutch 40 and the forward drive clutch 42 held operative.

At vehicle speeds producing the third gear ratio ($D_3$) in the automatic forward drive range, the governor pressure Pg directed from the governor pressure circuit 174 to the governor pressure port 312 of the third-second downshift valve 306 normally assumes such a value that is effective to overcome the sum of the force of the spring 330 and the force resulting from the modulated throttle pressure Pdt acting from the modulated throttle pressure inlet port 314 of the downshift valve 306 on the differential pressure acting area between the first and second circumferential lands 324 and 326 of the downshift valve spool 322, which is accordingly held in the second axial position indicated by the left half of the valve spool 322. The modulated throttle pressure outlet port 316 of the third-second downshift valve 306 is therefore isolated from the modulated pressure inlet port 314 with the result that the modulated throttle pressure Pdt present in the modulated throttle pressure circuit 254 is not extended to the control port 272 of the second-third gear shift valve 178. If, under these conditions, the accelerator pedal which has been depressed to such an extent that the opening degree of the carburetor throttle valve is larger than the previously mentioned predetermined degree (hence the modulated throttle pressure Pdt is present) is further depressed and as a consequence the throttle pressure Pt and accordingly the modulated throttle pressure Pdt are increased to certain values, the sum of the spring 330 in the third-second downshift valve 306 and the force produced by the modulated throttle pressure acting on the differential pressure acting area of the valve spool 322 of the downshift valve 306 overcomes the opposing force exerted by the governor pressure Pg acting on the valve spool 322. This causes the valve spool 322 of the downshift valve 306 to move from the second axial position back to the first axial position thereof and provides communication between the modulated throttle pressure ports 314 and 316 of the valve 306 through the groove between the first and second circumferential lands 324 and 326 of the valve spool 322. The modulated throttle pressure circuit 332 is now permitted to communicate with the control port 272 of the second-third gear shift valve 178 through the ports 314 and 316 of the third-second downshift valve 306 and further through the shuttle valve 304 and acts on the respective inner axial end faces of the first and second valve spools 282 and 284 of the second-third gear shift valve 178. The modulated throttle pressure thus acting on the valve spools 282 and 284 urges the second valve spool 284 is urged to stay in the second axial position thereof and the first valve spool 282 is urged to move back from the second axial position toward the first axial position thereof. The modulated throttle pressure developed under these conditions being higher than a certain level which is determined in relation to the governor pressure Pg also acting on the first valve spool 282 of the second-third gear shift valve 178, the sum of the force of the spring 298 and the force produced by the modulated throttle pressure acting on the first valve spool 282 of the second-third gear shift valve 178 overcomes the force being exerted on the valve spool 282 by the governor pressure and causes the first valve spool 282 of the gear shift valve 178 to move back into the first axial position thereof. The communication which has been established between the line pressure inlet and outlet ports 268 and 270 of the second-third gear shift valve 178 is now blocked by the second circumferential land 288 of the first valve spool 282 of the gear shift valve 178 and, at the same time, communication is provided between the line pressure outlet port 270 and the first drain port 278 of the valve 178. When this occurs, the respective line pressure inlet ports 586 and 642 of the second-third gearshift timing valve 576 and the high-and-reverse clutch actuating pressure reducing valve 632 are drained off through the fluid circuit 448 and the first drain port 278 of the second-third gear shift valve 178. The line pressure which has been developed in the line pressure inlet port 586 being thus discharged, the force which has been urging the valve spool 600 of the second-third gearshift timing valve 576 to stay in the second axial position thereof against the opposing force of the spring 606 is eliminated and allows the valve spool 600 to move back into the first axial position by the force of the spring 606, providing communication between the line pressure outlet port 588 and the first drain port 590 through the groove between the lands 602 and 604 of the valve spool 600 as indicated by the right half of the valve spool. If, under these conditions, the vehicle speed is higher than a predetermined value, the governor pressure Pg acting on the valve spool 624 of the third-second gearshift timing valve 610 overcomes the opposing force of the associated spring 630 and holds the valve spool 624 in the second axial position thereof against the force of the spring 630 as indicated by the left half of the valve spool, thereby closing the second fluid discharge port 620 of the valve 610 by the first circumferential land 626 of the valve spool 624. The communication between the first and second fluid discharge ports 618 and 620 being thus blocked, the line pressure which has been established in the brake-release fluid chamber 76' of the band servo unit 74 is discharged through the orifice 596 and the line pressure outlet port 588 and the first drain port 590 of the second-third gearshift timing valve 576 initially at a limited, relatively low rate and thereafter at a steeply increasing rate due to the restriction imparted to the fluid flowing through the orifice 596. If, however, the vehicle speed is lower than the above mentioned predetermined value and as a consequence the governor pressure Pg is lower than a predetermined value, the force resulting from the governor pressure acting on the valve spool 624 of the third-second gearshift timing valve 610 is overcome by the opposing force of the spring 630 so that the valve spool 624 of the timing valve 610 is held in the first axial position thereof as indicated by the right half of the valve spool 624, providing communication between the first and second fluid discharge ports 618 and 620 of the valve 610. The line pressure which has been developed in the brake-release fluid chamber 76' of the band servo unit 74 bypasses the orifice 596 and is discharged through the first and second fluid discharge ports 618 and 620 of the third-second gearshift timing valve 610 and the line pressure outlet and first drain ports 588 and 590 of the second-third gearshift timing valve 576 without being subjected to any extra restriction except for the flow restriction provided by the orifice 608. The line pressure in the brake-release fluid chamber 76' of the band servo unit 74 is in these manners discharged through the first drain port 590 of the second-third gearshift timing valve 576 at a relatively low rate if the vehicle speed is higher than a predetermined value and at a relatively high rate if the vehicle speed is lower than the predetermined value when the second-third gearshift timing valve 576 is in the condition providing communication between the ports 588 and 590 thereof. The above mentioned predetermined value of the governor pressure Pg providing communication between the first and second fluid discharge ports 618 and 620 of the third-second gearshift valve 610 is dictated by the force of the spring 630 of the valve. The brake-release fluid chamber 76' of the band servo unit 74 being thus drained off, the piston 80 of the band servo unit 74 is moved to apply the band 72 in the presence of the line pressure in the brake-apply fluid chamber 76 of the servo unit 74.

On the other hand, the draining of the pressure inlet port 642 of the high-and-reverse clutch actuating pressure reducing valve 632 results in elimination of the fluid pressure which has been developed in the pressure feedback port 646 of the pressure reducing valve 632 and allows the valve spool 660 of the valve 632 to move back into the first axial position thereof by the force of the spring 668 and the throttle pressure Pt developed in the throttle pressure port 652 of the valve 632. Communication being thus provided between the pressure inlet and outlet ports 642 and 644 of the pressure reducing valve 632, the fluid pressure which has been developed in the fluid chamber for the high-and-reverse clutch 40 is discharged through the shuttle valve 658, the pressure outlet and inlet ports 644 and 642 of the pressure reducing valve 632, the fluid circuit 448 and the line pressure outlet port 270 and first drain port 278 of the second-third gear shift valve 178. With the high-and-reverse clutch 40 uncoupled and the band 72 applied in these manners, shift is now made from the third gear ratio ($D_3$) to the second gear ratio ($D_2$) in the transmission mechanism. During the downshift between these gear ratios, the valves 576, 610 and 632 above described operate in such a manner that the high-and-reverse clutch 40 is caused to uncouple at a relatively high rate without respect to the vehicle speed being produced, while the band servo unit 74 is operated to apply the band 72 at a relatively low rate if the vehicle speed is higher than the above mentioned predetermined value and at a relatively high rate if the vehicle speed is lower than the predetermined rate. When downshift is to be made from the third gear ratio to the second gear ratio in the automatic forward drive range at a vehicle speed which is higher than the predetermined value dictated by the spring 630 of the third-second gearshift timing valve 610, there is created a certain time interval (neutral interval) for which both of the high-and-reverse clutch 40 and the brake band 72 are held inoperative. During this neutral interval, the sun gear 52*a* of the first planetary gear assembly 52 (as well as the sun gear 54*a* of the second planetary gear assembly 54) in the transmission mechanism shown in FIG. 1 is left free to rotate about the center axis of the transmission output shaft 64 and is unable to impart reaction to the planet pinions 52*c* of the planetary gear assembly 52 so that the planet pinions 52*c* in mesh with the ring gear 52*b* being driven by the transmission input shaft 28 through the forward drive clutch 42 kept coupled merely idle on the sun gear 52*a* of the planetary gear assembly 52. Under these conditions, driving connection between the engine and the transmission output shaft 64 (FIG. 1) is interrupted and as a consequence the engine is enabled to increase the output speed thereof to such a value as to match the vehicle speed being produced. If, on the other hand, downshift is to be made from the third gear ratio to the second gear ratio in the automatic forward drive range at a vehicle speed which is lower than the previously mentioned predetermined level thereof, the fluid pressure in the fluid chamber for the high-and-reverse clutch 40 is discharged at a relatively high rate through the drain port 278 of the second-third gear shift valve 178 without being subjected to any extra flow restriction, while the fluid pressure in the brake-release fluid chamber 76' of the band servo unit 74 are discharged at a relatively low rate through the orifice 608 so that the brake band 72 is applied at a certain time interval after the high-and-reverse clutch 40 has been uncoupled. Such a time interval is dictated principally by the timing at which the fluid pressure in the band-release fluid chamber 76' of the band servo unit 74 is reduced to a level at which the sum of the force of the spring 82 in the band servo unit 74 and the force exerted on the servo piston 80 by the fluid pressure in the brake release fluid chamber 76' of the servo unit 74 is equally balanced with the force resulting from the line pressure acting on the piston 80 from the brake-apply fluid chamber 76 of the servo unit 74. During this delay involved when the brake band 72 is to be applied upon uncoupling of the high-and-reverse clutch 40, the engine is enabled to increase the output speed thereof to a value which will match with the vehicle speed being produced. Shocks which would otherwise be created when shift is to be made from the third gear ratio to the second gear ratio in the automatic forward drive range are in these manners eliminated at any vehicle speeds.

It has been assumed in the foregoing description that the downshift from the third gear ratio to the second gear ratio in the automatic forward drive range is effected when the accelerator pedal which has been depressed beyond the previously mentioned predetermined value thereof is further depressed under conditions in which the third gear ratio (D$_3$) in the automatic forward drive range is established in the transmission mechanism. Such shifting is, however, effected also when the vehicle speed and accordingly the governor pressure Pg acting on the valve spool 322 of the third-second downshift valve 306 are reduced to certain values in the presence of a modulated throttle pressure Pdt or in the absence of a modulated throttle pressure with the carburetor throttle valve held in an angular position providing an opening degree smaller than the above mentioned predetermined value thereof.

Thus, the shift points between the second and third gear ratios to be achieved in the automatic forward drive range by means of the second-third gear shift valve 178 and the third-second downshift valve 306 are as follows:

1. When the throttle valve of the carburetor of the engine is in a position providing an opening degree smaller than a predetermined value (which is assumed to be one half of the full opening degree of the carburetor throttle valve in the graph of FIG. 3), the upshift and downshift between the second and third gear ratios in the automatic forward drive range are effected when the vehicle speed is increased and reduced, respectively, beyond a predetermined value which is dictated by the first spring 296 of the second-third gear shift valve 178.

2. When the carburetor throttle valve is in a position providing an opening degree larger than the predetermined value of, for example, one half of the full opening degree thereof, an upshift from the second gear ratio to the third gear ratio is effected when the vehicle speed is increased and/or the carburetor throttle valve opening degree is reduced with respect to a first predetermined relationship between the vehicle speed and the throttle valve opening degree, while a downshift from the third gear ratio to the second gear ratio is effected when the vehicle speed is reduced and/or the carburetor throttle valve opening degree is increased with respect to a second predetermined relationship therebetween. The first predetermined relationship is dictated by the characteristics of the second-third gear shift valve 178, particularly the force of the first spring 296, the cross sectional area of the first circumferential land 286 (to be acted upon by the governor pressure) of the first valve spool 282, and the differential pressure acting area between the first and second circumferential lands 290 and 292 of the second valve spool 284 (to be acted upon by the modulated throttle pressure) of the second-third gear shift valve 178. On the other hand, the above mentioned second relationship between the vehicle speed and the carburetor throttle valve opening degree is dictated substantially by the characteristics of the third-second downshift valve 306, particularly, the force of the spring 330, the cross sectional area of the first circumferential land 324 (to be acted upon by the governor pressure) of the valve spool 322, and the differential pressure acting area between the lands 324 and 326 of the valve spool 322 of the third-second downshift valve 306.

When the second-third gear shift valve 178 is in the establishing the second gear ratio (D$_2$) in the automatic forward drive range, the first-second gear shift valve 176 is held in the respective second axial positions thereof as indicated by the left halves of the valve spools. The first valve spool 210 being held in the second axial position thereof, the modulated throttle pressure port 198 of the valve 176 is kept closed by the second circumferential land 216 of the valve spool 210 so that the first and second valve spools 210 and 212 of the first-second gear shift valve 176 are being subjected only to the force of the spring 228 and the governor pressure Pg acting on the first valve spool 210.

A decrease in the vehicle speed under these conditions gives rise to a drop in the governor pressure Pg to a certain value at which the force resulting from the governor pressure acting on the first valve spool 210 is no longer capable of overcoming the force of the spring 228. When this occurs, the first and second valve spools 210 and 212 of the first-second gear shift valve 176 are moved from their respective second axial positions to the respective first axial positions thereof as indicated by the right halves of the valve spools, closing the first line pressure inlet port 190 by the second circumferential land 216 and allowing the first line pressure outlet port 192 to be open to the first drain port 202. The line pressure which has been developed in the brake-apply fluid chamber 76 of the band servo unit 74 is now discharged through the band actuating fluid circuit 230, across the one-way check valve 246 and through the above mentioned ports 192 and 202 of the first second gear shift valve 176 without being subjected to the flow restriction by the orifice 244 which is bypassed by the check valve 246. The brake band 72 being thus released, the first gear ratio ($D_1$) is now produced in the transmission mechanism in which only the forward drive clutch 42 is maintained operative.

Once the valve spools 210 and 212 of the first-second gear shift valve 176 are returned from the second axial positions to the first axial positions to effect a downshift from the second gear ratio ($D_2$) to the first gear ratio ($D_1$) in the automatic forward drive range, the valve spools 210 and 212 are maintained in the respective first axial positions thereof not only by the force of the spring 228 but by the force which is exerted on the differential pressure acting area between the second and third circumferential lands 216 and 218 of the first valve spool 210 by the modulated throttle pressure Pdt which is developed in the modulated throttle pressure port 198 of the gear shift valve 176, provided the carburetor throttle valve is in an angular position providing an opening degree larger than the previously mentioned predetermied degree of, for example, one half of the full opening degree of the valve. The shift points between the first and second gear ratios ($D_1$) and ($D_2$) in the automatic forward drive range as caused by the first-second gear shift valve 176 are, for this reason, determined as follows:

1. When the carburetor throttle valve is in a position providing an opening degree smaller than the predetermined value, the upshift and downshift between the first and second gear ratios in the automatic forward drive range are effected when the vehicle speed is increased and decreased, respectively, beyond a predetermined value which is dictated by the spring 228 of the first-second gear shift valve 176.

2. If the carburetor throttle valve is in a position providing an opening degree larger than the predetermined value so that there is a modulated throttle pressure Pdt obtaining in the modulated throttle pressure port 198 of the first-second gear shift valve 176, an upshift from the first gear ratio to the second gear ratio in the automatic forward drive range takes place when the vehicle speed is increased and/or the opening degree of the carburetor throttle valve is reduced with respect to a first predetermined relationship between the vehicle speed and the carburetor throttle valve opening degree. The first predetermined relationship is dictated specifically by the force of the spring 228, the cross sectional area of the first circumferential land 214 (to be acted upon by the governor pressure) of the first valve spool 210 of the first-second gear shift valve 176, and the differential pressure acting area formed between the second and third circumferential lands 216 and 218 of the first valve spool 210 of the first-second gear shift valve 176. On the other hand, a downshift from the second gear ratio to the first gear ratio in the automatic forward drive range is effected when the vehicle speed is reduced and/or the carburetor throttle valve opening degree larger than the above mentioned predetermined value is increased with respect to a second predetermined relationship between the vehicle speed and the throttle valve opening degree. The second predetermined relationship therebetween is dictated by the force of the spring 228 and the cross sectional area of the first circumferential land 216 of the first valve spool 210.

It may be further noted that, when a downshift is made by the first-second gear shift valve 176, the brake actuating fluid circuit 230 is open to the first drain port 202 of the gear shift valve 176 so that there is no fluid pressure occurring in the holding port 426 of the line pressure booster valve 406.

When the transmission gear shift lever is thereafter moved form the automatic forward drive range position "D" back to the neutral gear position "N", the valve spool 164 of the manually operated gear position selector valve 148 in the hydraulic control system is moved to the axial position allowing all the fluid outlet ports 156, 158, 160 and 162 open to the drain ports and isolating the fluid inlet port 154 from the fluid outlet ports 156, 158, 160 and 162. The second fluid outlet port 158 being open to one of the drain ports of the gear position selector valve 148, the line pressure which has been developed in the forward drive clutch actuating fluid circuit 172 is discharged through the drain port of the valve 148 so that the forward drive clutch 42 which has been kept coupled throughout the automatic forward drive range condition is allowed to uncouple. None of the clutches 40 and 42, the brake 68 and the band 72 being now operative, there is produced a neutral gear condition in the transmission mechanism.

Kickdown in Automatic Forward Drive Range Position "D"

When the accelerator pedal is depressed a distance than a predetermined value from the fully released position thereof so as to produce a kickdown condition, the valve plunger 364 of the transmission throttle valve 332 is moved through the second and thereafter first axial portions 336b and 336a of the valve chamber 336 of the throttle valve 332 into an innermost axial limit position abutting at the leading end of its axial extension 376 against the end face of the axial extension 372 of the valve spool 362 of the throttle valve 332. The valve spool 362 is, therefore, held in the first axial position thereof completely isolating the second throttle pressure port 344 from the first drain port 358 by the second circumferential land 370 of the valve spool 362 and providing full communication between this throttle pressure port 344 and the first line pressure port 352 of the throttle valve 332. The throttle pressure circuit 382 leading from the second throttle pressure port 344 of the transmission throttle valve 332 is now permitted to fully communicate with the main line pressure circuit 138 through the ports 344 and 352 of the throttle valve 332 and has developed therein the line pressure Pl directed from the main line pressure circuit 138. The line pressure in the throttle pressure circuit 382 is directed to the pressure modifier valve 450 through the shuttle valve 446 and acts on the valve spool 470 of the pressure modifier valve 450. The throttle pressure modifier valve 450 having already been conditioned to produce a constant output fluid pressure without respect to an input fluid pressure higher than the constant output fluid pressure, the fluid pressure delivered from the pressure modifier valve 450 is kept unchanged throughout kickdown condition as indicated by the plot e-f in the graph of FIG. 3.

The line pressure Pl developed in the throttle pressure circuit 382 is also directed to the second and third throttle pressure ports 346 and 348 of the throttle valve 322. The line pressure entering the third throttle pressure port 348 acts on the throttle failsafe valve sleeve 386 and reinforces the force of the spring 378 urging the failsafe valve sleeve 386 to stay in the first axial position thereof as indicated by the upper half of the sleeve 386. On the other hand, the line pressure directed to the third throttle pressure port 346 of the throttle valve 332 is passed through the first radial port 400 in the failsafe valve sleeve 386 into the internal circumferential groove 396 formed in the valve sleeve 386 as previously described. With the valve plunger 364 of the throttle valve 332 moved into the innermost limit axial position thereof, the annular projection 374 of the valve plunger 364 is axially displaced past the second radial port 402 in the failsafe valve sleeve 386 toward the first axial portion 336a of the valve chamber 336 so that communication is provided between the first and second radial ports 400 and 402 through the internal circumferential groove 396 and a circumferential groove formed axially between one end face of the annular projection 374 of the valve plunger 364 and one end face of the internal annular projection 394 of the failsafe valve sleeve 386 and radially between the outer peripheral surface of the valve plunger 364 and the inner peripheral surface of the previously mentioned circumferential wall portion 398 of the failsafe valve sleeve 386. The line pressure developed in the third throttle pressure port 346 of the transmission throttle valve 332 is passed to the kickdown port 350 of the valve 332 through this communication provided between the first and second radial ports 400 and 402 in the failsafe valve sleeve 386 so that the line pressure Pl is developed also in the kickdown circuit 256 leading from the kickdown port 350 of the throttle valve 332. The line pressure thus developed in the kickdown circuit 256 reaches the respective kickdown pressure ports 200 and 276 of the first-second and second-third gear shift valves 176 and 178. The kickdown port 350 of the transmission throttle valve 332 being further open to the kickdown passageway 498 through the second radial port 402 in the failsafe valve sleeve 386, the line pressure developed in the kickdown pressure circuit 256 is further directed through the passageway 498 to the kickdown port 490 of the throttle pressure modulator valve 478. In the presence of the line pressure in the kickdown port 490 which has been drained off until the kickdown condition is brought about, the valve spool 502 is urged to move toward the previously mentioned axial limit position thereof by the line pressure acting on the differential pressure acting area between the first and second circumferential lands 504 and 506 of the valve spool 502. The valve spool 502 is therefore caused to move into the limit axial position thereof as indicated by the lower half of the valve spool 502. Communication is now provided between the kickdown port 490 and the modulated throttle pressure outlet port 492 and accordingly through the passageway 500 with the feedback port 496 so that the line pressure directed to the kickdown port 490 of the throttle pressure modulator valve 478 is passed through the port 490 and the passageway 500 into the feedback port 496 and acts on the valve spool 502 in such a manner as to be locked in the limit axial position thereof in cooperation with the force of the spring 510 and the force resulting from the line pressure acting on the differential pressure acting area between the lands 504 and 506. Furthermore, the kickdown port 490 is permitted to communicate through the modulated throttle pressure outlet port 492 with the modulated throttle pressure port 492 of the pressure modulator valve 478 with the result that the line pressure Pl is also developed in the modulated throttle pressure circuit 254 leading to the modulated throttle pressure port 198 of the first-second gear shift valve 176, and the modulated throttle pressure inlet port 314 of the third-second downshift valve 306. The line pressure introduced into the modulated throttle pressure inlet port 314 of the third-second downshift valve 306 acts on the differential pressure acting area between the first and second circumferential lands 324 and 326 of the valve spool 322. If, therefore, the governor pressure in the governor pressure port 312 of the downshift valve 306 is lower than a certain value, the line pressure acting on the above mentioned differential pressure acting area causes the valve spool 322 to remain in the first axial position thereof and allows the line pressure to pass through the ports 314 and 316 of the downshift valve 306 to the control port 272 of the second-third gear shift valve 178 past the shuttle valve 304. The line pressure thus developed in the control port 272 of the second-third gear shift valve 178 acts on the end faces of the second and first circumferential lands 288 and 290 of the first and second valve spools 282 and 284, respectively, of the gear shift valve 178 and causes only the first valve spool 282 to move away from the first axial position thereof with the second valve spool 284 held in the second axial position thereof. If, on the other hand, the governor pressure in the governor pressure port 312 of the third-second downshift valve 306 is higher than the above mentioned certain value, the valve spool 322 is moved from the first axial position to the second axial position thereof against the force of the spring 330 and the force resulting from the line pressure acting on the differential pressure acting area between the first and second circumferential lands 324 and 326 of the valve spool 322 with the result that the throttle pressure outlet port 316 of the downshift valve 306 is isolated from the throttle pressure inlet port 314 and is permitted to be open to the first drain port 318 of the valve 306. There thus being no fluid pressure in the control port 272 of the second-third gear shift valve 178, the first and second valve spools 282 and 284 are moved to the respective first axial positions thereof by the force resulting from the line pressure developed in the kickdown port 276 as well as the force of the spring 296 of the second-third gear shift valve 178.

During the kickdown condition produced while the vehicle is cruising at a relatively high speed with the third forward drive gear ratio established in the transmission system, only the line pressure developed in the kickdown port 276 of the gear shift valve 178 acts on the second valve spool 284 of the valve 178 and causes, in cooperation with the first spring 296, the first and second valve spools 282 and 284 to move from their respective second axial positions back into the respective first axial positions thereof against the force exerted on the first valve spool 282 by the governor pressure Pg developed in the governor pressure port 266 of the shift valve 178. Under the kickdown condition produced while the vehicle is cruising at a relatively low speed with the forward drive gear ratio established in the transmission system, the line pressure is developed not only in the kickdown port 276 but in the control port 272 of the second-third gear shift valve and moves only the first valve spool 282 to move into the first axial position thereof while holding the second valve spool 284 in the second axial position thereof. The first valve spool 282 being thus moved to the first axial position thereof either independently of or together with the second valve spool 284, the line pressure outlet port 270 of the second-third gear shift valve 178 is isolated from the line pressure inlet port 268 by the second circumferential land 288 of the valve spool 282 and is allowed to be open to the first drain port 278 of the gear shift valve 178. The fluid circuit 448 leading to the line pressure inlet port 586 of the second-third gearshift timing valve 576 being thus drained off through the first drain port 278 of the second-third gear shift valve 178, the line pressure which has been developed in the brake-release fluid chamber 76' of the band servo unit 74 is discharged through the first drain port 590 of the second-third gearshift timing valve 576 either through the orifice 596 or by way of the third-second gearshift timing valve 610 depending upon the level of the vehicle speed being produced and accordingly upon the level of the governor pressure developed in the governor pressure port 616 of the third-second gearshift timing valve 610 as previously described in detail in connection with the downshift from the third gear ratio ($D_3$) to the second gear ratio ($D_2$) in the automatic forward drive range. In the high-and-reverse clutch actuating pressure reducing valve 632, furthermore, the valve spool 660 is held in the first axial position thereof not only by the force of the spring 668 but by the force resulting from the line pressure which is developed in the throttle pressure port 652 of the pressure reducing valve 632 during kickdown condition as previously described. When the fluid circuit 448 leading from the line pressure outlet port 270 of the second-third gear shift valve 178 is made open to the drain port 278 of the gear shift valve 178, therefore, the fluid pressure which has been established in the fluid chamber for the high-and-reverse clutch 40 is discharged through the pressure inlet and outlet ports 642 and 644 of the high-and-reverse clutch actuating pressure reducing valve 632 and the drain port 278 of the second-third gear shift valve 178 as also described in detail previously. The high-and-reverse clutch 40 is uncoupled and the brake band 72 is applied in these manners so that a downshift is made from the third gear ratio ($D_2$) to the second gear ratio ($D_2$) in the automatic forward drive range in the transmission mechanism.

When the second gear ratio ($D_2$) is in play in the transmission system, the first-second gear shift valve 176 is maintained in the condition having its first and second valve spools 210 and 212 held in the respective second axial positions thereof providing communication between the first line pressure inlet and outlet ports 190 and 192 and communicate between the kickdown port 200 and the internal annular groove 208 and closing the modulated throttle pressure port 198 by the second circumferential land 216 of the first valve spool 210, as indicated by the left halves of the valve spools 210 and 212. If kickdown takes place under these conditions, the line pressure developed in the modulated throttle pressure port 198 of the first-second gear shift valve 176 is not permitted to act on the gear shift valve 176 so that the first and second valve spools 210 and 212 in the respective second axial positions thereof are urged to move toward their respective first axial positions by the force of the spring 228 and the force exerted on the differential pressure acting area between the first and second circumferential lands 222 and 224 of the second valve spool 212 by the line pressure developed in the kickdown port 200 against the governor pressure Pg acting on the first valve spool 210 from the governor pressure port 188 of the gear shift valve 176.

As the vehicle speed decreases after a shift has been made from the third gear ratio ($D_3$) to the second gear ratio ($D_2$) in the automatic forward drive range and as a result the governor pressure Pg acting on the first valve spool 210 of the first-second gear shift valve 176 is reduced below a certain value, the force resulting from the governor pressure acting on the valve spool 210 is overcome by the sum of the force of the spring 228 and the force produced by the line pressure acting on the differential pressure acting area between the second and third circumferential lands 224 and 226 of the second valve spool 212 in the second axial position thereof with the result that the first and second valve spools 210 and 212 of the first-second gear shift valve 176 are moved from their respective second axial positions to their respective first axial positions thereof as indicated by the right halves of the valve spools 210 and 212. The first pressure outlet port 192 which has been in communication with the first pressure inlet port 190 of the first-second shift valve 176 is now isolated from the port 190 by the second circumferential land 216 of the first valve spool 210 and is made open to the first drain port 202 of the gear shift valve 176. As a consequence, the line pressure which has been established in the brake-apply fluid chamber 76 of the band servo unit 74 is discharged through the one-way check valve 246 in the band actuating fluid circuit 230 and the first drain port 202 of the first-second gear shift valve 176, thereby allowing the brake band 72 to be released. Only the forward drive clutch 42 being left operative in the transmission mechanism, the first gear ratio condition in the automatic forward drive range is produced in the transmission system. Throughout the kickdown condition with the first gear ratio ($D_1$) thus established in the transmission system, the first and second valve spools 210 and 212 of the first-second gear shift valve 176 are forced to stay in their respective first axial positions not only by the force of the spring 228 and the line pressure acting on the differential pressure acting area between the first and second circumferential lands 222 and 224 of the second valve spool 212 but by the force which is exerted on the differential pressure acting area between the second and third circumferential lands 216 and 218 of the first valve spool 210 by the line pressure developed in the modulated throttle pressure port 198 of the gear shift valve 176. For this reason, the first and second valve spools 210 and 212 of the first-second gear shift valve 176 in the first gear ratio condition can not be returned to their respective second axial positions or, in other words, the first gear ratio ($D_1$) in the automatic forward drive range can not be switched over to the second gear ratio ($D_2$) under kickdown condition unless the vehicle speed and accordingly the governor pressure Pg urging the valve spools 210 and 212 to move toward the respective second axial positions thereof are increased to values which are far higher than those at which such an upshift is to be made when the carburetor throttle valve is in a part throttle position.

Manual Second Forward Drive Range "2"

Under the condition in which the third gear ratio ($D_3$) in the automatic forward drive range is established in the transmission system, communication is maintained between the first line pressure inlet and outlet ports 190 and 192 in the first-second gear shift valve 176 and further between the line pressure inlet and outlet ports 268 and 270 in the second-third gear shift valve 178 so that the high-and-reverse clutch 40 as well as the forward drive clutch 42 is kept coupled as previously described.

If the transmission gear shift lever is moved from the automatic forward drive range position "D" to the manual second forward drive range position "2" under these conditions, the manually operated gear position selector valve 148 of the hydraulic control system is moved into the axial position permitting not only the second fluid outlet port 158 but the third fluid outlet port 160 to be isolated from the drain ports of the selector valve 148 and to communicate with the fluid inlet port 154 of the valve 148. The line pressure which has been passed from the main line pressure circuit 138 to the fluid inlet port 154 of the gear position selector valve 148 is distributed not only through the second fluid outlet port 158 of the selector valve 148 to the forward drive clutch actuating fluid circuit 172 as in the automatic forward drive range but also through the third fluid outlet port 160 of the selector valve 148 to the fluid passageways 302 and 302' leading respectively to the control port 272 of the second-third gear shift valve 178 across the shuttle valve 304 and to the first line pressure inlet port 418 of the line pressure booster valve 406. When the line pressure is developed in the third fluid outlet port 160 of the gear position selector valve 148 as above described, the line pressure is directed on the one hand to the control port 272 of the second-third gear shift valve 178 through the fluid passageway 302 and past the shuttle valve 304 and on the other hand to the first line pressure inlet port 418 of the line pressure booster valve 406. In this instance, it is noted that the line pressure developed in the fluid passageway 302 terminating in one inlet port of the shuttle valve 304 is allowed to pass through the shuttle valve 304 to the control port 272 of the second-third gear shift valve 178 without respect to the presence or absence of a modulated throttle pressure Pdt at the other inlet port of the shuttle valve 304 because the line pressure Pl is higher than or equal to the modulated throttle pressure Pdt. The line pressure thus developed in the control port 272 of the second-third gear shift valve 178 acts on the annular outer marginal portion of the end face of the second circumferential land 288 of the first valve spool 282 and the annular end face of the first circumferential land 290 of the second valve spool 284 of the gear shift valve 178 and urges the first and second valve spools 282 and 284 axially away from each other in cooperation with the second spring 298 of the valve 178. Once the first valve spool 282 which has been held in its second axial position is slightly moved from the second axial position toward the first axial position against the force of the governor pressure acting on the first valve spool 282 from the governor pressure port 266 of the valve 178, the line pressure in the control port 272 of the valve 178 acts on the entire area of the end face of the second circumferential land 288 of the valve spool 282, which is therefore moved quickly into the first axial position thereof away from the second valve spool 284 which is forced to stay in the second axial position thereof by the line pressure urging the valve spool 284 to maintain the second axial position thereof in cooperation with the second spring 298 against the force of the first opening 296 or, in the presence of a modulated throttle pressure Pdt in the modulated throttle pressure port 274, the sum of the force of the first spring 296 and the force resulting from the modulated throttle pressure acting on the differential pressure acting area between the lands 290 and 292 of the valve spool 284. The first valve spool 282 of the second-third gear shift valve 178 being thus moved into the first axial position thereof, the line pressure outlet port 270 of the gear shift valve 178 is isolated from the line pressure inlet port 268 and is made open to the first drain port 278 of the valve 178. The fluid pressure which has been established in the fluid chamber for the high-and-reverse clutch 40 is therefore discharged through this drain port 278 of the second-third gear shift valve 178 and the line pressure which has been established in the brake-release fluid chamber 76' of the band servo unit 74 is discharged through the first drain port 590 of the second-third gearshift timing valve 576 as in the case of the downshift from the third gear ratio to the second gear ratio in the automatic forward drive range previously described in detail. The line pressure at the line pressure outlet port 270 of the second-third gear shift valve 178 being thus eliminated, there is no fluid pressure developed in the trigger port 428 of the line pressure booster valve 406, which is however enabled to have its valve spool 430 maintained in the second axial position thereof against the opposing force of the associated spring 442 by the line pressure developed in a portion of the valve chamber 412 by the line pressure developed in a portion of the valve chamber 412 and the axial blind bore 438 through the radial port 440 in the valve spool 430 and the band actuating fluid circuit 230 providing communication between the first pressure outlet port 192 of the first-second gear shift valve 176 and the holding port 426 of the line pressure booster valve 406. The line pressure developed in the fluid passageway 302 leading from the third fluid outlet port 160 of the gear position selector valve 148 is directed into the first line pressure inlet port 418 of the line pressure booster valve 406. When the valve spool 430 of the line pressure booster valve 406 is held in the second axial position thereof as indicated by the lower half of the valve spool, there is provided communication between the first line pressure inlet port 418 and the line pressure outlet port 424 through the groove between the first and second circumferential lands 432 and 434 of the valve spool 430, the second and third line pressure inlet ports 420 and 422 of the booster valve 406 being kept drained off through the passageway 408 and the ports 354 and 361 of the transmission throttle valve 332. The line pressure directed through the passageway 302 to the first line pressure inlet port 418 of the line pressure booster valve 406 is therefore passed through the line pressure outlet port 424 of the booster valve 406 to the pressure inlet port 456 of the pressure modifier valve 450 past the shuttle valve 446 which is adapted to pass the line pressure therethrough when both the line pressure and the throttle pressure are concurrently developed at its inlet ports. Being supplied with the line pressure at its pressure inlet port 456, the pressure modifier valve 450 delivers at the pressure outlet and feedback ports 458 and 460 a fluid pressure which is equal to the previously mentioned limit value dictated by the spring 476. The fluid pressure to appear at the pressure outlet and feedback ports 458 and 460 in the presence of the line pressure Pl at the pressure inlet port 456 of the modifier valve 450 is therefore maintained at the above mentioned limit value without respect to the opening degree of the carburetor throttle valve. The line pressure Pl developed by the pressure regulator valve 94 in response to such a constant fluid pressure appearing in the first and second modified pressure ports 108 and 110 is maintained at a value which is equal to the peak value of the line pressure indicated by the plot n-d in the graph of FIG. 3. The line pressure booster valve 406 is, thus, adapted to maintain the line pressure Pl at the constant, maximum value thereof throughout the condition in which the second gear ratio "2" in the manual second forward drive range is in play in the transmission mechanism. Due to the line pressure thus "boosted" upon shifting from the third gear ratio in the automatic forward drive range to the second gear ratio in the manual second forward drive range, the band servo unit 74 is enabled to apply the brake band 72 onto the connecting shell 58 reliably and with a surficient force against the sliding friction created between the band 72 and the connecting shell 58 which has been driven to rotate with the high-and-reverse clutch 40 by the end of the condition in which the third gear ratio in the automatic forward drive range was set up in the transmission mechanism. During engine braking when the engine acts to brake the vehicle, the forward drive clutch 42 and the brake band 72 operative with the second gear ratio "2" in the manual forward drive range in play are enabled by the boosted line pressure to transmit and bear the driving torque to be passed backwardly from the transmission output shaft to the transmission input shaft.

If, on the other hand, the road speed of the vehicle operating with the second gear ratio in the manual second forward drive range selected in the transmission system is rescued below a certain value, the governor pressure Pg which has been effective to hold the first and second valve spools 210 and 212 of the first-second gear shift valve 176 is reduced to a level which can not compete with the opposing force of the spring 228 and allows the valve spools 210 and 212 to move from their respective second axial positions to the respective first axial positions thereof. The communication between the first pressure inlet and outlet ports 190 and 192 of the first-second gear shift valve 176 is now blocked by the second circumferential land 216 of the first valve spool 210 and the first pressure outlet port 192 is made open to the first drain port 202 of the gear shift valve 176 as indicated by the right half of the valve spool 210. The line pressure which has been established in the brake-apply fluid chamber 76' is discharged through band actuating fluid circuit 238 and the drain port 202 of the first-second gear shift valve 176 and as a consequence the brake band 72 is released from the connecting shell 58 as in the case of the downshift from the second gear ratio to the first gear ratio in the automatic forward drive range. Only the forward drive clutch 42 maintained operative in the transmission mechanism, shifting is now made from the second gear ratio to the first gear ratio in the manual second forward drive range. The band actuating fluid circuit 238 being drained off, the line pressure which has been developed in the axial blind bore 438 in the valve spool 430 of the line pressure booster valve 406 is also discharged through the radial port 440 and in the valve spool 430, the holding port 426 of the booster valve 406 and the first drain port 202 of the first-second gear shift valve 176. In the absence of a fluid pressure in the axial blind bore 438, the valve spool 430 of the line pressure booster valve 406 is moved from the second axial position back to the first axial position thereof by the force of the associated spring 442. The radial port 440 in the valve spool 430 is now aligned with the trigger port 428 of the booster valve 406 but, in the absence of a fluid pressure in the fluid circuit 448 leading from the pressure outlet port 270 of the second-third gear shift valve 178, the valve spool 430 of the line pressure booster valve 406 is maintained in the first axial position thereof until a fluid pressure is for a second time developed in the trigger port 428 of the booster valve 406. The valve spool 430 of the booster valve 406 being thus moved into the first axial position thereof, the first line pressure inlet port 418 is closed by the first circumferential land 432 of the valve spool 430 and at the same time the line pressure outlet port 424 is brought into communication with the third line pressure port 422 through the groove between the first and second circumferential lands 432 and 434 as indicated by the upper half of the valve spool 430. The third and accordingly second line pressure ports 422 and 420 are in communication with the third drain port 361 of the transmission throttle valve 332 through the passageway 408 so that the line pressure remaining in the line pressure outlet port 424 of the booster valve 406 is discharged through the third drain port 361 of the transmission throttle valve 332. If the vehicle speed is thereafter increased and as a consequence the first-second gear shift valve 176 is rendered into the condition to produce the second gear ratio in the transmission system with the gear shift lever maintained in the manual second drive range position "2", communication is provided between the first pressure inlet and outlet ports 190 and 192 of the shift lever so that the line pressure is directed through these ports of the valve 176 to the holding port 426 of the line pressure booster valve 406. Since, however, the valve spool 430 of the booster valve 406 is maintained in the first axial position thereof as above described, the holding port 426 of the booster valve 406 is kept closed by the second circumferential land 434 of the valve spool 430 so that the line pressure which has reached the holding port 426 of the booster valve 406 causes no effective action in the valve 406. The booster valve 406 being thus rendered inoperative, the throttle pressure Pt developed in the throttle pressure circuit 382 is for a second time permitted to pass through one inlet port of the shuttle valve 446 in the absence of a fluid pressure in the other inlet port thereof and to thereby reach the pressure inlet port 456 of the pressure modifier valve 450. The pressure modifier valve 450 is now conditioned to develop in the pressure outlet and feedback ports 458 and 460 thereof a modified throttle pressure Pmt which is continuously variable with the throttle pressure Pt if the throttle pressure is lower than the predetermined limit value and which is maintained at the limit valve if the throttle pressure occurring at the pressure inlet port 456 is higher than the valve. In this fashion, the pressure regulator valve 94 ceases to develop the boosted line pressure upon shifting from the second gear ratio to the first gear ratio in the manual second forward drive range and remains inoperable to develop the boosted line pressure even when an upshift may be thereafter made from the first gear ratio to the second gear ratio in the manual second forward drive range. Thus, the line pressure booster valve 406 provided in the hydraulic control system embodying the present invention is capable of enabling the pressure regulator valve 94 to develop the boosted line pressure when, and only when, a shift has been made from the third gear ratio "D$_3$" in the automatic forward drive range to the second gear ratio "2" in the manual second forward drive range. For this reason, not only the brake band 72 is enabled to seize the rotating connecting drum 58 with an adequate force when shift is being made as described above and, furthermore, the driving torque to be transmitted from the transmission output shaft to the input shaft under a condition in which the engine is to be driven by the vehicle inertia can be transmitted and borne with a sufficient efficiency by the forward drive clutch 40 and the brake band 72, but shocks which would otherwise be produced during an automatic upshift from the first gear ratio to the second gear ratio in the manual second forward drive range can be reduced to a minimum.

Manual First Forward Drive Range Position "1"

When the transmission gear shift lever which has been held in the position "2" is moved to the manual first forward drive position "1", the valve spool 164 of the manually operated gear position selector valve 148 of the hydraulic control system is moved to the corresponding position "1" so that the fluid inlet port 154 of the gear position selector valve 148 is permitted to communicate with the fourth fluid outlet port 162 in addition to the second and third fluid outlet ports 158 and 160. The line pressure which has been developed in the fluid inlet port 154 through the main line pressure circuit 138 is now directed not only to the fluid circuit 172 and 302 as has been the case but to the line pressure inlet port 522 of the low-and-reverse brake actuating pressure reducing valve 512. The line pressure in the fluid circuit 172 maintains the forward drive clutch 42 in the coupled condition thereof, while the line pressure in the fluid circuit 302 is directed past the shuttle valve 304 into the control port 272 of the second-third gear shift valve 178 and maintains the first valve spool 282 of the valve 178 in the first axial position thereof, thereby preventing the second-third gear shift valve 178 from being conditioned to be switched to the third gear ratio condition in response to a rise in the governor pressure Pg attempting to counteract the line pressure in the control port 272. On the other hand, the line pressure directed from the fourth fluid outlet port 162 of the gear position selector valve 148 to the pressure inlet port 522 of the low-and-reverse brake actuating pressure reducing valve 512 by way of the fluid passageway 532 causes the pressure reducing valve 512 to develop in the pressure outlet port 524 thereof a constant fluid pressure which is substantially equal to the particular level as previously described in detail. The fluid pressure thus developed at the pressure outlet port 524 of the reducing valve 512 is passed through one inlet port of the shuttle valve 237 in the absence of a fluid pressure in the other inlet port of the shuttle valve 237 and is extended to the second pressure inlet port 194 of the first-second gear shift valve 176. The fluid pressure admitted to the second pressure inlet port 194 of the first-second gear shift valve 176 acts on the axially outer end face of the fourth circumferential land 220 of the first valve spool 210 and on the axially outer, annular end face of the first circumferential land 222 of the second valve spool 212. The second valve spool 212 is, therefore, urged to stay in the second axial position thereof against the force of the spring 228 by the force produced by the fluid pressure thus acting on the first circumferential land 222 of the valve spool 212. If, on the other hand, the first valve spool 210 is held in the second axial position thereof, the valve spool 210 is urged to move from the second axial position toward the first axial position by the force produced by the fluid pressure acting on the end face of the fourth circumferential land 220 of the valve spool 210 but is either permitted to move toward the first axial position or forced to stay in the second axial position thereof depending upon the level of the governor pressure Pg acting on the axially outer end face of the first circumferential land 214 of the valve spool 210 from the governor pressure port 188 of the gear shift valve 176. If, in this instance, the vehicle speed being produced is relatively high and as a consequence the governor pressure Pg is higher than a predetermined value, the force exerted on the first valve spool 210 by the fluid pressure occurring in the second pressure inlet port 194 is overcome by the force exerted on the valve spool 210 by the governor pressure occurring in the governor pressure port 188 of the gear shift valve 176 with the result that the first valve spool 210 is maintained in the second axial position thereof together with the second valve spool 212. Under these conditions, shift is not effected in the transmission mechanism so that the second gear ratio condition which has been established in the transmission mechanism is maintained. If, however, the vehicle speed is relatively low and accordingly the governor pressure Pg is lower than the above mentioned predetermined value at the instant when the fluid pressure delivered from the pressure reducing valve 512 is developed in the second pressure inlet port 194 of the first-second gear shift valve 176, the force produced by the governor pressure acting on the first valve spool 210 of the gear shift valve 176 is overcome by the force resulting from the fluid pressure developed in the pressure inlet port 194 of the gear shift valve 176 and, as a consequence, the first valve spool 210 is moved from the second axial position to the first axial position thereof independently of the second valve spool 212. The first and second valve spools 210 and 212 being held in the first and second axial positions, respectively, thereof, the first pressure inlet port 190 of the gear shift valve 176 is closed by the second circumferential land 216 of the first valve spool 210 and communication is provided between the second pressure inlet and outlet ports 194 and 196 of the shift valve 176 through a space formed between the valve spools 210 and 212 which are axially spaced apart from each other within the valve chamber 182. The first pressure outlet port 192 of the first-second gear shift valve 176 is now open to the first drain port 202 of the valve 176 so that the line pressure which has been holding the band servo unit 74 operative to apply the brake band 72 is discharged in the manners previously described, thereby allowing the band 72 to release. On the other hand, the fluid pressure which has been developed in the second pressure inlet port 194 of the first-second gear shift valve 176 is passed through the second pressure outlet port 196 of the valve 176 to the fluid chamber for the low-and-reverse brake 68 by way of the fluid passageway 232. The low-and-reverse brake 68 is now caused to couple and produces the first gear ratio in the transmission mechanism in cooperation with the forward drive clutch 42 is maintained in the coupled condition.

During the condition in which the manual first forward drive position "2" is selected by the transmission gear shift lever, the line pressure developed by the pressure regulator valve 94 is normally higher than the predetermined limit value dictated by the spring 546 of the low-and-reverse brake actuating pressure reducing valve 512. The fluid pressure to be developed at the pressure outlet port 524 of the valve 512 is, for this reason, maintained at a substantially constant value equal to such a limit value and is lower by certain values than the line pressure appearing at the pressure inlet port 522 of the reducing valve 512. If the vehicle speed is lower than the above mentioned predetermined value thereof under the condition in which the manual first forward drive range position is selected, therefore, the first-second gear shift valve 176 is not permitted to switch over to the first gear ratio condition and is, in this fashion, capable of preventing the engine from overrunning. If the vehicle speed is thereafter reduced below the predetermined value thereof, the second gear ratio condition which has been estabished by the combination of the forward drive clutch 42 and the brake band 72 is changed by the first gear ratio condition brought about by the combination of the forward drive clutch 42 and the low-and-reverse brake 68 permitting the transmission mechanism to transmit therethrough a driving torque from the transmission output shaft backwardly to the input shaft during engine braking. Since, furthermore, the low-and-reverse brake 68 is actuated to apply by a fluid pressure which has been reduced by the pressure reducing valve 512, the shifting to the manual first forward drive range "1" can be effected smoothly without producing shocks in the transmission mechanism.

Reverse Drive Gear Position "R"

When the transmission gear shift lever is moved from the neutral gear position "N" to the reverse drive gear position "R" to drive the vehicle backwardly, the valve spool 164 of the manually operated gear position selector valve 148 in the hydraulic control system of the power transmission is moved to the corresponding position "R". The second, third and fourth fluid outlet ports 158, 160 and 162 of the gear position selector valve 148 are now all made open to one drain port of the valve selector 148 and the fluid inlet port 154 of the selector valve 148 is brought into communication with the first fluid outlet port 156 of the valve 148. The line pressure thus developed in the first fluid outlet port 156 of the gear position selector valve 148 is directed on the one hand through the shuttle valve 237 to the second pressure inlet port 194 of the first-second gear shift valve 176 and on the other hand through the orifice 240 in the high-and-reverse clutch actuating fluid circuit 238 and past the shuttle valve 658 to the fluid chamber for the high-and-reverse clutch 40. The line pressure thus developed in the high-and-reverse clutch actuating fluid circuit 238 is also admitted into the first variable-volume fluid chamber 568 of the pressure accumulator unit 548 and acts on the outer end face of the smaller flange portion 558 of the piston 556, which is accordingly moved in a direction to expand the fluid chamber 568 against the force of the spring 574 urging the piston to move in the opposite direction. Thus, not only the flow of the line pressure fluid to be passed to the fluid chamber of the high-and-reverse clutch 40 is restricted by the orifice 240 in the fluid circuit 238 but the fluid pressure to be developed in the fluid chamber of the clutch 40 is partially taken up by the compression of the spring 574 of the pressure accumulator unit 548 until the first variable-volume fluid chamber 568 of the unit 548 is expanded to a certain limit degree. The high-and-reverse clutch 40 is in these manners enabled to couple initially at a limited, relatively low rate and thereafter at an exponentially increasing rate until the clutch 40 is fully coupled. The shocks which would otherwise be created during shifting from the neutral gear position "N" to the reverse drive gear position "R" can thus be effectively precluded by the provision of the orifice 240 and the pressure accumulator unit 548.

With the gear position selector valve 148 moved to the reverse drive gear position "R", the second fluid outlet port 158 of the gear position selector valve 148 is drained off so that the governor valve assembly 84 is inoperable to deliver the governor pressure Pg in the absence of a fluid pressure at the fluid inlet port (not shown) of the secondary governor valve 86' (FIG. 1). There being no fluid pressure developed in the governor pressure port 188 of the first-second shift valve 176, the line pressure developed in the second pressure inlet port 194 forces the first valve spool 210 of the valve 176 to stay in the first axial position thereof in the absence of any opposing force encountered by the line pressure while forcing the second valve spool 212 of the valve 176 to stay in the second axial position thereof against the opposing force of the spring 228. Communication is therefore provided between the second pressure inlet and outlet ports 194 and 196 of the first-second gear shift valve 176 through a space formed between the first and second valve spools 210 and 212 which are axially spaced apart from each other within the valve chamber 182. The line pressure which has been developed in the second pressure inlet port 194 of the first-second gear shift valve 176 is passed through the second pressure outlet port 196 of the gear shift valve 176 to the fluid chamber for the low-and-reverse brake 68 by way of the fluid passageway 232. Since the low-and-reverse clutch 68 is thus actuated to apply by the line pressure which is not passed through the pressure reducing valve 512 which is put into operation during shifting to the manual first forward drive range "2", the shifting to the reverse drive gear condition can be effected reliably by the low-and-reverse brake 68.

With both of the high-and-reverse clutch 40 and the low-and-reverse brake 68 rendered operative in the transmission mechanism shown in FIG. 1, the respective sun gears 52a and 54a of the first and second planetary gear assemblies 52 and 54 are driven to rotate in the forward direction and the pinion carrier 60 for the second planetary gear assembly 54 is locked. The transmission output shaft is therefore driven by the ring gear 54b of the secondary planetary gear assembly 54 for rotation in the reverse direction about the center axis of the shaft, thereby producing the reverse drive gear condition in the transmission mechanism.

When the transmission gear shift lever is thereafter moved from the position "R" to the neutral gear position "N", the first fluid outlet port 156 of the manually operated gear position selector valve 148 is made open to one drain port of the valve 148 with the other fluid outlet ports 158, 160 and 162 kept open to the other drain port of the valve 148. The line pressure which has been established in the fluid chamber for the low-and-reverse brake 68 is returned through the fluid passageway 232, past the second pressure outlet and inlet ports 196 and 194 of the first-second gear shift valve 176 and further through the fluid passageway 234 and 236 and is discharged to the transmission oil sump by way of the first fluid outlet port 156 and one drain port of the gear position selector valve 148. There being no extra flow restriction means in the passageways 232 and 236, the flow of the fluid in the fluid chamber for the low-and-reverse brake 68 can be discharged therefrom at a relative high rate. On the other hand, the fluid pressure which has been developed in the fluid chamber for the high-and-reverse clutch 40 is returned through the shuttle valve 658 and the high-and-reverse clutch actuating fluid circuit 238, past the on-way check valve 242 bypassing the orifice 240 and through the passageway 236 and is discharged through the first fluid outlet port 156 and one drain port of the gear position selector valve 148. The fluid to be discharged from the fluid chamber for the high-and-reverse clutch 40 is, thus, also passed through these routes without being subjected to any extra flow restriction because the orifice 240 provided in the high-and-reverse clutch actuating fluid circut 238 is bypassed by the one-way check valve 242 which is arranged to permit fluid to freely pass therethrough when the flow is directed backwardly from the fluid chamber of the high-and-reverse clutch 40.

The low-and-reverse brake 68 to be brought into operation for both of the reverse drive condition and the first gear ratio condition in the manual first forward drive range is operated by the line pressure when the reverse drive gear position "R" is selected and by the fluid pressure delivered from the low-and-reverse brake actuating pressure reducing valve 512 when the first gear ratio in the manual first forward drive range is to be obtained. As is well known in the art, a transmission brake utilized to produce forward and reverse drive gear conditions selectively is subjected to a greater braking load during the reverse drive gear condition than in the forward drive gear condition and is usually so designed as to provide a potential braking capacity competent for the reverse drive condition. If, therefore, the low-and-reverse brake 68 is operated by the line pressure during a forward drive gear condition as well as the reverse drive gear condition, the braking force to be exerted by the brake 68 is excessive for the load to be applied to the brake under the forward drive gear condition and will create shocks when shift is being made to the particular gear condition. Such a problem can be effectively avoided by operating the low-and-reverse brake 68 by a fluid pressure lower than the line pressure during shifting from the second gear ratio condition to the first gear ratio condition in the manual first forward drive range. A similar consideration has been taken in respect of the high-and-reverse clutch 40 which is to be operated by the line pressure to produce the reverse drive condition and by a lower fluid pressure supplied from the high-and-reverse clutch actuating pressure reducing valve 632 to produce the third gear ratio in the automatic forward drive range. While the fluid pressure for operating the low-and-reverse brake 68 under the first gear ratio condition in the manual first forward drive range is substantially fixed throughout the particular condition, the fluid pressure by which the high-and-reverse clutch 40 is to be operated to produce the third gear ratio condition in the automatic forward drive gear range is continuously variable, except under kickdown condition, with the throttle pressure Pt as will be seen from the graph of FIG. 3. Since, in this instance, the throttle pressure Pt developed in the hydraulic control system according to the present invention is substantially proportional to the energy output of an engine as previously described (see the description under the subtitle "Throttle Pressure Modulator Valve 478"), the fluid pressure developed by the pressure reducing valve 632 provided for the high-and-reverse clutch 40 is continuously variable with the energy output of the engine so that torque transmitting efficiency of the clutch 40 put into operation under the automatic forward drive range condition reflects the energy output of the engine with a considerable accuracy. The high-and-reverse clutch 40 is for this reason, driven to couple without producing sensible shocks during shifting from the second gear ratio to the third gear ratio in the automatic forward drive range.

Throughout the reverse drive gear condition, furthermore, there is no fluid pressure developed in the third line pressure port 112 of the pressure regulator valve 94 with the second fluid outlet port 158 of the manually operated gear position selector valve 148. The valve spool 120 of the pressure regulator valve 94 is, therefore, released from the force which is to be exerted on the differential pressure acting area between the third and fourth circumferential lands 126 and 128 of the valve spool 120 by the line pressure developed in the particular port 112 throughout the forward drive ranges of the automatic power transmission. Under the reverse drive gear condition, the line pressure Pl developed by the pressure regulator 94 is accordingly increased by a value corresponding to the force resulting from the line pressure to be developed under forward drive range conditions. This will contribute to enhancement of the forces with which the high-and-reverse clutch 40 and the low-and-reverse brake 68 are to be actuated during shifting to the reverse drive gear position "R".

What is claimed is:

1. In an automatic power transmission system including fluid operated frictional units to be selectively made operative to produce a plurality of forward drive gear ratios and a hydraulic control system including a source of an actuating fluid pressure to actuate each of the frictional units, a source of first control pressure indicative of the vehicle speed, a source of a second control pressure indicative of the throttle opening, and a source of kickdown pressure:

a shift valve arrangement for incorporation into the hydraulic control system comprising:

a shift valve including a switching valve element and a control valve element which are axially arranged in series and which have end faces, respectively, which are adjacent and opposite to each other, said switching valve element being responsive to the first pressure for switching the directions in which the actuating fluid pressure is to be passed through said shift valve, said control valve element being formed with a first pressure acting area to be acted upon by the second control pressure when said control valve element is in a first position, a second pressure acting area to be acted upon by the kickdown pressure when said control valve element is in a second position and a third pressure acting area to be acted upon by the kickdown pressure when said control valve element is in the first position;

a downshift valve including a valve member formed with a first pressure acting area to be acted upon by the first control pressure for urging said valve member to move in a first direction and a second pressure acting area to be acted upon by the second control pressure for urging said valve member to move in a second direction opposite to said first direction, and resilient biasing means urging said valve member to move in said second direction, said downshift valve being responsive to the first control pressure and the second control pressure for providing a fifth pressure when a predetermined relationship between the first and second control pressures is satisfied; and passageway means providing communication between said shift valve and said downshift valve for directing the fifth pressure from said downshift valve to said shift valve and applying the fifth pressure onto said end faces of said valve elements of said shift valve to urge said switching valve element toward the first position thereof when said valve member is moved in said second direction.

2. A shift valve arrangement as claimed in claim 1, in which said hydraulic control system further includes circuit means in which the actuating fluid pressure is to be developed when a manual forward drive range position is manually selected, said shift valve arrangement further comprising switching means intervening between said passageway means and said circuit means for directing the actuating fluid pressure from said circuit means to said shift valve through said switching valve means and applying the actuating fluid pressure onto said end faces of said valve elements of said shift valve.

3. In a hydraulic control system for an automatic power transmission of a vehicle including a source of a first pressure indicative of the vehicle speed, a source of a second pressure indicative of the throttle opening, and a source of kickdown pressure:

a downshift valve responsive to the first pressure and the second pressure for modulating the second pressure to provide a fourth pressure when a predetermined relationship between the first and second pressures is satisfied;

a shift valve including a switching valve element having a downshift position and an upshift position, said switching valve element having a first effective area adapted for receiving the first pressure for urging said switching valve element toward the upshift position and a second effective area adapted for receiving the fourth pressure for urging said switching valve element toward the downshift position; and means for urging said switching valve element toward the downshift position, said urging means including a control valve element and a spring for biasing said control valve element toward said switching valve element, said control valve element having a first effective area adapted for receiving the fourth pressure for urging said control valve element against the biasing action of said spring, said control valve element having a second effective area adapted for receiving the second pressure, when said switching valve element takes the downshift position, for urging said control valve element in a direction so as to assist the biasing action of said spring, said control valve element having a third effective area adapted for receiving the kickdown pressure, when said switching valve element takes the upshift position, for urging said control valve element in the direction so as to assist the biasing action of said spring.

4. A shift valve for an automatic transmission of a vehicle including a source of a first pressure indicative of the vehicle speed, a source of a second pressure indicative of the throttle opening, a source of a kickdown pressure and a source of a fourth pressure, said shift valve comprising:

a switching valve element having a downshift position and an upshift position, said switching valve element having a first effective area adapted for receiving the first pressure for urging said switching valve element toward the upshift position and a second effective area adapted for receiving the fourth pressure for urging said switching valve element toward the downshift position; and means for urging said switching valve element toward the downshift position, said urging means including a control valve element and a spring for biasing said control valve element toward said switching valve element, said control valve element having a first effective area adapted for receiving the fourth pressure for urging said control valve element against the biasing action of said spring, said control valve element having a second effective area adapted for receiving the second pressure, when said switching valve element takes the downshift position, for urging said control valve element in a direction so as to assist the biasing action of said spring, said control valve element having a third effective area adapted for receiving the kickdown pressure, when said switching valve element takes the upshift position, for urging said control valve element in the direction so as to assist the biasing action of said spring.

5. A shift valve as claimed in claim 4, in which said control valve element has a fifth effective area which is adapted for receiving the kickdown pressure, when said shifting valve element takes the downshift position, for urging said control valve element in the direction so as to assist the biasing action of said spring.

6. A shift valve as claimed in claim 4, further comprising a second spring disposed between said switching valve element and said control valve element.

* * * * *